United States Patent
Miyasaka

(10) Patent No.: US 11,188,048 B2
(45) Date of Patent: Nov. 30, 2021

(54) PROGRAMMABLE LOGIC CONTROLLER AND MAIN UNIT

(71) Applicant: Keyence Corporation, Osaka (JP)

(72) Inventor: Tetsuya Miyasaka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 191 days.

(21) Appl. No.: 16/562,464

(22) Filed: Sep. 6, 2019

(65) Prior Publication Data
US 2020/0125061 A1 Apr. 23, 2020

(30) Foreign Application Priority Data
Oct. 23, 2018 (JP) .............................. JP2018-199199

(51) Int. Cl.
G05B 19/05 (2006.01)
(52) U.S. Cl.
CPC ......... *G05B 19/058* (2013.01); *G05B 19/054* (2013.01)
(58) Field of Classification Search
CPC ................ G05B 19/058; G05B 19/054; G05B 2219/13044
See application file for complete search history.

(56) References Cited

U.S. PATENT DOCUMENTS

| | | | | |
|---|---|---|---|---|
| 6,033,257 A * | 3/2000 | Lake | .................. | G05B 19/0423 439/502 |
| 6,381,501 B1 | 4/2002 | Takase | | |
| 6,421,071 B1 * | 7/2002 | Harrison | .......... | G01R 31/31935 715/787 |
| 2003/0195722 A1 * | 10/2003 | Buda | ....................... | G05B 19/05 702/188 |
| 2005/0198034 A1 * | 9/2005 | Boyer | ................. | G05B 19/4183 702/188 |
| 2008/0114571 A1 * | 5/2008 | Campbell | .......... | G05B 19/4183 702/189 |

(Continued)

FOREIGN PATENT DOCUMENTS

| JP | 63-311401 A | 12/1988 |
|---|---|---|
| JP | 5-79951 A | 3/1993 |

(Continued)

OTHER PUBLICATIONS

Office Action issued on corresponding Japanese Patent Application No. 2018-199199 dated Apr. 28, 2020 (English translation only) (4 pages).

(Continued)

*Primary Examiner* — Christopher E. Everett
(74) *Attorney, Agent, or Firm* — Kilyk & Bowersox, P.L.L.C.

(57) ABSTRACT

A PLC collects a device value stored in any one of a plurality of devices and stores information relating to collecting time at which the device value is collected and the device value in association with each other in a first buffer. The PLC collects data input from a monitoring apparatus and stores information relating to acquiring time at which the data is acquired and the data in association with each other in a second buffer. A saving section saves, when a predetermined saving condition is satisfied, the device value and the information relating to the collecting time stored in the first buffer, and the data and the information relating to the acquiring time stored in the second buffer in correspondence with each other.

18 Claims, 50 Drawing Sheets

(56) References Cited

U.S. PATENT DOCUMENTS

| | | | |
|---|---|---|---|
| 2013/0124184 A1 | 5/2013 | Sakaguchi et al. | |
| 2013/0212420 A1* | 8/2013 | Lawson | G05B 19/4185 713/400 |
| 2014/0304551 A1 | 10/2014 | Nakai et al. | |
| 2016/0033953 A1 | 2/2016 | Nakagawa | |
| 2017/0300753 A1* | 10/2017 | Billi | H04N 7/181 |

FOREIGN PATENT DOCUMENTS

| | | |
|---|---|---|
| JP | 6-282314 A | 10/1994 |
| JP | 6282314 A | 10/1994 |
| JP | 6-332507 A | 12/1994 |
| JP | 7182013 A | 7/1995 |
| JP | 8-50502 A | 2/1996 |
| JP | 9-212394 A | 8/1997 |
| JP | 10-11116 A | 1/1998 |
| JP | 10-011118 A | 1/1998 |
| JP | 11-161305 A | 6/1999 |
| JP | 11-331766 A | 11/1999 |
| JP | 11327610 A | 11/1999 |
| JP | 2000-235412 A | 8/2000 |
| JP | 2000-250775 A | 9/2000 |
| JP | 2000259239 A | 9/2000 |
| JP | 2001-125612 A | 5/2001 |
| JP | 2003-22182 A | 1/2003 |
| JP | 200376405 A | 3/2003 |
| JP | 2005-56098 A | 3/2005 |
| JP | 2006-134098 A | 5/2006 |
| JP | 2007-11936 A | 1/2007 |
| JP | 2007-128456 A | 5/2007 |
| JP | 2009-9607 A | 1/2009 |
| JP | 2009-146040 A | 7/2009 |
| JP | 2011028496 A | 2/2011 |
| JP | WO2011104935 A1 | 6/2011 |
| JP | 2011-138451 A | 7/2011 |
| JP | 2011-192128 A | 9/2011 |
| JP | 4818492 B1 | 11/2011 |
| JP | 4918492 B2 | 4/2012 |
| JP | 2012-256178 A | 12/2012 |
| JP | 5301060 B1 | 9/2013 |
| JP | 201452669 A | 3/2014 |
| JP | 2016110458 A | 6/2016 |
| JP | 2017-79009 A | 4/2017 |
| JP | WO2015177877 A1 | 4/2017 |
| JP | 2018-67220 A | 4/2018 |
| JP | 2018136745 A | 8/2018 |
| WO | 2005091098 A1 | 9/2005 |
| WO | 2011114825 A1 | 9/2011 |
| WO | 2012-056539 A | 5/2012 |
| WO | 2014097379 A1 | 6/2014 |
| WO | 2014167726 A1 | 10/2014 |

OTHER PUBLICATIONS

U.S. Appl. No. 16/562,467, filed Sep. 6, 2019 (227 pages).
U.S. Appl. No. 16/562,468, filed Sep. 6, 2019 (85 pages).
Second Office Action issued in corresponding Japanese Patent Application No. 2018-199199 dated Jun. 23, 2020 (English translation only) (6 pages).
Office Action issued in corresponding divisional Japanese Patent Application No. 2020-134823 dated Jun. 23, 2020 (English translation only) (3 pages).
Office Action issued on corresponding Japanese Patent Application No. 2020-201712 dated Jun. 11, 2021 (English translation only) (3 pages).

* cited by examiner

| UNIT MONITOR | | |
|---|---|---|
| | BUFFER MEMORY | AXIS 1 |
| CURRENT COORDINATE | UG4-UG5 | 0 PLS |
| COMMAND COORDINATE | UG8-UG9 | 0 PLS |
| CURRENT SPEED | UG10-UG11 | 0 PLS/s |
| COMMAND SPEED | UG12-UG13 | 0 PLS/s |
| FEEDBACK TORQUE | UG20 | 0 % |
| LOAD FACTOR | UG21 | 0 % |
| PEAK CURRENT | UG22 | 0 % |
| ⋮ | ⋮ | ⋮ |

FIG. 10C

| PROGRAM COMPONENT | HEADING DEVICE | NUMBER | OBJECT DEVICE |
|---|---|---|---|
| GLOBAL | R34000 | 1 | R34000-R34015 |
| GLOBAL | R34300 | 1 | R34300-R34315 |
| GLOBAL | R40900 | 1 | R40900-R40915 |
| GLOBAL | CR4001 | 1 | CR4001-CR4100 |
| GLOBAL | T0 | 1 | T0 |
| GLOBAL | DM10020 | 1 | DM10020 |
| GLOBAL | MR000 | 1 | MR000-MR015 |
| Main | @MR000 | 1 | @MR000-@MR015 |
| Main | @EM0 | 10 | @EM0-@EM9 |
| Main | @CR2000 | 1 | @CR2000-@CR2015 |
| first_operation | @CR2000 | 1 | @CR2000-@CR2015 |
| Sub | @CR2000 | 1 | @CR2000-@CR2015 |

FIG. 11

| FUNCTION | HEADING DEVICE | NUMBER | OBJECT DEVICE |
|---|---|---|---|
| MOTION UNIT | UG4 | 2 | UG4-UG5 |
| MOTION UNIT | UG8 | 6 | UG8-UG13 |
| MOTION UNIT | UG20 | 32 | UG20-UG51 |
| MOTION UNIT | UG100 | 8 | UG100-UG107 |
| MOTION UNIT | UG110 | 8 | UG110-UG117 |
| MOTION UNIT | UG119 | 40 | UG119-UG158 |

PROGRAMMABLE LOGIC CONTROLLER AND MAIN UNIT

CROSS-REFERENCE TO RELATED APPLICATIONS

The present application claims foreign priority based on Japanese Patent Application No. 2018-199199, filed Oct. 23, 2018, the contents of which is incorporated herein by reference.

BACKGROUND OF THE INVENTION

1. Field of the Invention

The present invention relates to a programmable logic controller and a main unit.

2. Description of Related Art

A programmable logic controller (PLC) is a controller that controls manufacturing apparatus, conveyance apparatus, and inspection apparatus in factory automation. A PLC controls various expansion units and controlled apparatus by executing a user program such as a ladder program created by a user. When a user program is actually executed on the PLC, there may be a matter that was not intended at the time when the user program was created and it may be necessary to revise the user program. In order to specify a place to be revised, the user does not only review the user program but also refers to log data generated by the PLC. A value of a device (a device value) collected when the user program is executed is stored in the log data. In the field of PLC, a device means a storing region for storing information. Examples of the device include a relay device which holds one-bit information, and a word device which holds one-word information.

According to JP-A-10-011118 (Patent Literature 1), it is proposed to log a device value.

SUMMARY OF THE INVENTION

There is a need to photograph by a camera a state of a field device or an inspection object (work piece) controlled by a user program and to refer to the state together with logging data. When the state of the field device or the work piece can be confirmed with an image, the user can easily determine whether there is a bug in the user program or the like, or whether there is a problem in the installation of the field device, or whether there is a problem in the conveyance of the work piece. Even when the user program needs to be revised, it would become easier for the user to determine which part of the program needs to be revised. When there is a device value in addition to image data (two-dimensional data) when a trouble occurs, it will be easier for the user to solve the trouble. However, an updating cycle (scan cycle) of a device value and a generation cycle (saving cycle) of two-dimensional data are generally different. Therefore, it has been difficult for the user to specify which device value and which two-dimensional data are related. It should be noted that such a problem is not limited to two-dimensional data such as image data but also may happen to other data. For example, as for a motion control, an updating cycle (so-called control cycle) of motion data such as a current value and a current speed is different from a scan cycle, and thus it has been difficult for the user to specify which device value and which motion data are related in time. In addition, for example, as for a communication control, an updating cycle of communication data (for example, one or more sensor values) acquired in cyclic communication is different from the scan cycle, and thus it has been difficult for the user to specify which device value and which communication parameter are related in time. As such, it has been difficult for the user to specify which device value and data input from a monitoring apparatus such as a camera, a motor amplifier driving a motor, a sensor, and a communication controller are related in time.

Therefore, an object of the invention is to make it easy to specify a time relationship between a device value and data input from various monitoring apparatus such as a camera, a motor amplifier, a sensor, and a communication controller.

For example, the invention provides a programmable logic controller including:

a first external interface which receives a user program and setting information from an external setting apparatus;

a program executing section which repeatedly executes the received user program;

a device storing section having a plurality of devices which are memory regions (storage regions) referred to by the program executing section;

a first collecting section which collects a device value stored in any one of the plurality of devices and stores information relating to collecting time at which the device value is collected and the device value in association with each other in a first buffer;

a second external interface which is connected to a monitoring apparatus from which data is input;

a function executing section which executes, based on the received setting information, a function accompanying an input of data from the monitoring apparatus via the second external interface;

a second collecting section which collects data input from the monitoring apparatus and stores information relating to acquiring time at which the data is acquired and the data in association with each other in a second buffer; and a saving section which saves, when a predetermined saving condition is satisfied, the device value and the information relating to the collecting time stored in the first buffer, and the data and the information relating to the acquiring time stored in the second buffer in correspondence with each other.

According to the invention, it becomes easy to specify a time relationship between a device value and data input from various monitoring apparatus such as a camera, a motor amplifier, a sensor, and a communication controller.

BRIEF DESCRIPTION OF THE DRAWINGS

FIG. 10C is a diagram illustrating an extraction list;

FIG. 11 is a diagram illustrating an extraction list;

DESCRIPTION OF EMBODIMENTS

One embodiment of the invention is shown below. Individual embodiments described below serve for a better understanding of various concepts such as generic concepts, intermediate concepts, and specific concepts of the invention. In addition, technical scope of the invention is determined by the scope of claims and is not limited by the following individual embodiments.

System Configuration

First, configuration and operation of a general PLC will be described for a better understanding of a programmable logic controller (PLC, also may be simply called a programmable controller) by a person skilled in the art.

Figure 1:
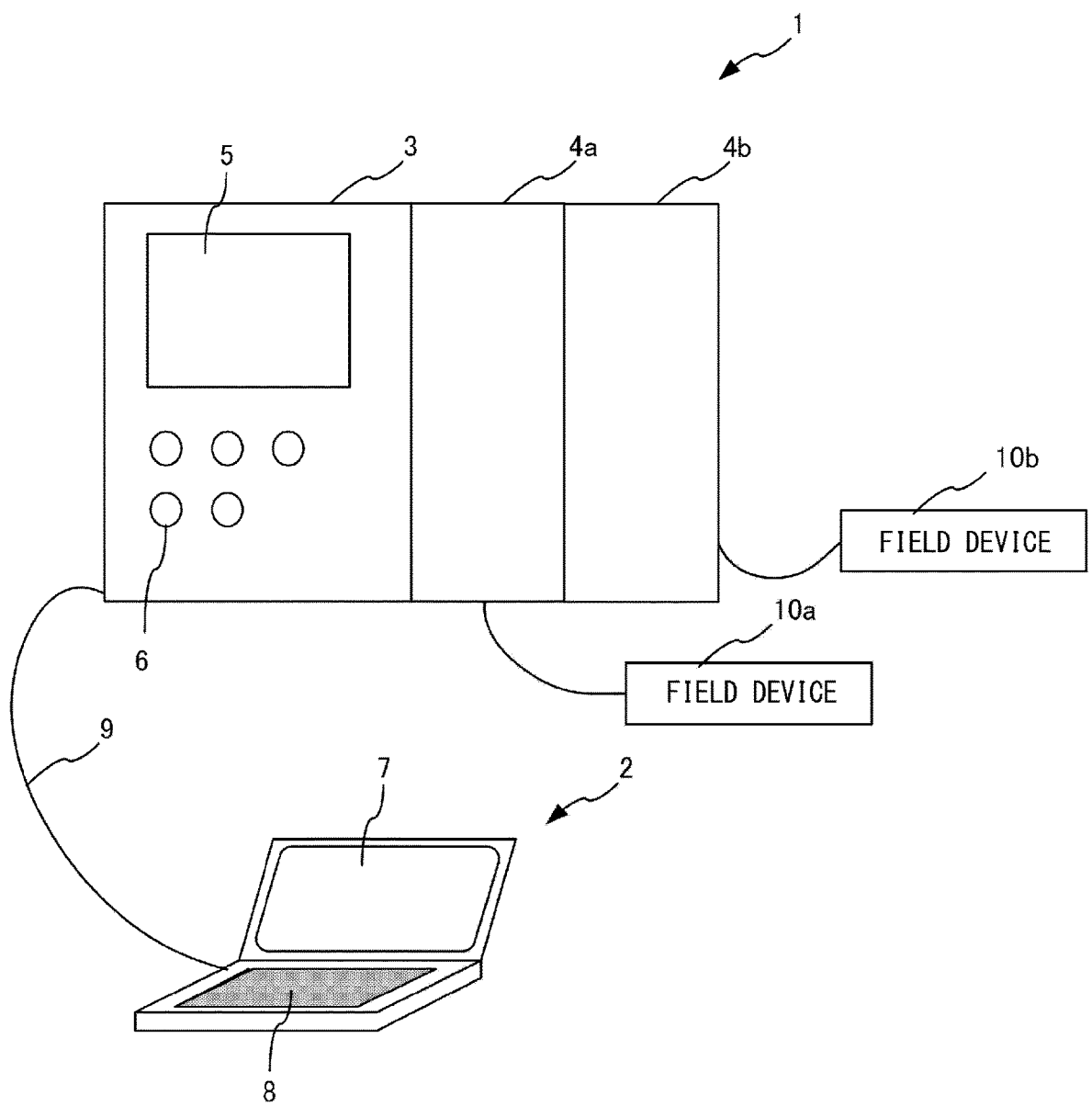
FIG. 1 is a diagram showing a programmable logic controller system.

FIG. 1 is a conceptual diagram showing a configuration example of a programmable logic controller system according to an embodiment of the invention. As shown in FIG. 1, the system has a PC 2 for editing a user program such as a ladder program, and a PLC (programmable logic controller) 1 for integrally controlling various control apparatus installed in a factory, etc. The PC is an abbreviation for personal computer. A user program may be created using a graphical programming language such as a motion program in a form of flow chart such as a ladder language and SFC (sequential function chart), or may be created by using a high-level programming language such as C language. For the convenience of explanation, in the following description, the user program is a ladder program. The PLC 1 includes a basic unit 3 in which a CPU is integrated, and one or more expansion units 4. The one or more expansion units 4 are attachable to and detachable from the basic unit 3. For example, an expansion unit 4a may be a positioning unit which drives a motor (field device 10a) to position a work piece, and an expansion unit 4b may be a counter unit. The counter unit counts a signal from an encoder (field device 10b) such as a manual pulser. Characters a, b, c ... attached to the end of reference signs and numerals may be omitted. The basic unit 3 may be referred to as a CPU unit. The system including the PLC 1 and the PC 2 may be referred to as a programmable logic controller system.

The basic unit 3 has a display section 5 and an operating section 6. The display section 5 can display operation states and the like of each expansion unit 4 attached to the basic unit 3. The display section 5 switches display contents in accordance with operation contents of the operating section 6. The display section 5 generally displays a current value of a device (device value) in the PLC 1, error information generated in the PLC 1, etc. A device is a name referring to a region on a memory provided for storing a device value (device data), and may also be called a device memory. The device value is information indicating an input state from an input apparatus, an output state to an output apparatus, and states of internal replay (auxiliary relay), timer, counter, data memory, etc. set on a user program. The type of the device value includes a bit type and a word type. A bit device stores one-bit device value. A word device stores one-word device value.

The expansion unit 4 is provided to extend functions of the PLC 1. Each expansion unit 4 is connected with a field device (controlled apparatus) 10 corresponding to the function of that expansion unit 4, and in this way, each field device 10 is connected to the basic unit 3 via the expansion unit 4. The field device 10 may be an input apparatus such as a sensor and a camera, or may be an output apparatus such as an actuator. One expansion unit 4 may be connected with a plurality of field devices.

The PC 2 may be called a program creation supporting apparatus. The PC 2 is, for example, a portable notebook type or a tablet type personal computer, and has a display section 7 and an operating section 8. The ladder program, which is an example of a user program for controlling the PLC 1, is created using the PC 2. The created ladder program is converted into mnemonic code in PC 2. The PC 2 is connected to the basic unit 3 of the PLC 1 via a communication cable 9 such as a USB (Universal Serial Bus), and transmits the ladder program which has been converted into mnemonic code to the basic unit 3. The basic unit 3 converts the ladder program into machine code and stores the machine code in a memory provided in the basic unit 3. Here, the mnemonic code is transmitted to the basic unit 3. However, the invention is not limited thereto. For example, the PC 2 may convert the mnemonic code into an intermediate code and transmit the intermediate code to the basic unit 3.

Although not shown in FIG. 1, the operating section 8 of the PC 2 may include a pointing device such as a mouse connected to the PC 2. In addition, the PC 2 may be configured to be detachably connected to the basic unit 3 of the PLC 1 via a communication cable 9 other than a USB. The PC 2 may also be configured to be wirelessly connected to the basic unit 3 of the PLC 1 without the communication cable 9.

Ladder Program

Figure 2:
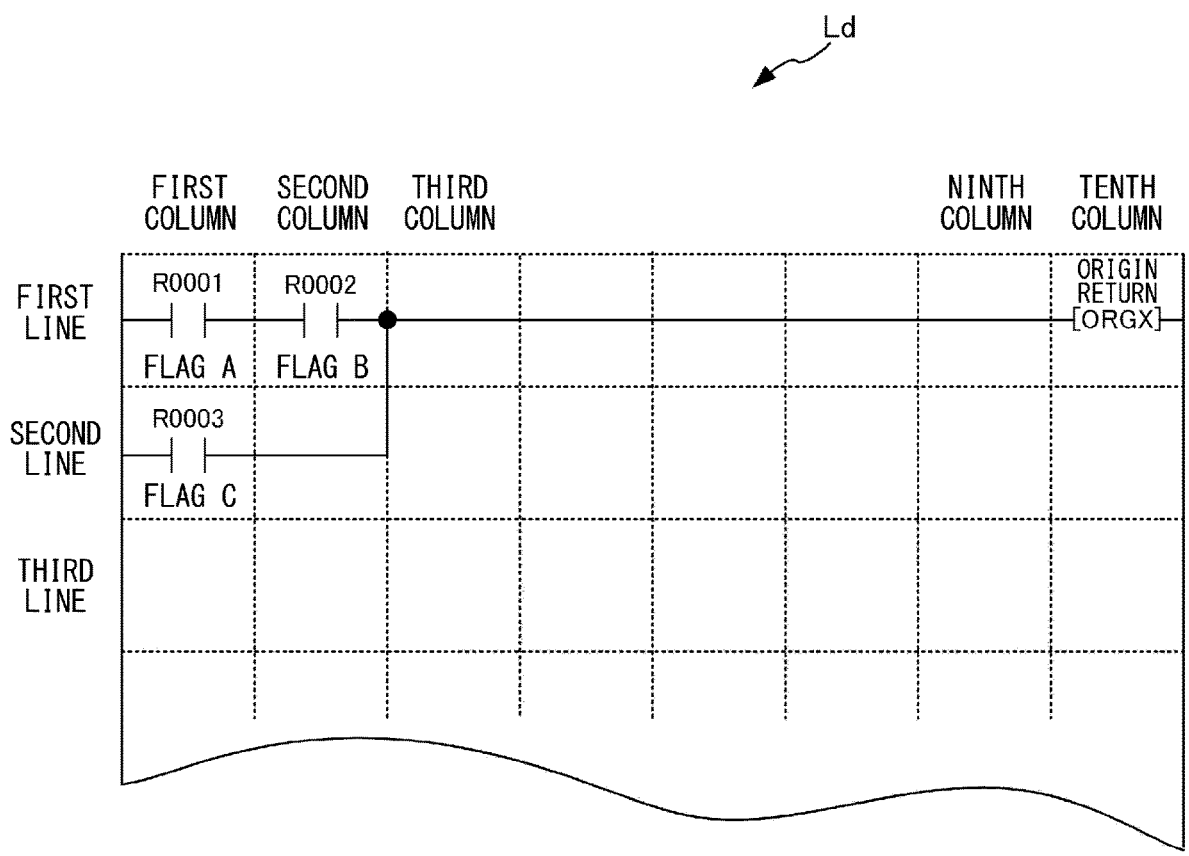
FIG. 2 is a diagram illustrating a ladder program.

FIG. 2 is a diagram showing an example of a ladder diagram Ld displayed on the display section 7 of the PC 2 when the ladder program is created. The PC 2 displays a plurality of cells arranged in a matrix form on the display section 7. In each cell, a symbol of a virtual device is arranged. The symbol indicates an input relay or an output relay. A plurality of symbols form a relay circuit. In the ladder diagram Ld, for example, 10 columns×N lines (N is an arbitrary natural number) of cells are arranged. Symbols of virtual devices are appropriately arranged in the cells in each line.

The relay circuit shown in FIG. 2 is configured by appropriately combining symbols of three virtual devices (hereinafter referred to as "input devices") to be turned on/off based on an input signal from an input apparatus and a symbol of a virtual device (hereinafter referred to as "output device") to be turned on/off to control operations of an output apparatus.

Characters ("R0001", "R0002" and "R0003") displayed above the symbols of each input device represent device names (address names) of the input devices. Characters ("flag 1", "flag 2" and "flag 3") displayed under the symbols of each input device represent device comments corresponding to the input devices. The character ("origin return") displayed above the symbol of the output device is a label containing a character string representing a function of the output device.

In the example shown in FIG. 2, an AND circuit is formed by combining in series the symbols of two input devices corresponding to the device names "R0001" and "R0002" respectively. An OR circuit is formed by combining the symbol of the input device corresponding to the device name "R0003" in parallel to the AND circuit including the symbols of the two input devices. That is, in this relay circuit, the output device corresponding to the symbol of the first line is turned on when both input devices corresponding to the two symbols of the first line are turned on, or only when the input device corresponding to the symbol of the second line is turned on.

Program Creation Supporting Apparatus

Figure 3:
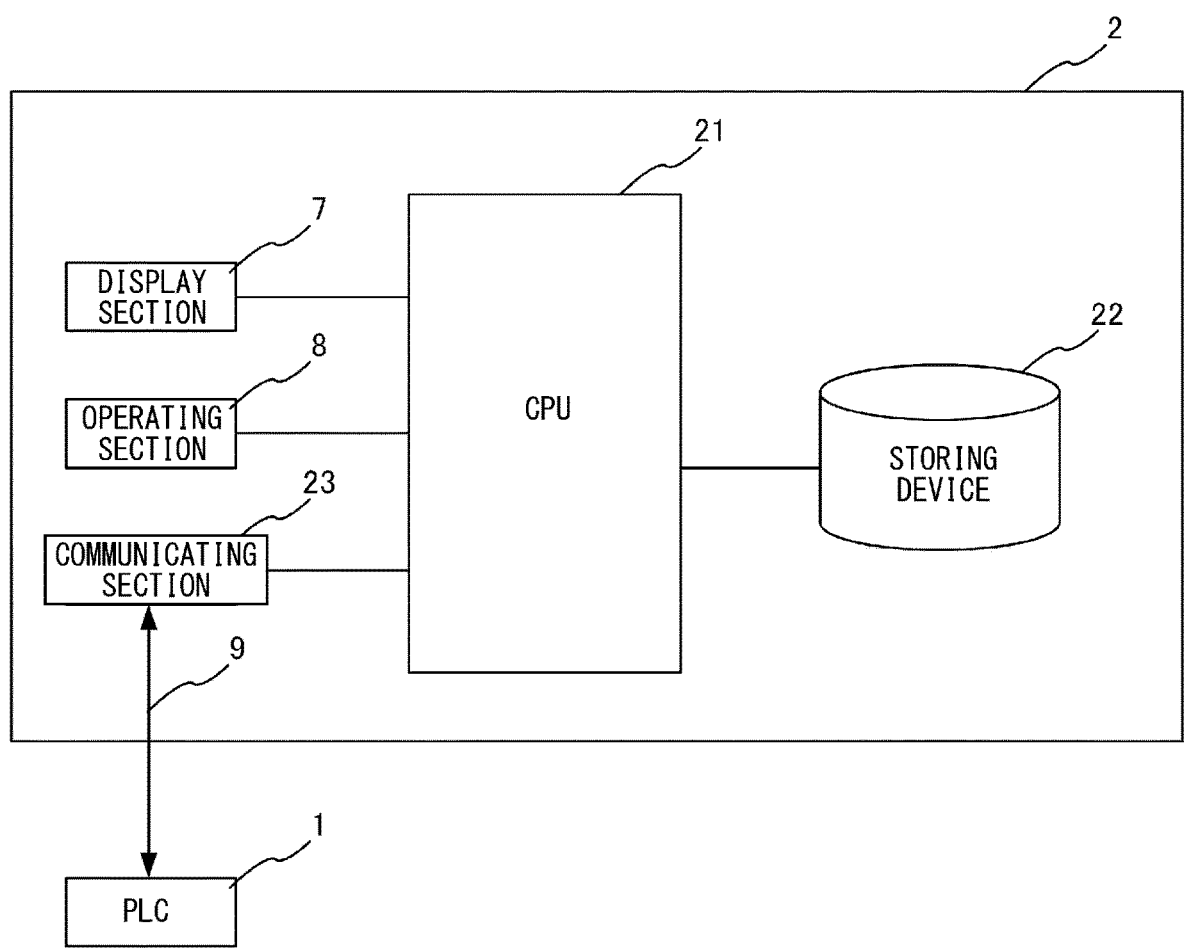
FIG. 3 is a diagram illustrating a program creation supporting apparatus.

FIG. 3 is a block diagram for explaining an electrical configuration of the PC 2. As shown in FIG. 3, the PC 2 includes a CPU 21, the display section 7, the operating section 8, a storing device 22, and a communicating section 23. The display section 7, the operating section 8, the storing device 22, and the communicating section 23 are electrically connected to the CPU 21 respectively. The storing device 22 may include an RAM or an ROM, and may further include a detachable memory card. The CPU is an abbreviation for a central processing unit. ROM is an abbreviation for read only memory. RAM is an abbreviation for random access memory.

The user causes the CPU 21 to execute a computer program (software for editing) stored in the storing device 22 to edit project data through the operating section 8. The project data includes one or more user programs (e.g., ladder programs), configuration information of the basic unit 3 and the expansion unit 4, etc. The configuration information is information indicating connection positions of a plurality of expansion units 4 to the basic unit 3 and functions of the basic unit 3 (e.g., communication function and positioning function), and information indicating functions of the expansion unit 4 (e.g., photographing function), etc. Here, the editing of the project data includes creation and change of the project data. The project data created using the software for editing is stored in the storing device 22. In addition, the user can read the project data stored in the storing device 22 and change the project data using the software for editing as needed. The communicating section 23 is for communicably connecting the PC 2 to the basic unit 3 via the communication cable 9. The CPU 21 transfers the project data to the basic unit 3 via the communicating section 23.

PLC

Figure 4:
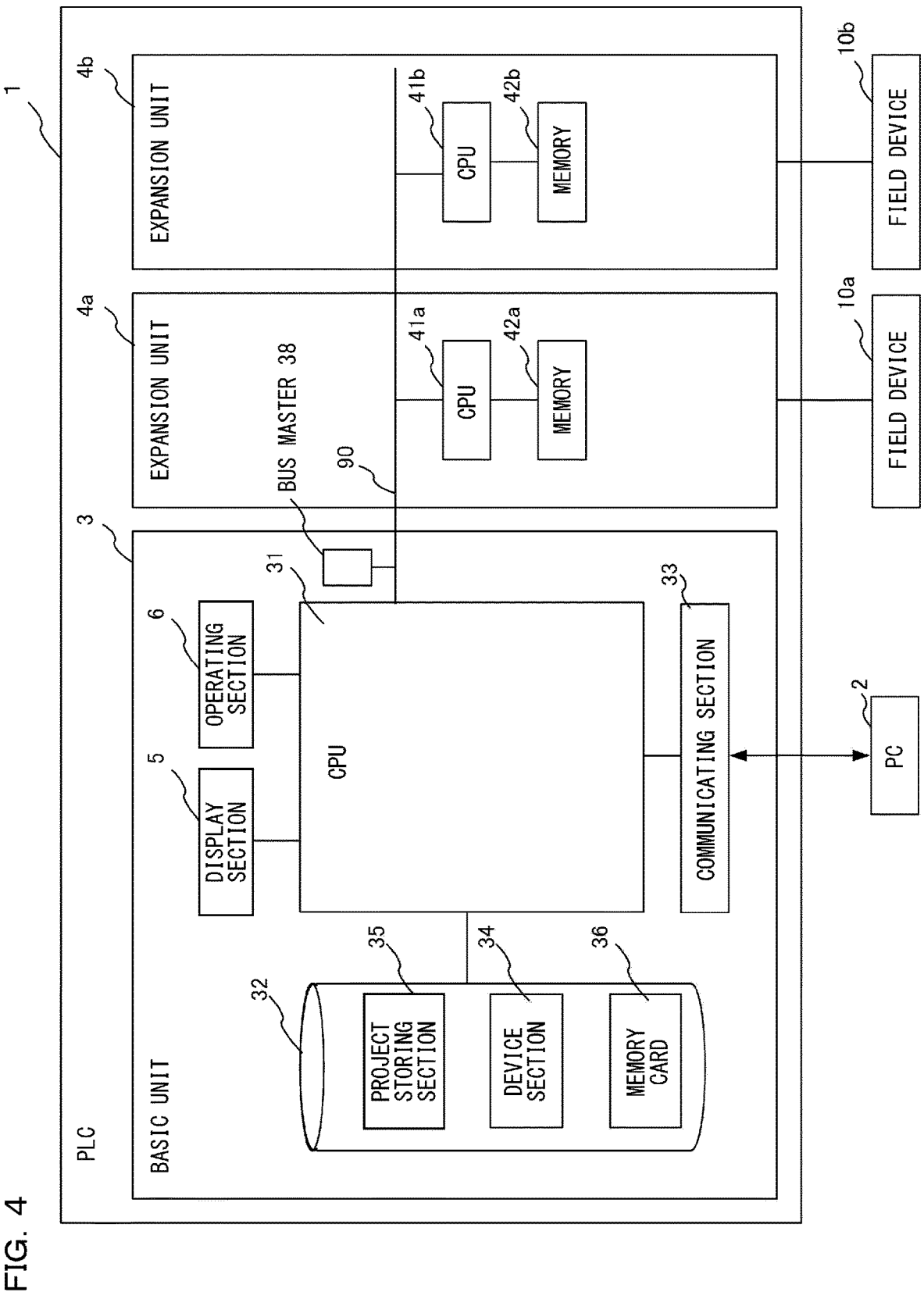
FIG. 4 is a diagram illustrating a PLC.

FIG. 4 is a block diagram for explaining an electrical configuration of the PLC 1. As shown in FIG. 4, the basic unit 3 includes a CPU 31, the display section 5, the operating section 6, a storing device 32, and a communicating section 33. The display section 5, the operating section 6, the storing device 32, and the communicating section 33 are electrically connected to the CPU 31 respectively. The storing device 32 may include an RAM or an ROM, or a memory card, etc. The storing device 32 has a plurality of memory regions such as a device section 34, a project storing section 35, and a detachable memory card 36. The device section 34 has a bit device, a word device, etc., and each device stores a device value. The project storing section 35 stores project data input from the PC 2. The storing device 32 also stores a control program for the basic unit 3. As shown in FIG. 4, the basic unit 3 and the expansion unit 4 are connected via a unit internal bus 90 which is one of expansion buses. Communication function related to the unit internal bus 90 may be implemented as part of the communicating section 33. The communicating section 33 may include a network communication circuit. The CPU 31 may transmit log data and the like to the PC 2, a cloud, etc. via the communicating section 33.

Here, the unit internal bus 90 will be additionally described. The unit internal bus 90 is a bus where input and output refresh to be described below are conducted. Communication control in the unit internal bus 90 is realized by a so-called bus master 38 (the bus master 38 may be provided as part of the communicating section 33 or the bus master 38 may be provided as part of the CPU 31). The bus master 38 is a control circuit for controlling communication in the unit internal bus 90, and the bus master 38 receives a communication request from the CPU 31 to conduct communication of input and output refresh, etc. to be described later between the expansion units 4.

The expansion unit 4 includes a CPU 41 and a memory 42. The CPU 41 controls the field device 10 according to an instruction (device value) from the basic unit 3 stored in the device. The CPU 41 stores a control result of the field device 10 in a device which is called a buffer memory. The control result stored in the device is transferred to the basic unit 3 by the input and output refresh. In addition, the control result stored in the device is transferred to the basic unit 3 according to a reading instruction from the basic unit 3 even at a timing different from that of the input and output refresh. The memory 42 includes an RAM or an ROM, etc. In particular, a storing region used as a buffer memory is guaranteed in the RAM. The memory 42 may have a buffer which temporarily holds data (e.g., still image data or moving image data) acquired by the field device 10.

Figure 5:
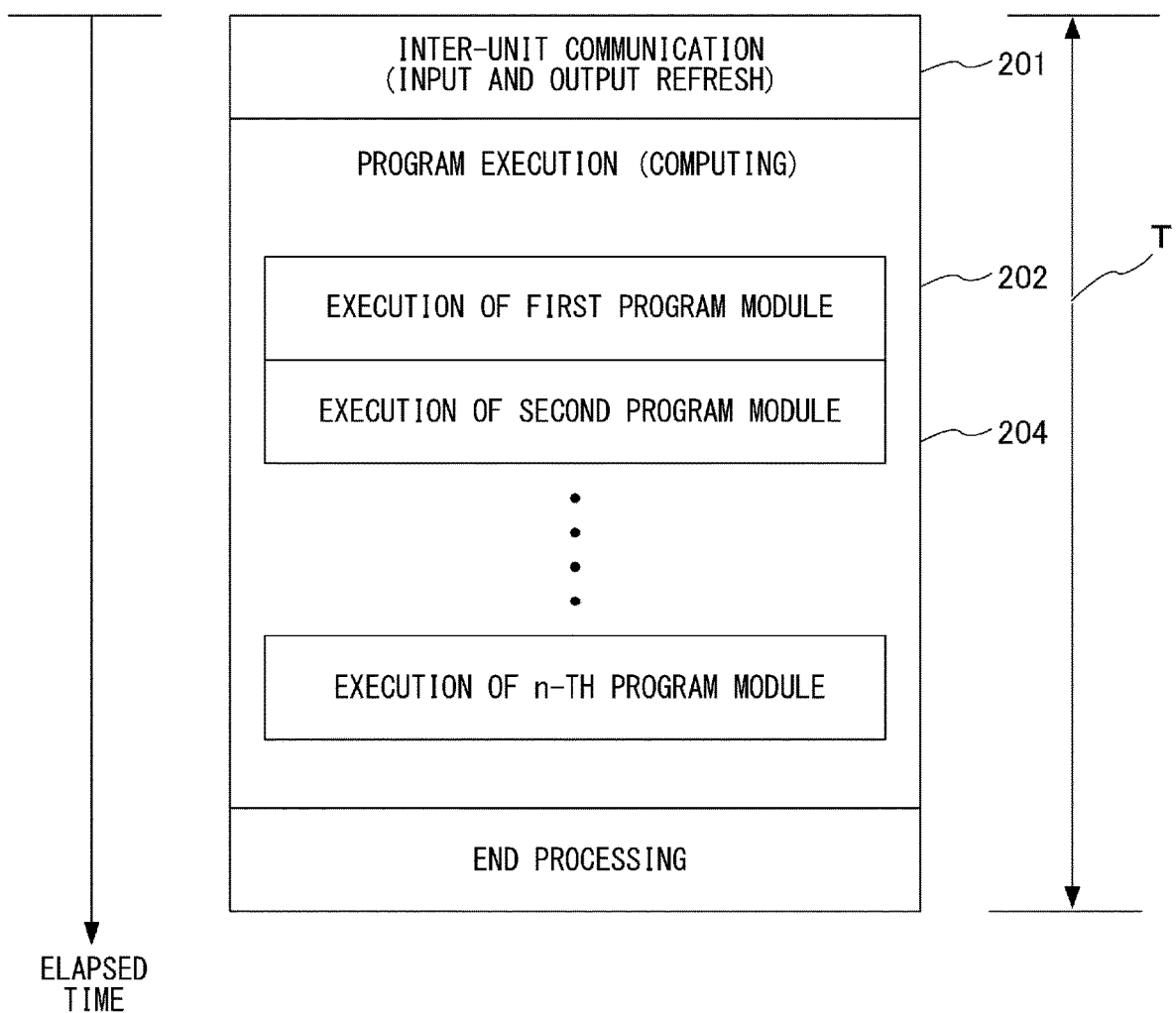
FIG. 5 is a diagram illustrating a scan of a ladder program.

FIG. 5 is a schematic diagram showing a scan time of the basic unit 3. As shown in FIG. 5, a scan time T includes inter-unit communication 201 for conducting input and output refresh, program execution 202, and END processing 204. In the inter-unit communication 201, the basic unit 3 transmits output data obtained by executing the ladder program from the storing device 32 in the basic unit 3 to an external apparatus of the expansion unit 4, etc. Further, the basic unit 3 puts input data received from an external apparatus of the expansion unit 4, etc. into the storing device 32 in the basic unit 3. In a word, the device value stored in the basic unit 3 is reflected in the device of the expansion unit 4 by the output refresh. Similarly, the device value stored in the device of the expansion unit 4 is reflected in the device of the basic unit 3 by the input refresh. As a result, the device of the basic unit 3 and the device of the expansion unit 4 are synchronized by the input and output refresh. A mechanism which updates the device values between units (inter-unit synchronization) at a timing other than refresh may be adopted. However, the basic unit 3 rewrites the device of the basic unit 3 at any time, and similarly, the expansion unit 4 rewrites the device of the expansion unit 4 at any time. In a word, the device of the basic unit 3 can be accessed at any time by an internal device of the basic unit 3. Similarly, the device of the expansion unit 4 can be accessed at any time by an internal device of the expansion unit 4. The device values are updated and synchronized with each other between the basic unit 3 and the expansion unit 4 basically at the refresh timing. In the program execution 202, the basic unit 3 executes (computes) a program using the updated input data. As shown in FIG. 5, in the program execution 202, a plurality of program modules or ladder programs may be sequentially executed according to the project data. The basic unit 3 conducts computing processing on the data by executing the program. The END processing means the whole processing related to data communication with an external apparatus such as a display (not shown) and the like connected to the PC 2 or the basic unit 3, and peripheral service such as an error check of the system.

In this way, the PC 2 creates a ladder program according to the operation of the user and transfers the created ladder program to the PLC 1. The PLC 1 takes the input and output refresh, the execution of the ladder program, and the END processing as one cycle (one scan), and repeatedly executes the cycle periodically, that is, cyclically. As a result, various output apparatus (motors, etc.) are controlled based on timing signals from various input apparatus (sensors, etc.). Apart from a scan cycle, the basic unit 3 and the expansion unit 4 respectively have an internal control cycle. The basic unit 3 and the expansion unit 4 control the function of the field device 10 and the like based on the internal control cycle.

Logging

When the user improves or revises the user program, the device value acquired when the PLC 1 is executing the user program may be useful. Therefore, the PLC 1 acquires a previously designated device value and creates log data. Here, in the devices managed by the PLC 1, there are not only devices utilized by the user program but also devices that are not utilized by the user program. There are also devices that are useful in improving or revising the user program, and devices that are not useful in improving or revising the user program. The number of the devices typically reaches thousands, and thus it has been a great burden for the user to designate necessary devices. Therefore, the PC 2 analyzes the user program and extracts a device used or described in the user program as a logging object. In this way, the user's burden is reduced.

When all devices managed by the PLC 1 are logging objects, the scan time becomes longer. This is because logging is executed as one of the user programs or executed during input and output refresh. Sometimes the user program may not work as desired by the user due to delay caused by logging. Therefore, the number of devices which are logging objects should be kept at an appropriate number.

The user program may include a plurality of program components (e.g., program modules (main ladder programs and sub ladder programs) and function blocks). Among them, when a device related to a program component which the user wishes to revise is logged, it may be sufficient for the user. In addition, among the plurality of program components, the user may wish to exclude a specific program component from extraction objects or add a specific program component to the extraction objects. Therefore, it would be convenient to the user when the devices can be added or removed from the logging objects using a program component as a unit.

As described above, the basic unit 3 and the expansion unit 4 have one or more functions. Each function is allocated various devices. Therefore, it would be convenient to the user when the devices can be added or removed from the logging objects using these functions as units. For example, when an undesirable event related to communication function of the basic unit 3 occurs, it will be easy for the user to solve the event by referring to a device value of a device related to the communication function of the basic unit 3.

Logging Setting (Automatic Extraction and Addition/Deletion)

Figure 6:
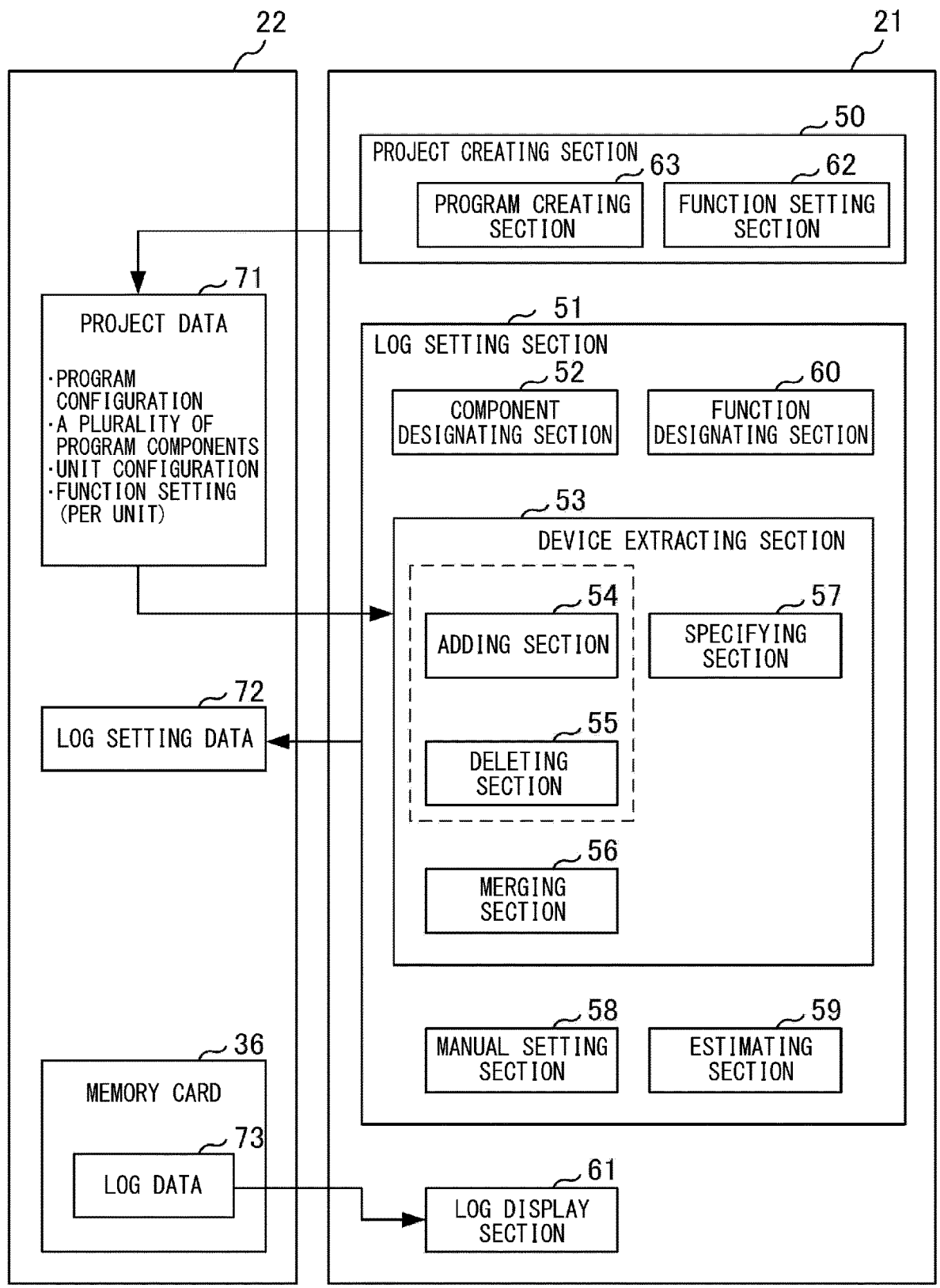
FIG. 6 is a diagram illustrating a function of a program creation supporting apparatus.

FIG. 6 shows functions realized by the CPU 21 of the PC 2 executing the software for editing stored in the storing device 22. Part or all of these functions may be realized by a hardware circuit such as ASIC and FPGA. ASIC is an abbreviation for Application Specific Integrated Circuit. FPGA is an abbreviation for Field Programmable Gate Array.

In the present embodiment, the functions shown in FIG. 6 are realized on the PC 2. However, the invention is not limited thereto and the functions may also be realized on the PLC 1.

A project creating section 50 displays a UI for creating project data 71 on the display section 7, creates project data 71 according to a user instruction input from the operating section 8 and stores the project data 71 in the storing device 22. UI is an abbreviation for user interface. The project data 71 includes a user program, configuration information of the PLC 1, etc. A program creating section 63 creates a plurality of program components (each module) which are included in the user program based on the user operation through the UI. A function setting section 62 executes setting of the function of the basic unit 3 and the function of the expansion unit 4. For example, the function setting section 62 allocates any device to the function provided in the basic unit 3 or allocates any device to the function provided in the expansion unit 4, and writes allocation information indicating a relationship between the function and the device into the configuration information. The project creating section 50 also stores program configuration information indicating what program components are included in the user program as the project data 71. Unit configuration information indicating what units are included in the whole PLC 1 is also stored as the project data 71.

A log setting section 51 analyzes the project data 71 to extract a device described in the project data 71 and creates log setting data 72 for setting the extracted device as the logging object. The log setting section 51 has various functions. A component designating section 52 designates a program component which is the extraction object of the device according to a user instruction input from the operating section 8. In addition, the component designating section 52 designates a program component which is excluded from the extraction object of the device according to a user instruction input from the operating section 8.

A device extracting section 53 analyzes the project data 71 to extract a device described in the project data 71 and creates the log setting data 72. An adding section 54 analyzes a program component designated as the extraction object by the component designating section 52, extracts the device described in the program component and adds the device to an extraction list. A deleting section 55 analyzes a program component designated as an excluding object by the component designating section 52, extracts the device described in the program component and deletes the extracted device from the extraction list. Alternatively, the deleting section 55 adds the extracted device to an exclusion list. A merging section 56 deletes repeatedly extracted devices from the extraction list among the devices respectively extracted from a plurality of program components. A specifying section 57 detects an instruction word for a memory card in the project data 71, specifies a device which is an object of the instruction word and adds the specified device to the extraction list.

In the embodiment, after the component designating section 52 designates the program component, the adding section 54 extracts and adds a device which is the logging object by analyzing the designated program component. However, the invention is not limited thereto. For example, the adding section 54 may be configured to first analyze one or more program components included in the project data 71 to extract a device. After adding the extracted device to the extraction list, the adding section 54 may extract the device described in the program component designated by the component designating section 52 and add the device to the extraction list.

Similarly, the deleting section 55 may be configured to, after creating an extraction list by first analyzing one or more program components included in the project data 71, extract the device described in the program component designated by the component designating section 52 and delete the device from the extraction list.

Although the adding section 54 and the deleting section are separated from each other in the embodiment for convenience of explanation, it is needless to say that the two sections can be one function block.

A manual setting section 58 adds one device or a series of related devices to the extraction list according to a user instruction input through the operating section 8. An estimating section 59 estimates an influence of the recording of a device value by the PLC 1 on the execution of the user program based on the number of devices extracted as recording objects by the device extracting section 53. A delay time related to the number of devices values due to logging is added to scan time. Therefore, the estimating section 59 may obtain the delay time by multiplying the number of device values by a predetermined coefficient and display the delay time as an estimation result on the display section 7. The delay time may be referred to as a scan time extension.

A function designating section 60 designates the function of the basic unit 3 and the function of the expansion unit 4 which are extraction objects of devices according to a user instruction input from the operating section 8. The function designating section 60 also designates the function of the basic unit 3 and the function of the expansion unit 4 to be excluded from the extraction objects of devices according to the user instruction input from the operating section 8. The adding section 54 analyzes configuration information of the function designated as the extraction object by the function designating section 60, extracts the device allocated for the function according to the configuration information and adds the device to the extraction list. The deleting section 55 analyzes configuration information of the function designated as the exclusion object by the function designating section 60, extracts the device allocated for the function according to the configuration information and deletes the extracted device from the extraction list. The merging section 56 deletes repeatedly extracted devices from the extraction list among the devices respectively extracted from a plurality of functions. The specifying section 57 detects an instruction word for a memory card in the project data 71, specifies a device which is an object of the instruction word and adds the specified device to the extraction list.

A log display section 61 reads log data 73 generated in the PLC 1 via the memory card 36 and displays the log data 73 on the display section 7. For example, the log display section 61 may display a device value recorded in the log data 73 in association with the program component of the project data 71 on the display section 7. The log display section 61 is a core of an engineering tool for a programmable logic controller.

Figure 7:
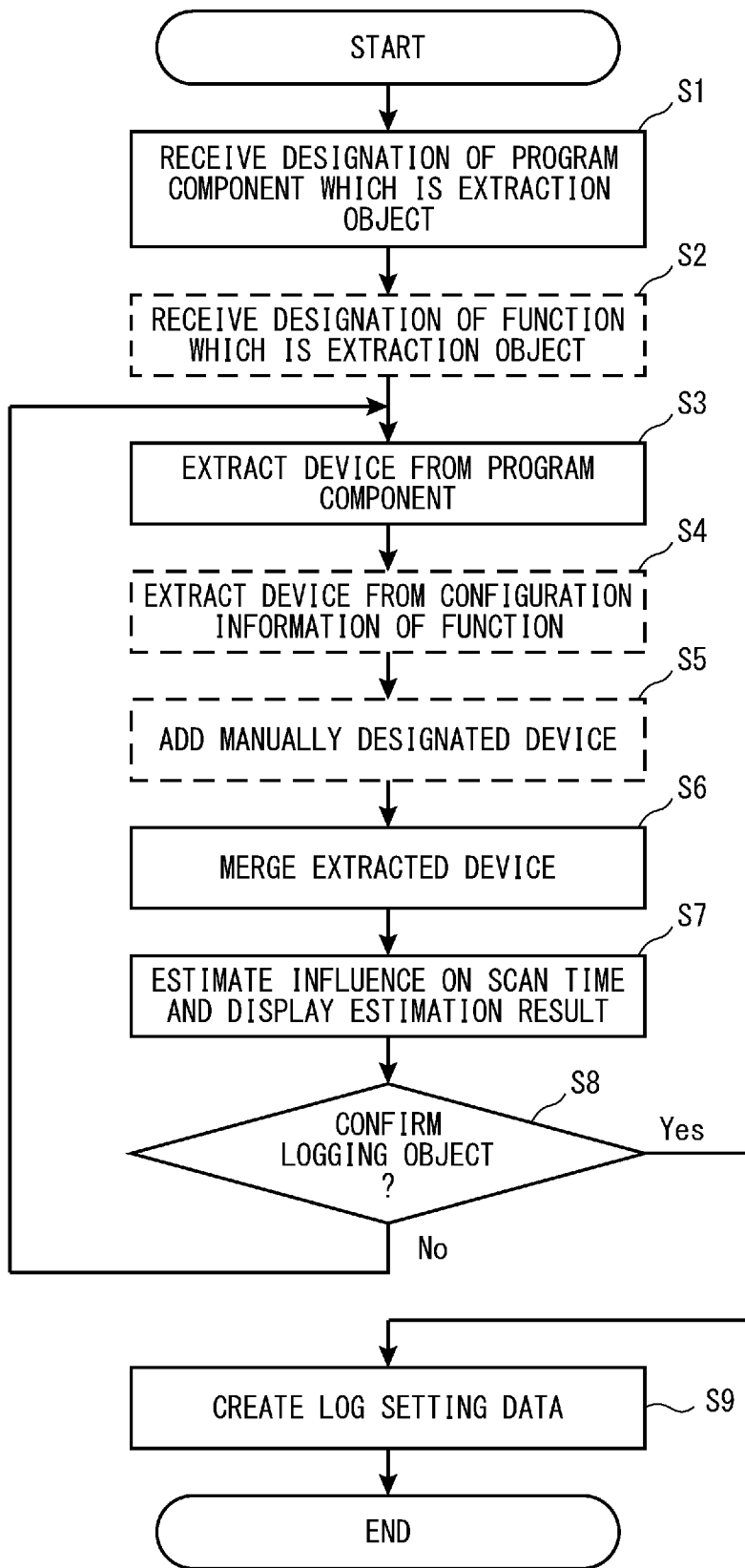
FIG. 7 is a flow chart illustrating a setting method of logging.

FIG. 7 is a flowchart showing a setting method of logging. Here, the project data 71 including the user program is already completed.

In S1, the CPU 21 (the component designating section 52) receives a designation of a program component which is an extraction object of a device.

Figure 8:
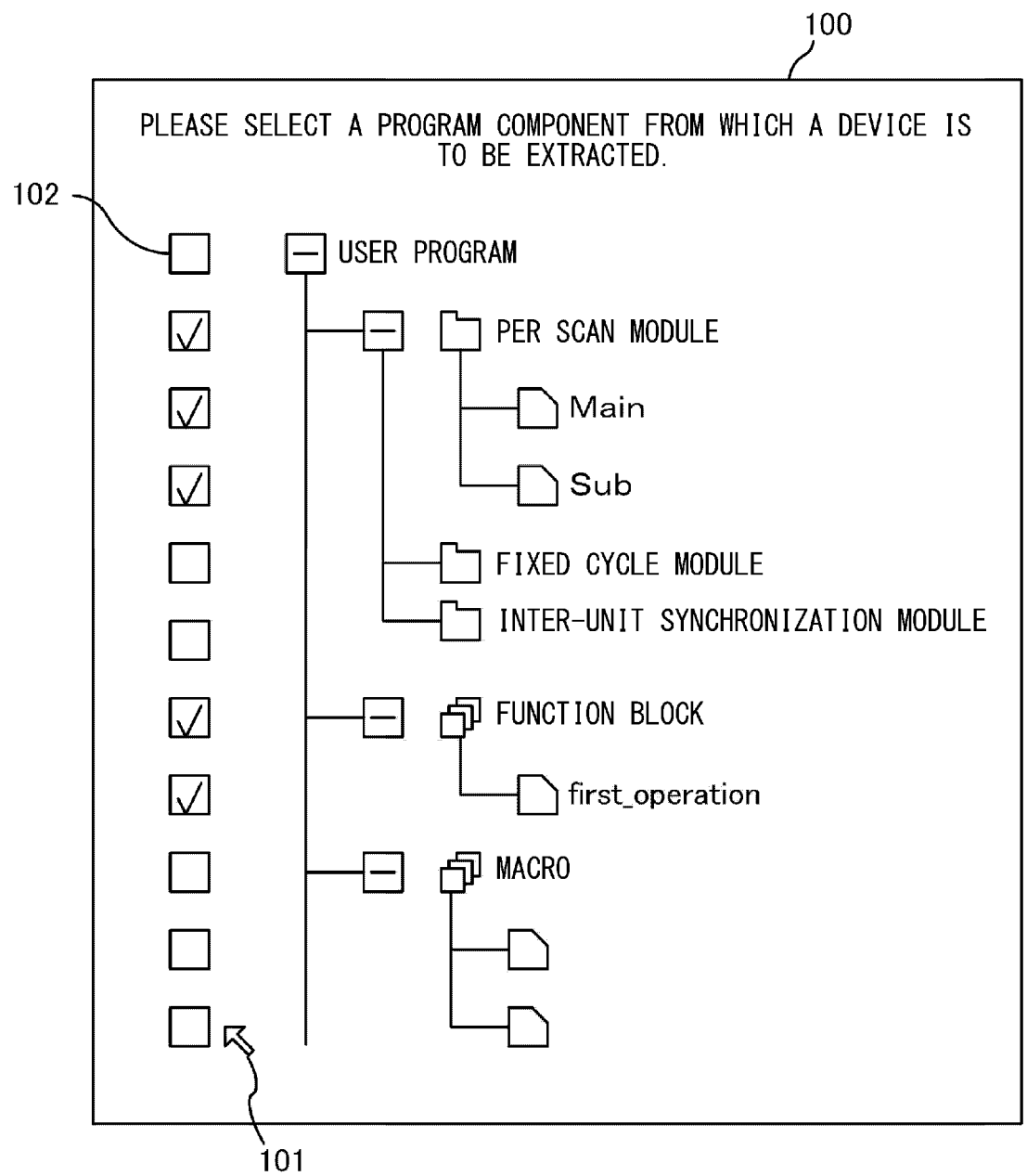
FIG. 8 is a diagram illustrating a method of selecting a program component.

FIG. 8 shows a UI 100 for receiving a selection of a program component from which a device is to be extracted. The log setting section 51 displays the UI 100 on the display section 7 when a setting program of logging is started. In the UI 100, a plurality of program components are shown in a tree form based on respective classifications (module/function block/macro). In addition, a check box 102 is displayed in association with each program component. When a pointer 101 gives a check to the check box 102 in response to the operation of the operating section 8, the adding section 54 adds to the extraction list a program component corresponding to the check box 102 which has been checked. On the other hand, when the pointer 101 removes the check of the check box 102 in response to the operation of the operating section 8, the deleting section 55 deletes (excludes) from the extraction list a program component corresponding to the check box 102 from which a check has been removed.

Each scan module in FIG. 8 is a program component which is executed one time each time the user program is scanned. In this example, every scan module has a main program and a sub module. A fixed cycle module is a program component executed every fixed cycle. An inter-unit synchronization module is a program component executed every time inter-unit synchronization is executed. Although not shown in the drawing, an initialization module is a module firstly executed when the user program is started. Therefore, the initialization module can hardly cause a trouble, and thus it may be excluded from the extraction object of the device.

Function block (FB) is called by the user program and used. Since the function blocks are called from a plurality of modules, individual instances are generated. In this case, a plurality of instances may be selected as the extraction objects of the devices, or all instances generated in association with the function block by selecting an original function block may be selected as the extraction objects of the devices.

Macro is a kind of program and there are macros for data shaping.

In S2, the CPU 21 (the function designating section 60) receives a designation of a function which is the extraction object of the device.

Figure 9:
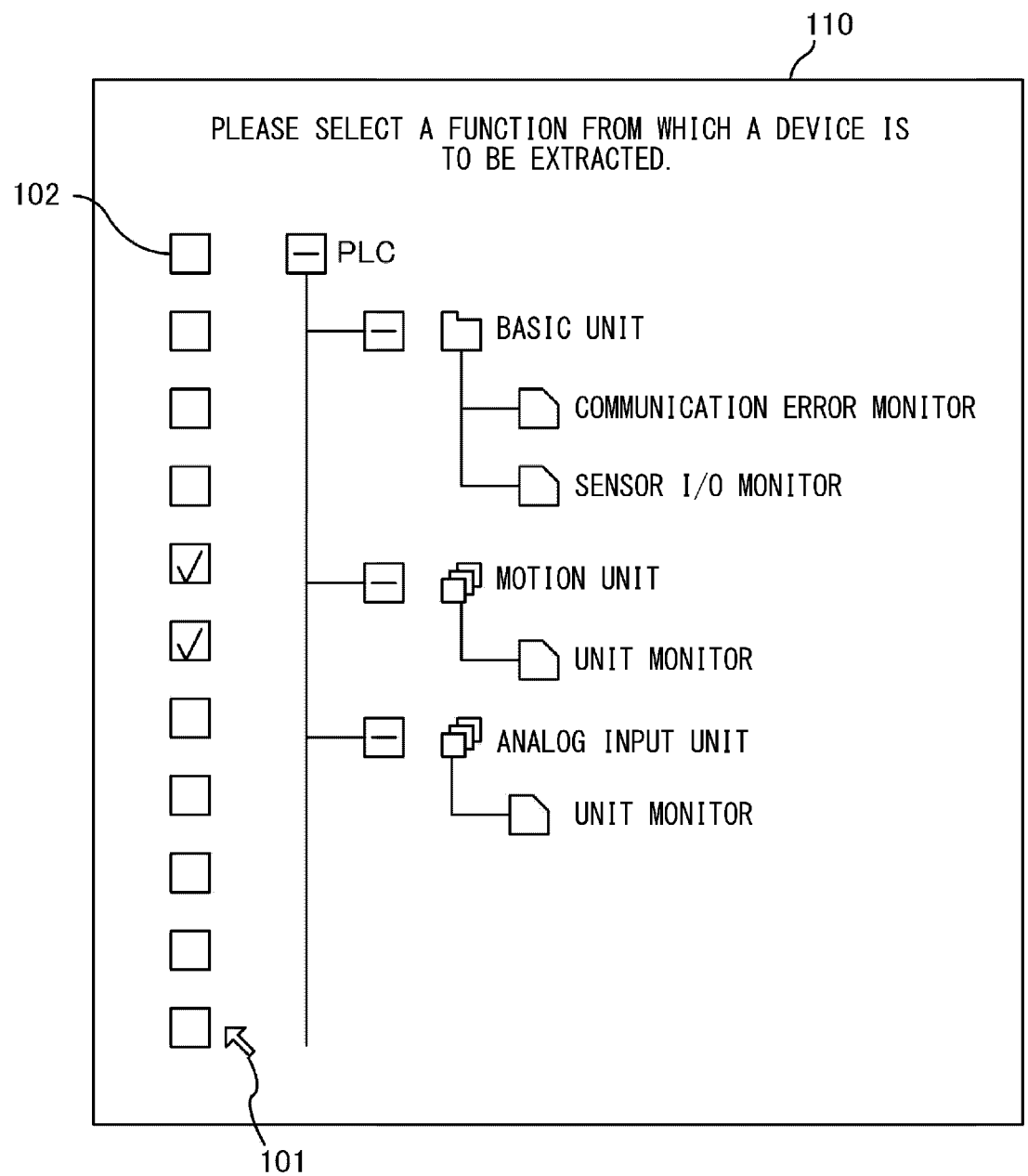
FIG. 9 is a diagram illustrating a method of selecting a function.

FIG. 9 shows a UI 110 for receiving a selection of a function from which a device is to be extracted. The log setting section 51 displays the UI 110 on the display section 7 when the setting program of logging is started. The UI 100 and the UI 110 may be displayed at the same time or may be selectively displayed according to the user's operation. In the UI 110, a plurality of functions are shown in a tree form based on units to which the functions belong. In addition, the check box 102 is displayed in association with each function. When the pointer 101 gives a check to the check box 102 in response to the operation of the operating section 8, the adding section 54 adds to the extraction list a function corresponding to the check box 102 which has been checked. On the other hand, when the pointer 101 removes the check of the check box 102 in response to the operation of the operating section 8, the deleting section 55 deletes (excludes) from the extraction list a function corresponding to the check box 102 from which a check has been removed.

In FIG. 9, a communication error monitor, which is a function of the basic unit 3, is a function of monitoring a communication error of the communicating section 33. A sensor I/O monitor is a function of monitoring input and output of a sensor. A motion unit is also called a positioning unit, and controls the position of a control object which is called an axis. Generally, there is a driving source such as a motor for each axis. An analog input unit is a unit which samples an input analog signal and converts the analog signal into a digital signal. A unit monitor is a function of monitoring an operation of the expansion unit 4 such as the motion unit and the analog input unit.

Figure 10A:
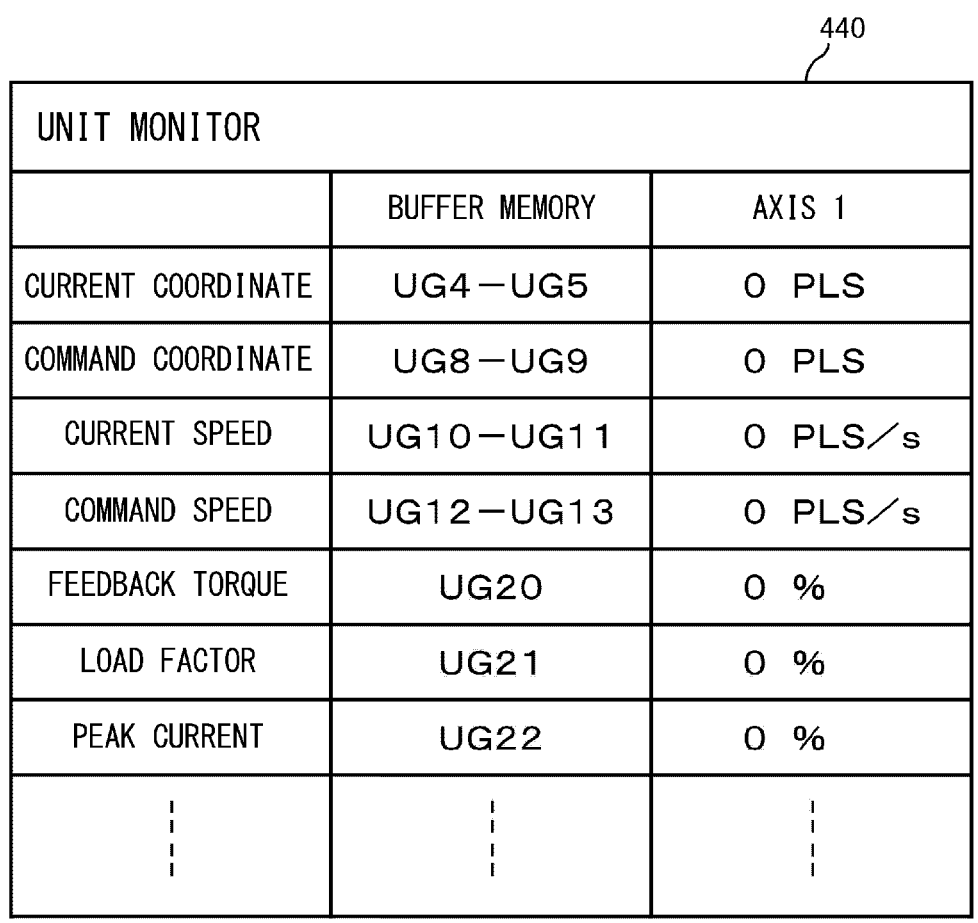
FIG. 10A is a diagram illustrating a unit monitor.
Figure 10B:
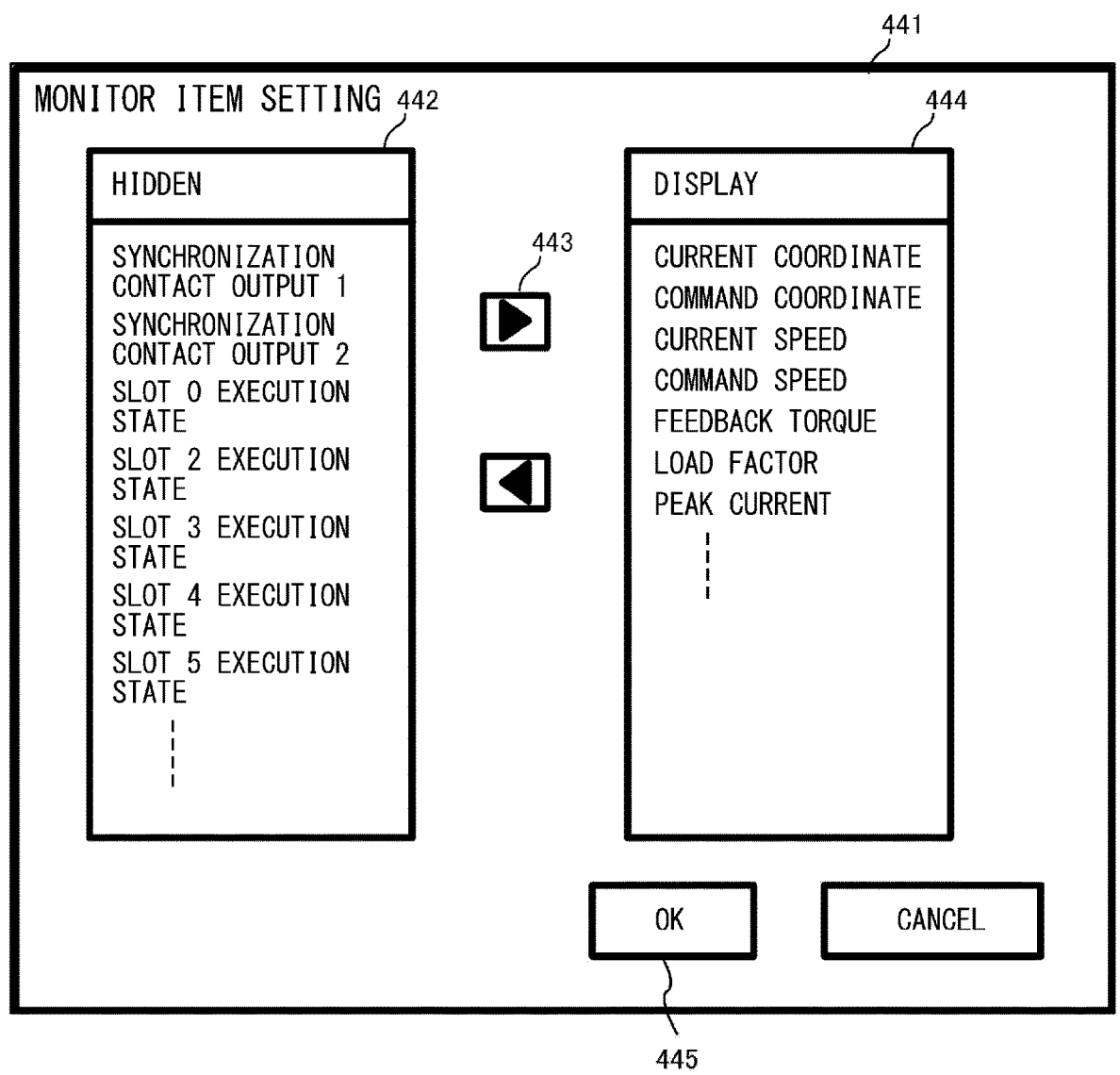
FIG. 10B is a diagram illustrating setting of a unit monitor.

Here, as an example of the unit monitor, the unit monitor of the motion unit will be further described. FIG. 10A is a schematic diagram of a screen of a unit monitor 440 for axis 1 of the motion unit. FIG. 10B is a schematic diagram of a setting screen 441 for changing an object of monitoring by the unit monitor 440.

As shown in FIG. 10A, each item, such as a current coordinate, a command coordinate, a current speed, a command speed, a feedback torque, a load factor, and a peak current, is set as an object to be monitored by the unit monitor 440. Each item is allocated a buffer memory (UG). For example, UG 4 and UG 5 are allocated to the current coordinate. In the embodiment, 16 bits are guaranteed for one UG, and two UGs are guaranteed in order to represent the current coordinate in 32 bits. As a device value of a UG, for example, it is a numeric value such as 0 PLS (pulse). Further, the command coordinate is allocated UG 8 and UG 9. Two UGs are guaranteed for the same reason as stated above (to guarantee 32-bit representation). There are also some unused UGs (UG 6 and UG 7) because a unit designer can freely allocate the UGs. Similarly, UG 10 and UG 11 are allocated to the current speed, and UG 12 and UG 13 are allocated to the command speed. In addition, in FIG. 10A, UGs are allocated to each item such as the feedback torque, the load factor, and the peak current.

As shown in FIG. 10B, the user can freely select (set) which item is to be monitored by the unit monitor 440. For example, by selecting one item from a "hidden" field 442 shown in FIG. 10B and clicking a right arrow button 443, this one item is moved to a "display" field 444 and becomes an object to be monitored by the unit monitor 440. By clicking an OK button 445, the items listed in the "display" field 444 are determined as objects to be monitored. In FIG. 10A and FIG. 10B, only the axis 1 of the motion unit has been described. However, the same applies to where there are a plurality of axis such as axis 2 and axis 3. For each axis, an item selected by the user becomes the object to be monitored.

In general, in a case of positioning a work piece by using the motion unit (the expansion unit 4a) and driving the motor (the field device 10a), the basic unit 3 sends an operation start command to the expansion unit 4a by turning on a relay device indicating a positioning start trigger of the motor. After the operation start command has been sent, a specific processing operation (positioning of the work piece) in the expansion unit 4a is not involved. In other words, the basic unit 3 does not recognize in real time the current position and the current speed of the motor one by one and there is no necessary to recognize one by one. Thereafter, when the processing operation in the expansion unit 4a is completed, the basic unit 3 recognizes the completion of the positioning of the motor as a relay device indicating a positioning completion trigger of the motor is turned on. Thus, devices (UGs) corresponding to the current coordinate and the current speed of the motor are basically not described in the ladder program (however, a special instruction word for reading only a part of UGs may be described in the ladder program by the user).

However, when a trouble occurs in the operation of the PLC, it may be necessary to grasp the current coordinate and the current speed of the motor at the time of the occurrence of the trouble in order to investigate the cause. In such a case, since the current coordinate and the current speed of the motor are basically not described in the ladder program as described above, there are many cases where the current coordinate and the current speed of the motor are not listed in the extraction list which is the logging object, and it is not easy to investigate the cause.

Therefore, in the embodiment, the user can select the unit monitor of the motion unit through the UI 110 shown in FIG.

9. As a result, as described with reference to FIG. 10B, the adding section 54 can automatically add to the extraction list the UG which is the object to be monitored by the unit monitor 440 of the motion unit. The same applies to the communication error monitor and the sensor I/O monitor of the basic unit 3, as well as the unit monitor of the analog input unit. The device or parameter which is the object to be monitored by each monitor can be automatically added to the extraction list.

Although other monitors are not shown in the drawing, they will be described briefly. The communication error monitor, as a function of the basic unit 3, monitors a device allocated for an open timeout error of a cyclic communication, for example. The sensor I/O monitor monitoring the input and output of the sensor monitors, for example, a device allocated for an output or presence/absence of an error of one or more sensors. The unit monitor of the analog input unit monitors, for example, a device (DM or R) allocated for various parameters such as AD conversion data, special data, an offset value, a zero shift, a peak value, and a bottom value. These devices are allocated as default (initial settings) in advance by the unit designer. However, the objects to be monitored may be changed by the user as in the unit monitor of the motion unit described above. In short, the UI 110 shown in FIG. 9 is a setting screen capable of receiving a function selection input from the user. Then, a template (setting information) where the monitor items to be displayed on the display section (monitor) have been decided is associated with every function to be selected and input (the template is saved in the memory). The device specified by the template may be a device allocated by default in advance as described above or a device after addition/deletion (editing) by the user via the setting screen. When one or more functions are selected based on the user's operation, the function designating section 60 adds to the extraction list the device which is the object to be monitored according to the template corresponding to the function.

In S3, the device extracting section 53 analyzes the program component designated by the component designating section 52 and extracts the device described in the designated program component.

FIG. 10C shows an example of devices extracted from the program components designated among a plurality of program components included in the project data 71. FIG. 10C shows the names of the program components from which devices are extracted, names of heading devices (device numbers), the number of devices extracted based on the heading devices, and device names actually extracted as logging objects. In general, a number of devices corresponding to a designated number are extracted based on the heading devices. However, there may be cases where a number of devices exceeding the designated number are extracted. R34000 is a relay device and is a device holding one-bit information. However, a series of 16 devices, i.e., R34000 to R34015, are extracted. This is because logging together 16-bit devices is advantageous in terms of data processing speed. In FIG. 10C, the number of R34000 is "1", which indicates one word (16 bits). The number of CR4001 is also "1", and this also indicates one word (16 bits of CR4001, CR4002, . . . , CR4015, CR4100). Global means a device commonly used by a plurality of program components. Main indicates a main program. First operation is a name of a function block. Sub indicates a sub program (sub module).

In S4, the device extracting section 53 analyzes the configuration information of the function designated by the function designating section 60 and extracts the device associated with the function in the configuration information.

FIG. 11 shows an example of devices extracted from the functions (units) designated among a plurality of functions (the basic unit 3 and the expansion unit 4) included in the PLC 1. In this example, several buffer memories (UGs) are extracted from the motion unit designated by the function designating section 60. FIG. 11 shows the names of the functions from which devices are extracted, names of heading devices (device numbers), the number of devices extracted based on the heading devices, and device names actually extracted as logging objects. Here, devices which can be monitored by the unit monitor of the motion unit are extracted. That is, as described above with reference to FIG. 10A, UG 4 to UG 5 indicate the current coordinate of the motor, UG 8 to UG 9 indicate the command coordinate of the motor, UG 10 to UG 11 indicate the current speed of the motor, and UG 12 to UG 13 indicate the command speed of the motor. Description of other UGs is omitted.

In S5, the manual setting section 58 adds a device manually designated by the user to the extraction list through the operating section 8. For example, the manual setting section 58 may display on the display section 7 a UI where the device numbers and the like can be directly input and may assist the designation of devices by the user.

In S6, the merging section 56 merges a device extracted from a program component, a device extracted from a function, and a manually added device to create a logging object list. The logging object list may be referred to as a device list.

Figure 12:
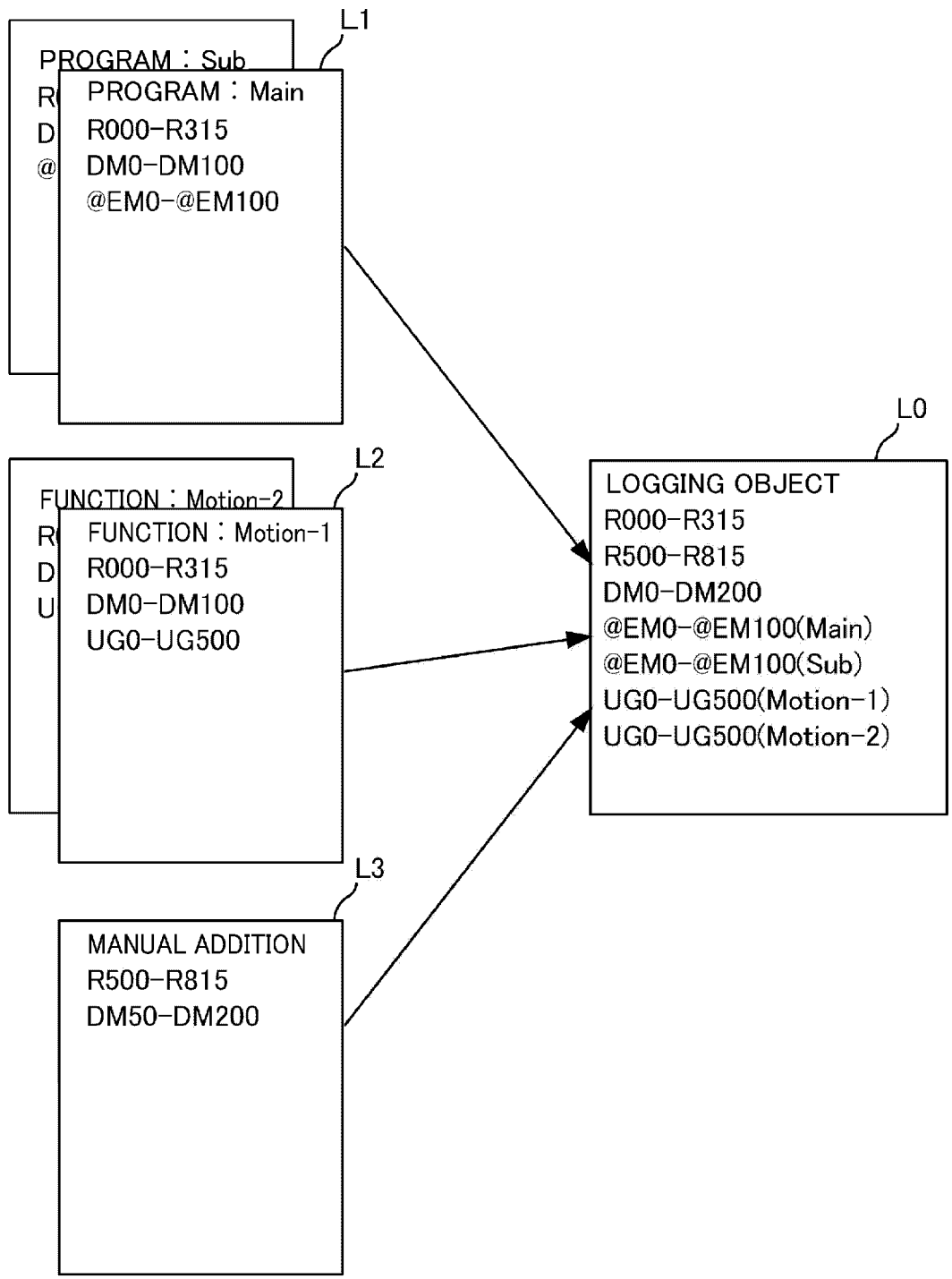
FIG. 12 is a diagram illustrating merging of an extraction list.

FIG. 12 is a diagram explaining a concept of merging processing. The device extracting section 53 creates an extraction list L1 in which a device extracted from a program component is described. The device extracting section 53 creates an extraction list L2 in which a device extracted from a function is described. The device extracting section 53 creates an extraction list L3 in which a device manually added by the user is described. The merging section 56 merges the extraction lists L1 to L3 to create a logging object list L0. There may be repeatedly extracted devices in the extraction lists L1 to L3. Log data is enlarged when the same device is logged over and over. Therefore, merging processing is performed to avoid repeated logging of the same device. For example, data memories DM 0 to DM 100, which are a kind of devices, are registered in the extraction list L1. Data memories DM 50 to DM 200 are registered in the extraction list L3. That is, DM 50 to DM 100 are repeated. The merging section 56 merges DM 0 to DM 100 and DM 50 to DM 200 and describes DM 0 to DM 200 in the logging object list L0.

In S7, the estimating section 59 analyzes the logging object list L0, estimates an influence on a scan time, and displays an estimation result on the display section 7.

Figure 13:
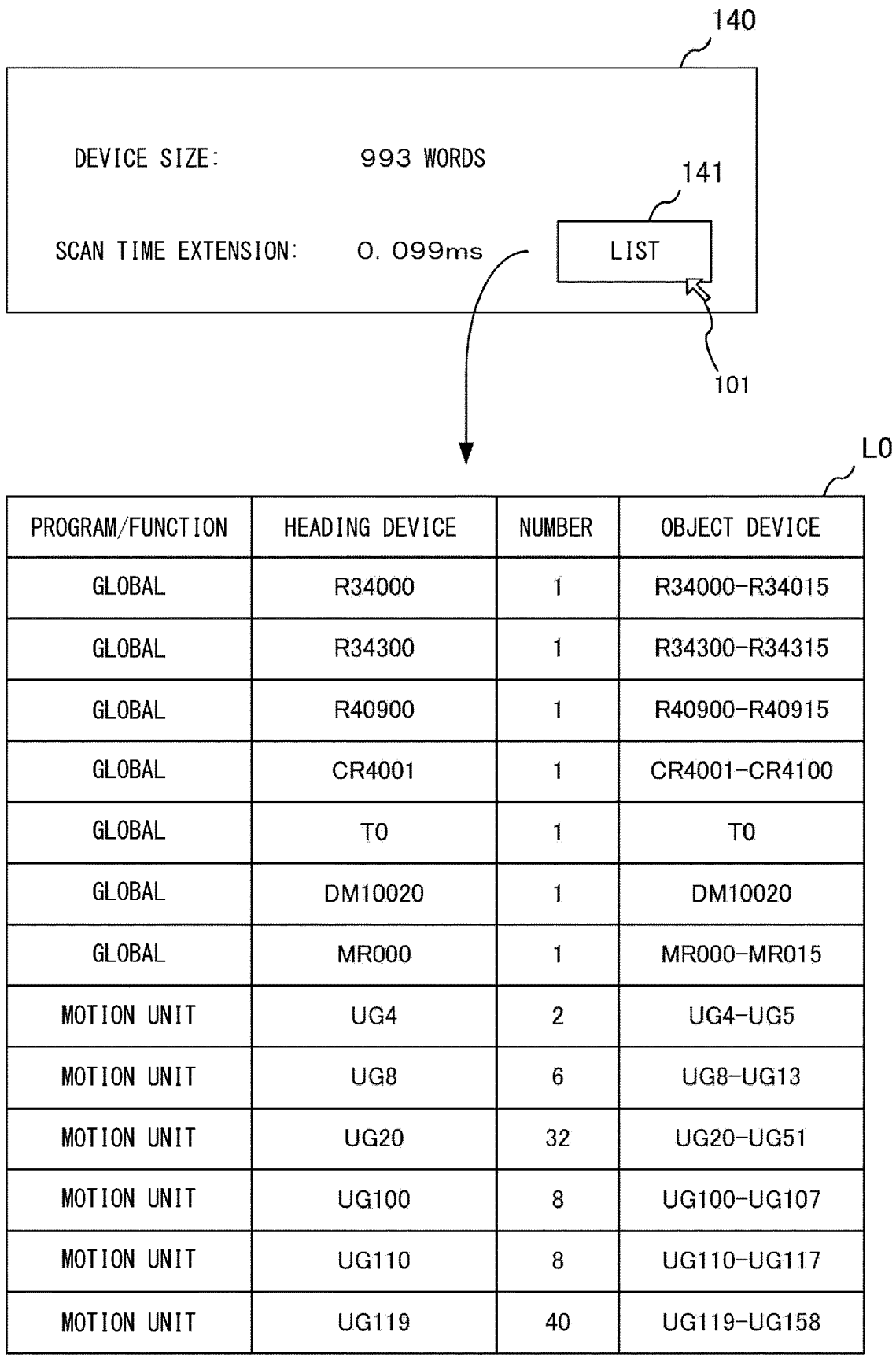
FIG. 13 is a diagram illustrating an estimation result of influence on scan time.

FIG. 13 shows a UI 140 for displaying the estimation result. The UI 140 displays a device size and a scan time extension. The device size indicates a total size of the device described in the logging object list L0. The scan time extension is a delay time generated due to logging. The estimating section 59 analyzes the logging object list L0 and computes the device size and the scan time extension. When a list button 141 is operated through the operating section 8, the estimating section 59 may display the logging object list L0 on the display section 7. The user considers the estimation result and determines whether to determine or adjust the logging object list L0. When the logging object list L0 is determined, the user may operate a button indicating an intention of determination via the pointer 101.

In S8, the log setting section 51 determines whether the logging object is to be determined or not. For example, when a button for determining the logging object list L0 is operated, the log setting section 51 determines that the logging object is to be determined. On the other hand, when a button for revising the logging object list L0 is operated, the log setting section 51 determines that the logging object is to be revised. When the logging object is to be revised, the log setting section 51 repeats S3 to S8 to accept addition and deletion of program components and functions which are extraction objects of the devices and to revise the logging object list L0. For example, when the scan time extension exceeds an allowable threshold, several devices are deleted. When the scan time extension is less than the allowable threshold, several devices may be added. When the logging object is determined, the CPU 21 proceeds to S9.

In S9, the log setting section 51 creates the log setting data 72 including the logging object list L0 and stores the log setting data 72 in the storing device 22. The CPU 21 controls the communicating section 23 to transmit the log setting data 72 together with the project data 71 to the basic unit 3.

Here mainly the devices such as data memories and buffer memories are the logging objects. However, an operation state and a function setting state (e.g., IP address, etc.) of each function may be added as the logging object.

Figure 14:
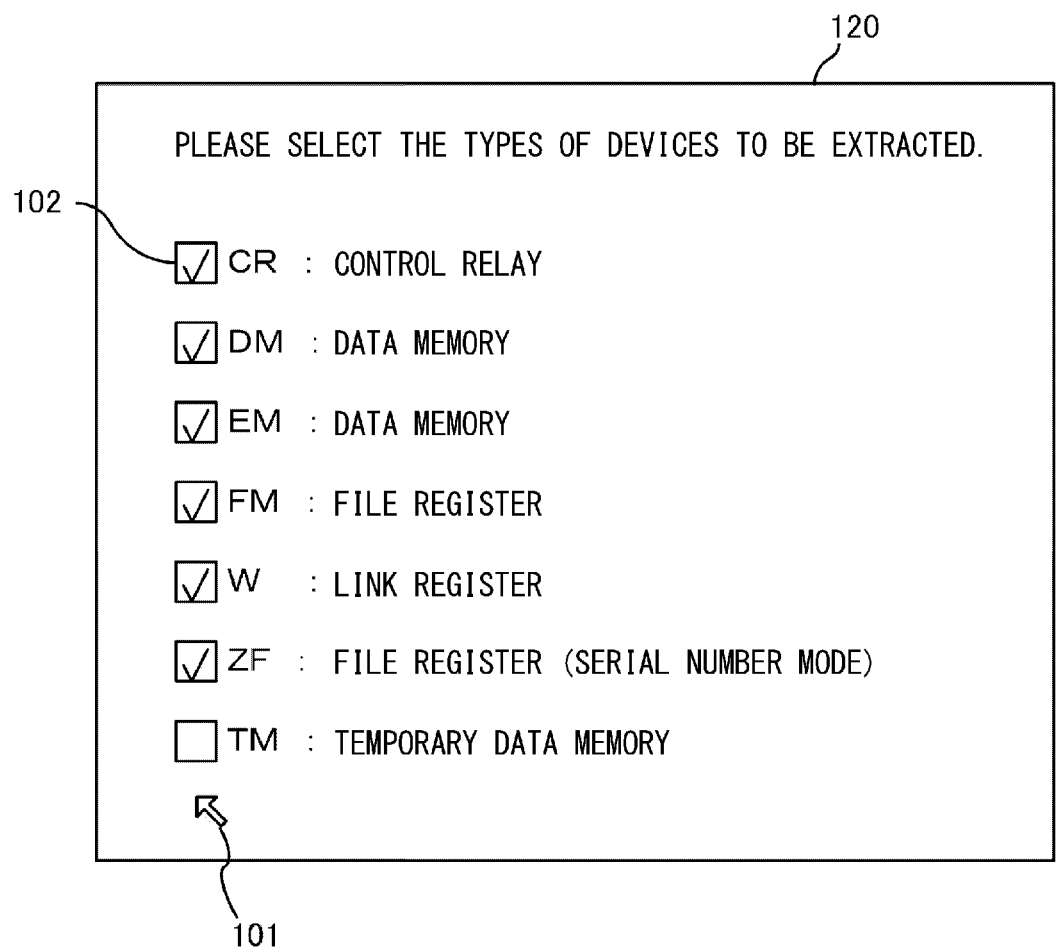
FIG. 14 is a diagram illustrating a selection UI of device types.

FIG. 14 shows a setting UI 120 of a filter used in the device extraction processing. There area plurality of types of devices in the devices related to the PLC 1. The user may want to focus on a specific type of devices and ignore other types of devices. Therefore, the log setting section 51 may display the setting UI 120 of a filter on the display section 7 and receive the types of devices to be extracted and the types of devices to be excluded through the check boxes 102. For example, the device extracting unit 53 extracts the types of devices whose check boxes 102 have been checked from the program components and functions. The device extracting section 53 does not extract the types of devices from whose check boxes 102 the checks are removed from the program components and functions. As a result, it becomes possible to select devices to be logging objects according to the user's intention.

The CPU 21 may again execute the device extraction processing when the project data 71 is changed by the project creating section 50. This is because there is a possibility that a description of a device in the user program is changed. The CPU 21 may execute the device extraction processing when the project creating section 50 executes the transfer of the project data 71. Since the project data 71 is finally written to the PLC 1, the number of times of executing the device extraction processing will be reduced by executing the device extraction processing taking this writing as a trigger.

Although the device extracting section 53 is mounted on the PC 2, it may also be mounted on the basic unit 3. A CPU 31 extracts a device from the program components and functions designated by the PC 2 among the project data 71, and creates the log setting data 72. In this case, the estimating section 59 will also be mounted on the basic unit 3.

Device Extraction Processing

Figure 15:
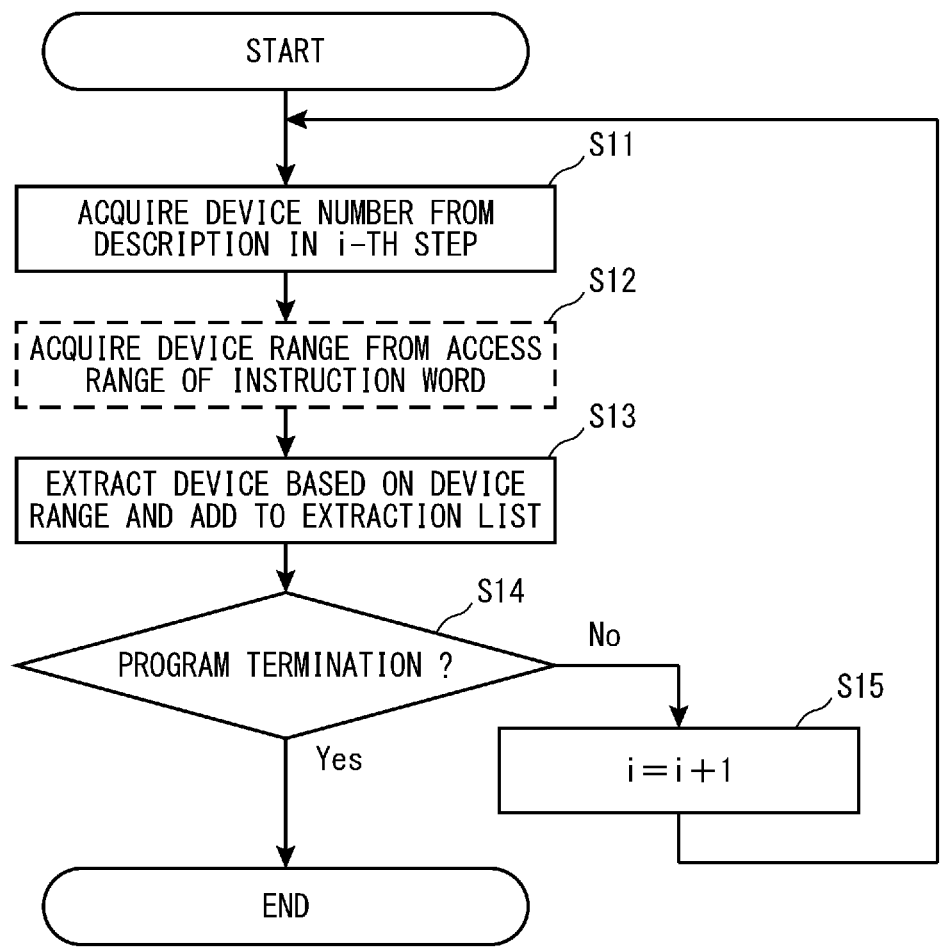
FIG. 15 is a flow chart showing a method of extracting a device.
Figure 16:
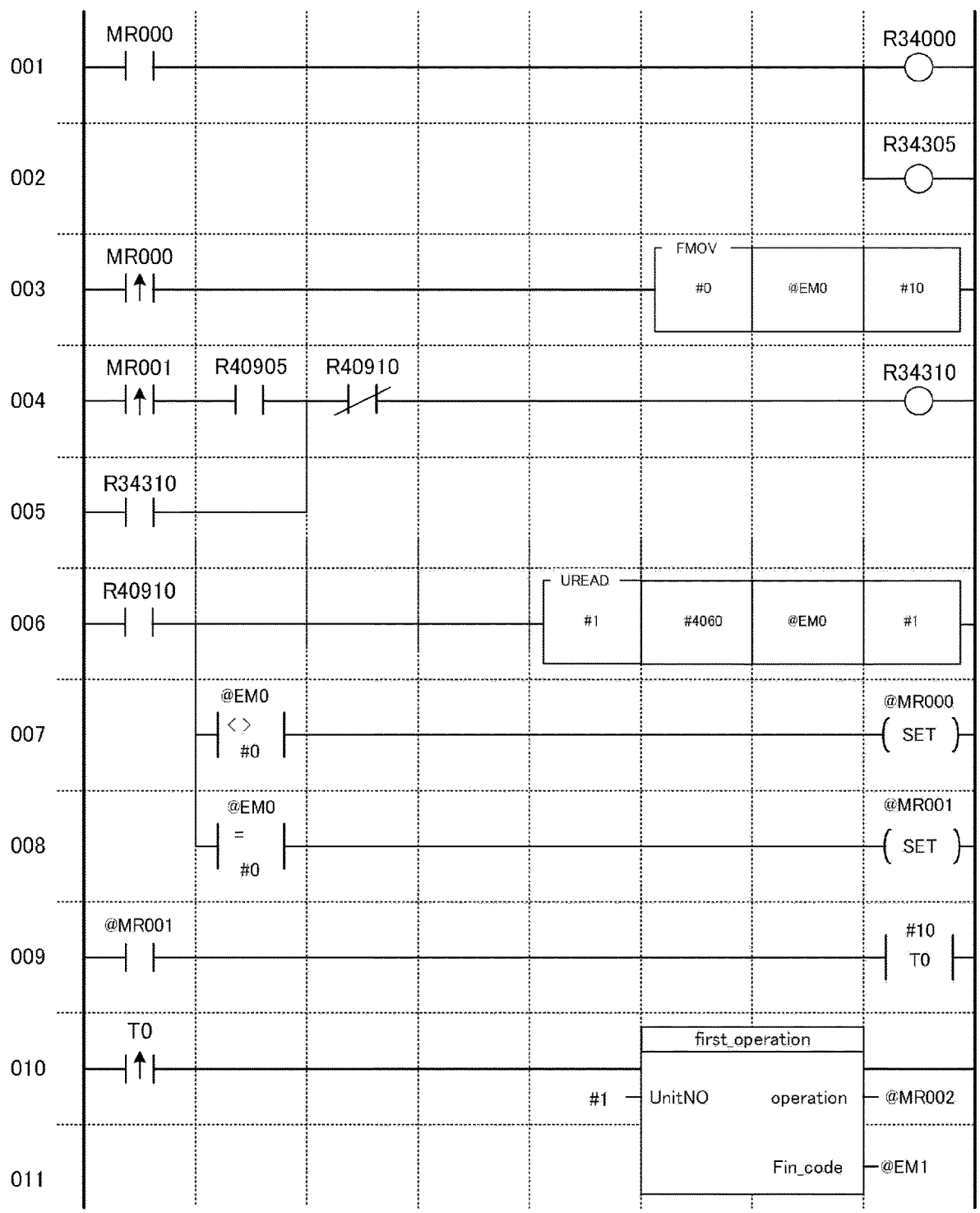
FIG. 16 is a diagram showing an example of a user program.

FIG. 15 is a flow chart showing device extraction processing from the program components executed by the device extracting section 53. FIG. 16 shows an example of a ladder program. The ladder program is for controlling the motion unit which drives four axes as the expansion units 4.

In S11, the device extracting section 53 acquires a device number from a description in the i-th step of a program component designated as an extraction object. The initial value of i is 001. As shown in FIG. 16, step numbers are given at the left end of the ladder program. In step 001, it is described that when a relay device called MR000 is turned on, a relay device called R34000 which gives an operation permission to the motion unit is turned on and a relay device called R34305 for activating a servo of the first axis of the motion unit is turned on. Accordingly, the device extracting section 53 extracts MR000, R34000 and R34305 as device numbers. The device numbers may be described by indirect reference or index reference. In this case, the device extracting section 53 searches a program to which an indirect reference destination or an index value is assigned and specifies an actual device number. When the device extracting section 53 fails to extract the actual device number, a message indicating the extraction failure may be displayed on the display section 7. Further, the device extracting section 53 may display on the display section 7 a UI for the user to input the actual device number and accept the user input. Moreover, considering the aforementioned indirect reference and index reference, the device extracting section 53 does not only extract a specific device directly described in the program, but also extracts a specific device (a device and the like specified by indirect reference or index reference) used in the program.

In S12, the device extracting section 53 acquires the device range from the access range of the instruction word. Depending on the instruction word, the device number of the heading device and the number of devices based on the head device may be used as arguments. For example, it is described that when the relay device MR000 is turned on in step 003, an instruction word called FMOV is executed. In this example, FMOV is an instruction word for assigning a designated value (0) to a designated number (10) of devices based on the heading device (@EM0) (an instruction word for initializing an associated device). That is, the access range is defined by the heading device and the designated number. The device extracting section 53 defines the range from @EM0 to @EM9 as the device range. The access range may also be described by indirect reference or index reference. In this case, the device extracting section 53 searches a program to which an indirect reference destination or an index value is assigned and specifies an actual access range. When the device extracting section 53 fails to extract the actual access range, a message indicating the extraction failure may be displayed on the display section 7. Further, the device extracting section 53 may display on the display section 7 a UI for the user to input the actual access range and accept the user input.

In S13, the device extracting section 53 extracts a device based on the heading device number and the device range, and adds the extracted device to the extraction list. For example, MR000, R34000 and R34005 are extracted from step 001 and are added to the extraction list. @EM0 to @EM9 are extracted from step 003 and are added to the extraction list.

In S14, the device extracting section 53 determines whether the analysis of the device has ended till the program termination regarding the designated program component. The device extracting section 53 proceeds to S15 when the analysis of the device has not ended till the program termination. In S15, the device extracting section 53 adds 1 to a variable i and returns to S11. The device extracting section 53 ends the device extraction processing when the analysis of the device has not ended till the program termination.

In the ladder program shown in FIG. 16, devices extracted from step 004 and thereafter will be briefly described below.

Steps 004 and 005 are origin return requests of the motor, and R34310 is a relay device indicating a start trigger of origin return of the motor. From this step, devices of MR001, R34310, R40905, R40910, and R34310 are extracted.

Steps 006 to 008 are processing of, when the origin return of the motor has been completed, reading an origin return completion code from the motion unit and determining whether the origin return is completed correctly or not. To be more specific, R40910 is a relay device indicating an origin return completion trigger of the motor. The basic unit 3 determines whether the origin return has been completed by monitoring whether the flag R40910 has been turned on without recognizing one by one the specific processing operations of the origin return in the motion unit in real time. When the flag R40910 is turned on, a UREAD instruction for directly reading the buffer memory is executed. The UREAD instruction shown in FIG. 16 is an instruction for reading the buffer memory of No. 4060 in the unit of unit No. 1 and assigning one word to the device @EM0. Here, the origin return completion code is stored in the buffer memory of No. 4060; when the origin return has ended normally, 0 is stored, and when the origin return has ended abnormally, a numeric value other than 0 (1, 2, etc.) is stored. As shown in step 007, when the device value of @EM0 is other than 0, the basic unit 3 sets the device MR000 and recognizes that the origin return has ended abnormally. On the other hand, as shown in step 008, when the device value of @EM0 is 0, the basic unit 3 sets the device MR001 and recognizes that the origin return has ended normally. From this step, devices of R40910, @EM0, @MR000, and @MR001 are extracted.

Step 009 is a processing of waiting for only one second when the origin return has ended normally. A device T0 has a set value of 10 (equivalent to one second because the unit is 100 ms) and has a current count value, and the device T0 is turned on when the count value becomes the set value. From this step, devices of MR001 and T0 are extracted.

Finally, in steps 010 to 011, when the device T0 is turned on, a function block "First operation" is executed with regard to the unit of No. 1. Then, the execution result is stored in @MR002 and a completion code is stored in @EM1. From this step, devices of @MR002 and @EM1 are extracted.

As described above with reference to FIG. 16, a general ladder program describes only a device in response to an operation start or a device in response to an operation completion such as turning on the servo of the axis, a request for origin return, the activation and result of the function block, etc. However, when there is information of a state (current coordinate or current position of the motor) in the course of an operation at the time a trouble occurs, it is useful to investigate the cause. Therefore, as described above, the UG which is an object to be monitored by the unit monitor is also automatically added to the extraction list.

The extraction processing is executed for each of the designated program components.

Execution of Logging

Figure 17:
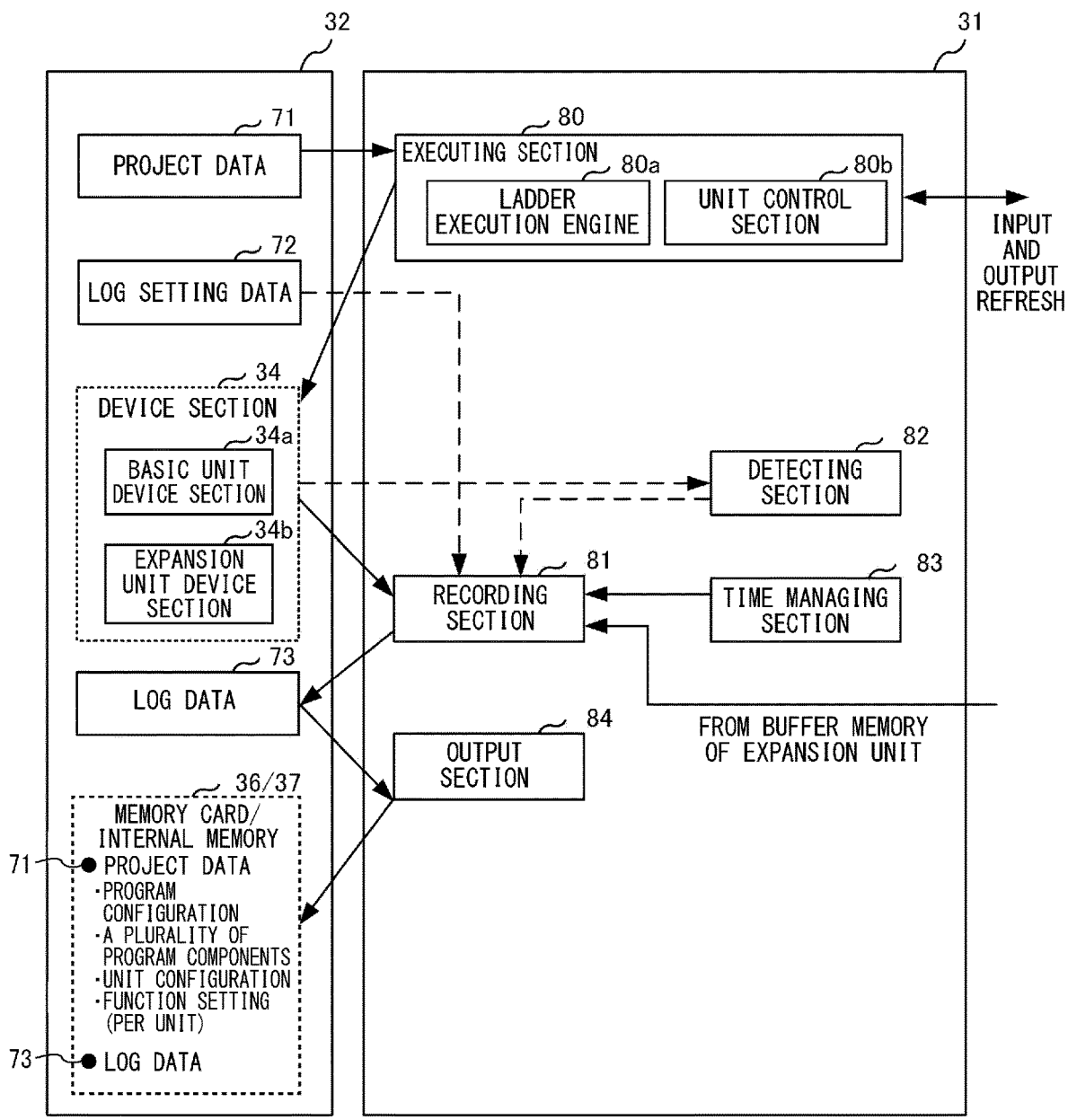
FIG. 17 is a diagram illustrating a function of a basic unit.

FIG. 17 shows the functions of CPU 31 of the basic unit 3. Part or all of the functions may be realized by a hardware circuit such as ASIC and FPGA. ASIC is an abbreviation for Application Specific Integrated Circuit. FPGA is an abbreviation for Field Programmable Gate Array.

The CPU 31 stores the project data 71 and the log setting data 72 received from the PC 2 in the storing device 32. An executing section 80 has a ladder execution engine 80a which repeatedly executes the user program, and a unit control section 80b which controls the ladder execution engine 80a or executes input and output refresh with the expansion unit 4. The ladder execution engine 80a of the executing section 80 repeatedly executes the user program included in the project data 71 and controls the expansion unit 4 according to the user program. The ladder execution engine 80a of the executing section 80 writes a device value into a device of an output system held in a basic unit device section 34a of the device section 34 or reads a device value from a device of an input system held in the basic unit device section 34a according to the user program.

On the other hand, the unit control section 80b of the executing section 80 reads and writes a device value related to the expansion unit acquired by input and output refresh into an expansion unit device section 34b. The basic unit and the expansion unit are electrically connected by a unit internal bus, and the unit control section 80b has a function of performing communication control in the unit internal bus, that is, a function as a bus master. When the unit control section 80b functions as a bus master, refresh communication is performed with each expansion unit based on the unit configuration information described with reference to FIG. 6, that is, information indicating what units constitute the whole PLC 1.

A recording section 81 acquires a device value from the device section 34 (the basic unit device section 34a or the expansion unit device section 34b) according to the log setting data 72 or acquires a device value from the buffer memory of the expansion unit 4 to write the device value as the log data 73 into a memory (for example, ring buffer). As described above, the recording section 81 executes the logging processing in the END processing, etc.

The logging processing in the END processing will be described in detail. As described with reference to FIG. 10C and FIG. 11, the log setting data 72 includes a device described in the program component designated by the component designating section 52 and a device allocated for the function designated by the function designating section 60 (for example, an object to be monitored by the unit monitor) as the logging objects. The former device is written to the log data 73 during the END processing, while for the latter device, the device value of the device which is the object (UG) is read from the expansion unit 4 and is written to the log data 73 during the END processing.

Here, the updating cycle (so-called control cycle) of the current coordinate or the command coordinate of the motor is remarkably shorter than the scan cycle of the ladder program. Therefore, in the embodiment, the device value of the UG is read in synchronization with the scan cycle, and thus not all the current coordinates and command coordinates are written into the log data 73. However, the invention is not limited thereto. For example, it may be configured such that a current coordinate and a command coordinate are stored in the memory of the expansion unit 4 for each control cycle and a plurality of current coordinates and command coordinates, etc., which have been stored so far, are read at the timing of the scan cycle.

The recording section 81 adds time information held by a time managing section 83 to each record of the log data 73. In this way, device values are arranged in the log data 73 in time series.

The device which is the logging object is basically designated by the logging object list L0 of the log setting data 72. However, an additional device may be designated by a detecting section 82. The detecting section 82 may, for example, detect rewriting of a device value from an external apparatus to any device included in the device section 34. Generally the device value is rewritten according to the user program, and it may be rewritten by an external apparatus. Such rewriting cannot be grasped in advance by only analyzing the user program. The recording section 81 may add the device of which rewriting of the device value has been detected by the detecting section 82 to the logging object. In general, rewriting of a device value from an external apparatus is likely to be a cause of an unexpected event to the user. Therefore, the recording section 81 may be useful for improving the program by the user by logging the device value rewritten by the external apparatus.

In the END processing, a UG reading instruction issued unrelated to the user program may be issued. The UG is a device type indicating a buffer memory. The detecting section 82 may detect the UG reading instruction issued unrelated to the user program. The recording section 81 may specify the buffer memory which is the object of the UG reading instruction detected by the detecting section 82 and add the specified buffer memory to a recording object. When the expansion unit 4 is a motion unit, a torque value, a current coordinate position and the like are stored in the buffer memory.

The detecting section 82 may be realized by an FPGA, etc. The executing section 80 may be realized by an ASIC. In this case, the executing section 80 designates an address of a device which is an object to be read/written using an address line with respect to the storing device 32. Therefore, the detecting section 82 may monitor the address line to dynamically detect a device of which the device value has been updated. This may be useful when a device which is not described in the user program is added as a recording object.

The detecting section 82 may be provided in the executing section 80. In this case, the executing section 80 may write a device value with respect to a specific device of the device section 34 and write the device value and the device name (device number) into the log data 73. This method is useful when a dynamically allocated device, which is a device not described in the user program, is added as a recording object.

Thus, the recording section 81 may record a device unrelated to a device list included in the log setting data 72. In an extreme case, the user can acquire the log data 73 without creating the log setting data 72. For example, when the executing section 80 is started, the executing section 80 acquires device values from all devices in the device section 34. Since the detecting section 82 monitors the devices, the detecting section 82 detects that the executing section 80 has read the device values and transmits information (address information) of the devices of which the device values have been read to the recording section 81. The recording section 81 reads the device values from all the devices included in the device section 34 based on the address information transmitted by the detecting section 82 and writes the device values into the log data 73. Thereafter, the recording section 81 logs the device value each time the detecting section 82 detects an access to the device section 34.

The recording section 81 may also write the device value into the log data 73 for each scan cycle or for each predetermined collecting cycle. For example, even if the detecting section 82 detects a plurality of accesses to the devices within one cycle, the recording section 81 may write only the device value at the time the last access is detected into the log data 73. As a result, it is possible to reduce the data size of the log data 73.

The executing section 80 may have a cache which holds a device. In this case, the detecting section 82 may detect the writing of the device by monitoring the cache.

The log setting data 72 includes a device list indicating a device which is a recording object. However, the log setting data 72 may also include a device list indicating a device which is an object to be excluded from recording. In this case, when the detecting section 82 detects an access to a device which is an excluding object, the recording section 81 skips recording of the device value of the device.

The detecting section 82 may detect an access to the buffer memory of the expansion unit 4 by the executing section 80. In this case, the executing section 80 writes the device value read from the buffer memory of the expansion unit 4 into a buffer and the like guaranteed into the storing device 32. The recording section 81 reads the device value from the buffer and writes the device value into the log data 73.

The executing section 80 repeatedly executes the user program and rewrites the device value according to the user program. In a case where the detecting section 82 is mounted on the executing section 80, when the executing section 80 detects an instruction word of rewriting the device value, the executing section 80 outputs the device value together with the instruction word to the recording section 81. The recording section 81 may write the instruction word, the device value, and a time stamp (time at which the device value is acquired) into the log data 73.

The log setting data 72 may include a data format (e.g., a binary format or a text format) of the log data 73. As the data format, a decimal number of 16 bits, a decimal number of 32 bits, a ±decimal number of 16 bits, a ±decimal number of 32 bits, a hexadecimal number of 16 bits, a hexadecimal number of 32 bits, a character string, Float, Double Float, etc. may be set per device. Such a data format can be discriminated by analyzing an instruction word in a program component.

When a predetermined output condition is satisfied, for example, when the execution of the user program is ended, or a saving trigger relay to the memory card is turned on, an output section 84 writes the project data 71, the log data 73, and image data into the memory card 36. The log data 73 is kept being recorded in a memory (for example, a ring buffer) until the predetermined output condition is satisfied, and when the capacity is full, the oldest log data 73 is erased and new log data 73 is kept being additionally recorded (recorded in a so-called FIFO format). The memory card 36 is removed from the basic unit 3 and is mounted on a mounting section of the PC 2. In this way, the log data 73 is displayed on the display section 7 of the PC 2. The output section 84 may transmit the log data 73 to the PC 2 or a cloud, etc. via the communicating section 33.

In the embodiment, the log data 73, etc. is written into the memory card 36 when the predetermined output condition is satisfied. However, the invention is not limited thereto, and the log data 73 and the like may be saved in an internal memory 37 (nonvolatile memory such as flash memory and hard disk), for example. In addition, at least for the log data 73, it is necessary to save the log data 73 in the memory card 36 or the internal memory 37 when the predetermined output condition is satisfied. On the other hand, for the project data 71, it is not limited to save the project data 71 when the predetermined output condition is satisfied. For example, the project data 71 may be saved in the memory card 36 or the internal memory 37 in advance at the timing when the PLC 1 enters an operation mode (RUN mode) from a setting mode (PROGRAM mode).

Creation of Configuration Information

Figure 18:
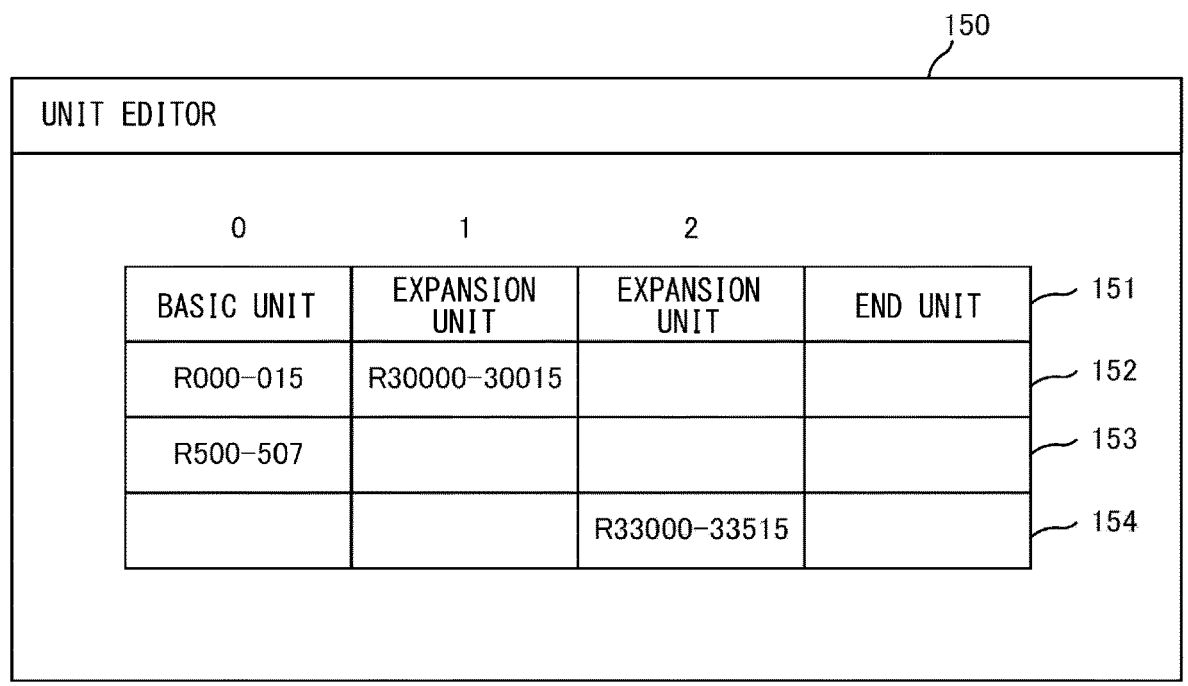
FIG. 18 is a diagram illustrating creation processing of configuration information.

FIG. 18 is a diagram explaining creation processing (unit setting) of configuration information executed by the function setting section 62. The function setting section 62 may be referred to as a unit editor. The function setting section 62 displays a unit setting UI 150 on the display section 7 when the activation of the unit editor is supported. A name field 151 is a field displaying the name of each unit (e.g., model number, etc.). A unit number is automatically given to each unit. In this example, "0" is given to the basic unit 3 as the unit number. An input region field 152 is a field for allocating a device of the input system. In this example, devices from R000 to R015 are allocated to the basic unit 3 as devices of the input system. An output region field 153 is a field for allocating a device of the output system. In this example, devices from R500 to R507 are allocated to the basic unit 3 as devices of the output system. An occupied region field 154 is a field for allocating a device of an input and output mixed system. An end unit is a so-called termination unit. The user sets the type of the expansion unit 4, connection orders, and allocated devices through the operating section 8. The function setting section 62 stores information indicating the type of the expansion unit 4, the connection orders (unit numbers), and devices allocated respectively to the basic unit 3 and the expansion unit 4 in the configuration information. The configuration information may be referred to as unit setting information. Although a device is allocated per unit here, a device may be allocated per function of each unit. The function setting section 62 manages the configuration information as part of the project data 71.

As a result, the configuration information includes information indicating a device allocated to each unit and information indicating a device allocated to each function. Therefore, by referring to the configuration information, the device extracting section 53 can extract a device allocated to each unit and a device allocated to each function.

Logging of Large Capacity Data

A camera is present as the field device 10. The user may desire to improve the user program by acquiring the state of the work piece or a controlling object by the camera and comparing an image and a device value. Therefore, it becomes a problem how to manage the image and the device value related to each other. This is because in general, the image is acquired by the expansion unit 4 and the device value is acquired by the basic unit 3. Further, the acquisition cycle of the image and the acquisition cycle of the device value are generally different. Under such circumstances, it becomes a problem how to link large capacity data such as an image and comparatively small capacity data such as a device value.

Figure 19:
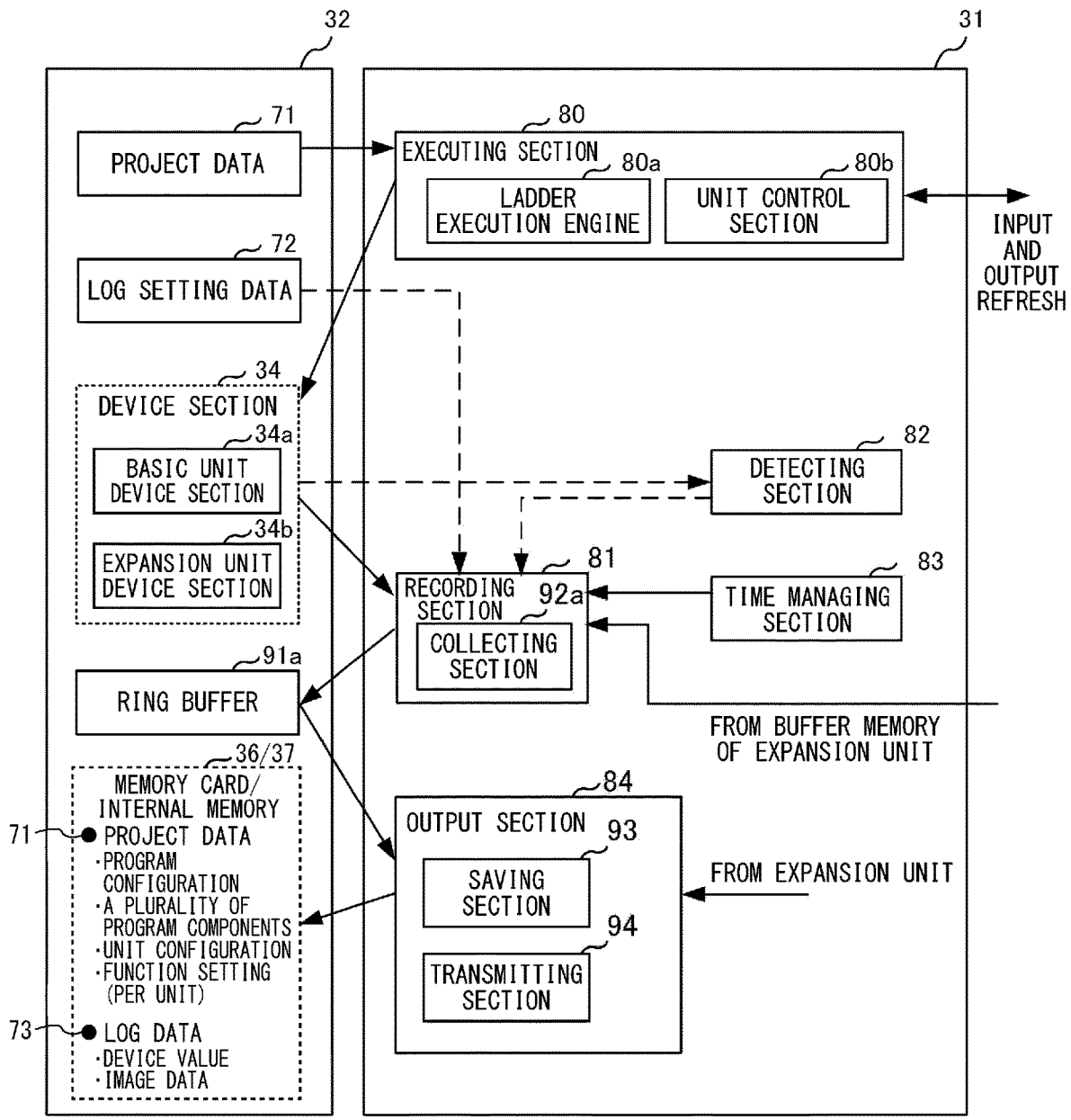
FIG. 19 is a diagram illustrating a function of a CPU of a basic unit.

FIG. 19 shows a function of the CPU 31 of the basic unit 3. The parts which have already been described are given the same reference signs and numerals. In this example, the recording section 81 has a collecting section 92a. When a predetermined collection start condition is satisfied, the collecting section 92a reads the device value designated by the log setting data 72 from the device values held in the device section 34 from the device section and acquires time information from a time managing section 83a. The collecting section 92a stores the device value and the time information in association with each other in a ring buffer 91a. The collecting section 92a acquires the device value and the time information for each collecting cycle (e.g., scan cycle) designated by the log setting data 72 and stores in the ring buffer 91a. The reason why the ring buffer 91a is adopted is that not all data stored in the ring buffer 91a is saved in the memory card 36 as the log data 73. For example, a saving section 93 may, when a predetermined saving condition is satisfied, read the device value and the time information from the ring buffer 91a, create the log data 73 and store it in the memory card 36. Similarly, the saving section 93 may, when the predetermined saving condition is satisfied, read large capacity data and the time information from the expansion unit 4, create the log data 73 and save it in the memory card 36. The saving section 93 saves the aforementioned device value and the time information, and the aforementioned large capacity data and the time information in association with each other. Here, saving "in association" means it is only necessary to save in the PC 2 in a form that is easy to be replayed. For example, file management in which a plurality of files are associated may be performed. To be more specific, when a first subfolder in which the device value and the time information are stored and a second subfolder in which the large capacity data and the time information are stored are placed under a specific folder in the memory card 36, a path (directory path) to the specific folder becomes a common flag and files in the first subfolder and files in the second subfolder can be saved "in association" using this common flag. When there is another folder placed in the same level (directory) as the aforementioned specific folder, this other folder means data package saved at another timing. Of course, the same subfolders as described above are also placed under this other folder. In this way, the saving section 93 may store the aforementioned device value and the time information, and the aforementioned data (large capacity data) and the time information in a plurality of files identified by the common flag (a predetermined directory path), and may save the plurality of files. Moreover, for example, saving "in association" is also possible by adopting a file name as the common flag and generating files having the same or corresponding file names. In addition, for example, saving "in association" is also possible by listing the device value and the data (large capacity data) in association with each other using the time information as a key and putting them into one file. In the embodiment, large capacity data has been considered as an example of data from a monitoring apparatus. However, it is needless to say that continuous data such as motion data, communication data and audio data may also be considered. A transmitting section 94 may transmit the log data 73 to the PC 2 or the cloud, etc. When the ring buffer 91a is full, the collecting section 92a overwrites the oldest information held in the ring buffer 91a with the newest information.

Here, the ring buffer 91a is employed as an example of the buffer. However, this is only an example. As the buffer, it is sufficient to use a buffer in FIFO format.

Figure 20:
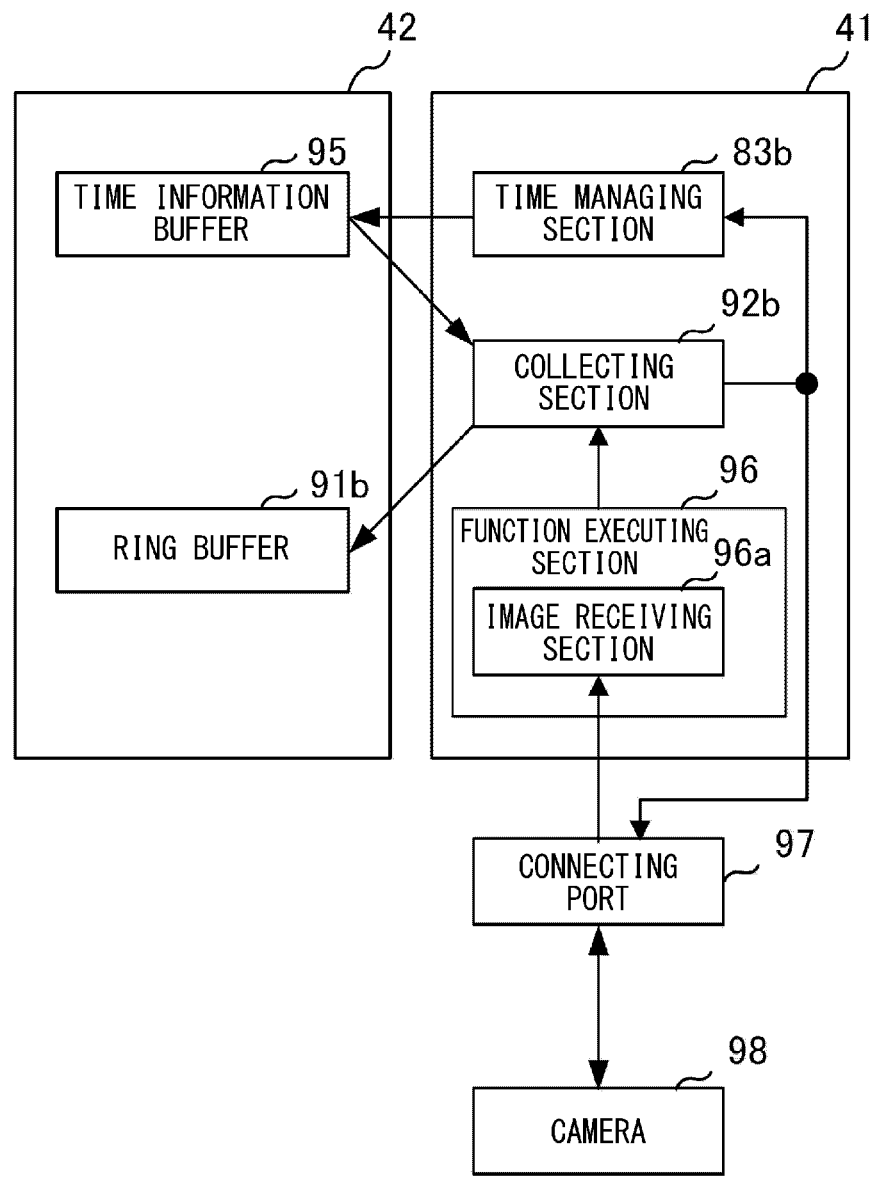
FIG. 20 is a diagram illustrating a function of a CPU of an expansion unit.

FIG. 20 is a diagram illustrating a function of the CPU 41 of the expansion unit 4 having a camera input function. A clock of a time managing section 83b is synchronized with a clock of the time managing section 83a of the basic unit 3. For example, the time managing section 83a transmits time information to the time managing section 83b during the END processing. The time managing section 83b synchronizes the clock of the time managing section 83b with the clock of the time managing section 83a based on the received time information. The clock may be realized by a counter which counts time based on the time information. When a predetermined collecting condition (e.g., a predetermined relay device is turned on) is satisfied, the collecting section 92b outputs a trigger signal periodically, for example. The time managing section 83b acquires from the clock the time information at the time the trigger signal is input and stores the time information in a time information buffer 95. The memory 42 has the time information buffer 95 and the ring buffer 91a. A connection port 97 is an interface for connecting a camera 98 to the expansion unit 4. The connecting port 97 periodically outputs the trigger signal issued by the collecting section 92b to the camera 98, or outputs image data output by the camera 98 to an image receiving section 96a. The image data is an example of large capacity data. The connecting port 97 is an example of a second external interface which is connected to a monitoring apparatus such as the camera 98 and through which data (image data) is input from the monitoring apparatus. The image receiving section 96a is part or all of a function executing section 96 which executes an imaging function accompanying the input of the image data from the camera 98 via the connecting port 97. In the embodiment, the function executing section 96 (the image receiving section 96a) executes a control of the camera 98 based on an imaging parameter (an example of setting information) such as exposure time, gain, white balance, and contrast. For such an imaging parameter, a desired parameter value is set in the PC 2 and is sent to the function executing section 96 via the communicating section 33 and the CPU 31 of the basic unit 3 shown in FIG. 4. Therefore, the communicating section 33 shown in FIG. 4 is an example of a first external interface which receives setting information from an external setting apparatus such as the PC 2 and a display. The communicating section 33 as the first external interface also accepts the user program created by the PC 2 as described above. The camera 98 executes imaging according to the trigger signal and outputs image data. The image receiving section 96a transfers the image data to the collecting section 92b. The collecting section 92b stores the time information held in the time information buffer 95 and the image data output from the image receiving section 96a in association with each other in a ring buffer 91b. When the ring buffer 91b is full, the collecting section 92b overwrites the oldest information held in the ring buffer 91b with the newest information. In the embodiment, the collecting section 92b automatically and periodically outputs an imaging trigger signal to the camera 98. However, the invention is not limited thereto, and the collecting section 92b may, for example, output an imaging trigger signal to the camera 98 based on a command from the user program.

The basic unit 3 communicates with the expansion unit 4 using any one of a refresh communication executed for every scan, a direct communication which can be executed at any time, and a message communication executed by event. The saving section 93 reads the image data and the time information from the ring buffer 91b of the expansion unit 4 using the direct communication, for example, and adds the image data and the time information to the log data 73. A plurality of direct communications with priority may be implemented as the direct communication. In this case, the priority of the direct communication executed in relation to the user program may be set relatively high and the priority of the direct communication for logging may be set relatively low. This makes it possible to reduce an influence of logging on the execution of the user program.

Logging Using a Ring Buffer

Figure 21:
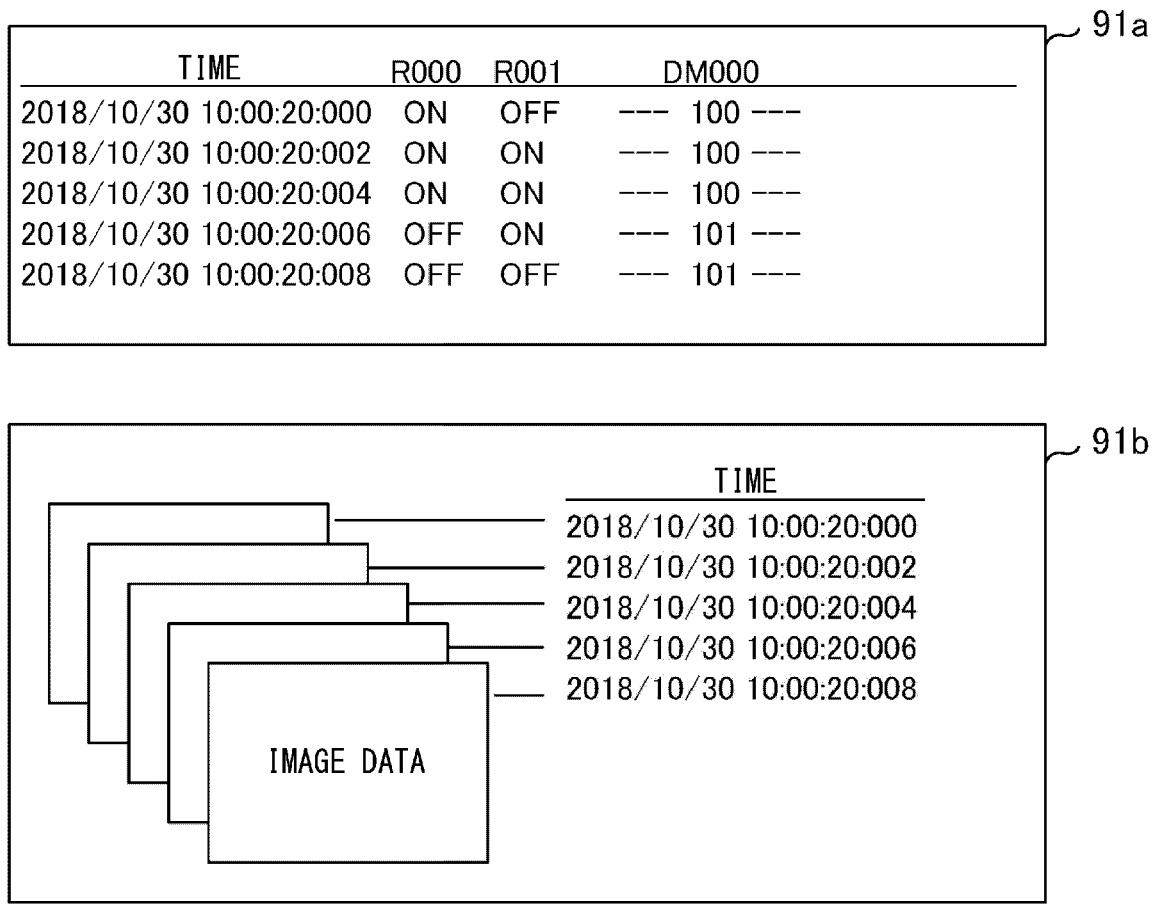
FIG. 21 is a diagram showing an example of log data.

FIG. 21 shows device values and time information held in the ring buffer 91a of the basic unit 3. A record includes an acquired device value and time information indicating time at which the device value is acquired.

FIG. 21 further shows image data and time information held in the ring buffer 91b of the expansion unit 4. A record includes acquired image data and time information indicating time at which the image data is acquired.

Figure 22:
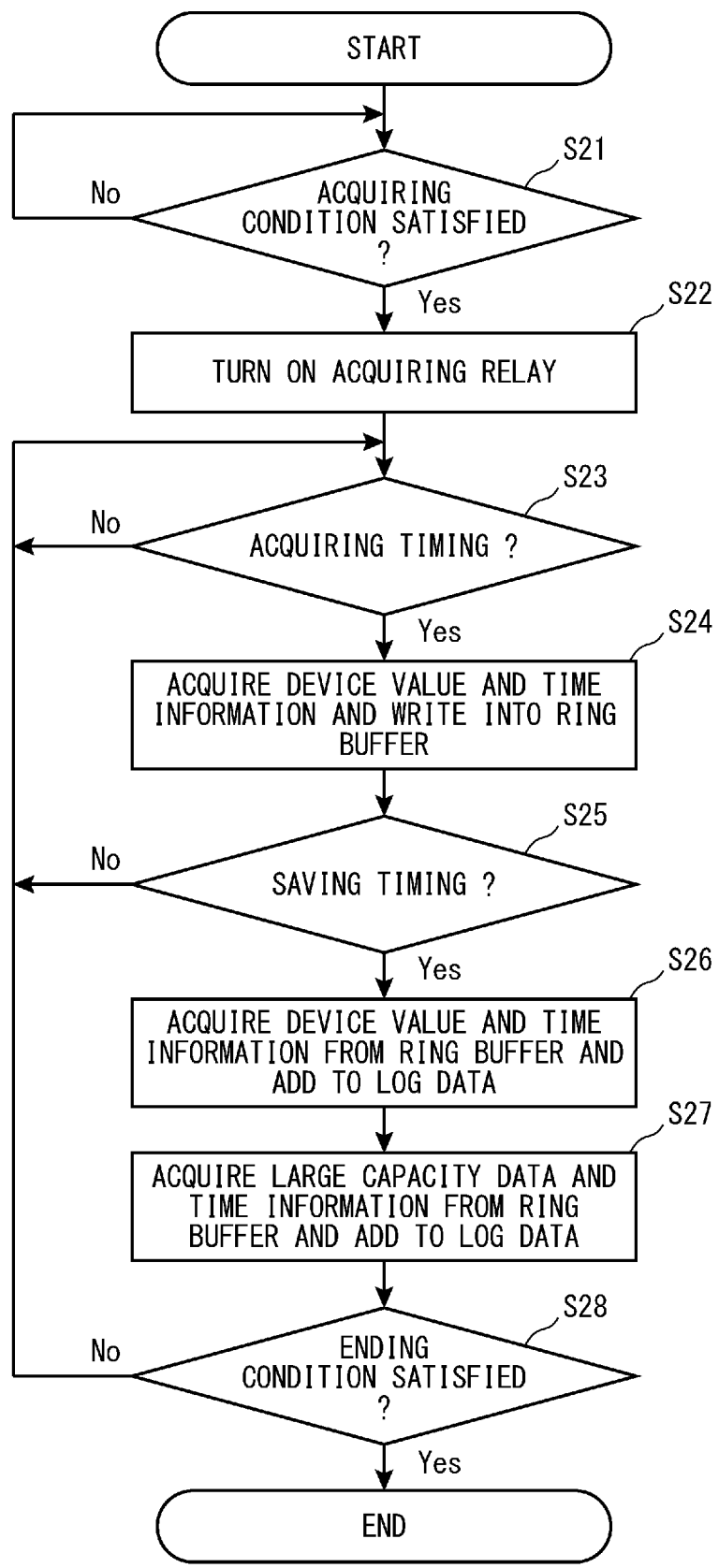
FIG. 22 is a flow chart showing logging processing in a basic unit.

FIG. 22 shows logging using the ring buffer 91a in the basic unit 3.

In S21, the CPU 31 (the collecting section 92a) determines whether or not an acquiring condition of a device value is satisfied. The acquiring condition is a condition for starting the storing of the device value and the time information to the ring buffer 91a. The acquiring condition may be described in the user program (e.g., a start relay is turned on), and may also be described in the log setting data 72. When the acquiring condition is satisfied, the CPU 31 proceeds to S22.

In S22, the CPU 31 (the collecting section 92a) turns on an acquiring relay. The acquiring relay is a one-bit device and is a relay for instructing the expansion unit 4 to store data to the ring buffer 91b.

In S23, the CPU 31 (the collecting section 92a) determines whether or not an acquiring timing of a device value has arrived. The acquiring timing is, for example, per scan cycle (for example, acquiring in END processing in each scan, etc.), and is defined by the log setting data 72. When the acquiring timing arrives, the CPU 31 proceeds to S24.

In S24, the CPU 31 (the collecting section 92a) acquires the device value designated by the log setting data 72 from the device section 34, and also acquires time information from the time managing section 83a and writes the device value and the time information into the ring buffer 91a.

In S25, the CPU 31 (the collecting section 92a) determines whether a saving timing has arrived or not. The saving timing is the timing for saving the information held in the ring buffer 91a in the log data 73. The saving timing may be, for example, a timing when a predetermined event (e.g., a saving trigger) occurs. The saving timing is also defined by the log setting data 72. The CPU 31 returns to S23 if the saving timing has not arrived. The CPU 31 proceeds to S26 if the saving timing has arrived.

In S26, the CPU 31 (the collecting section 92a) saves the information held in the ring buffer 91a in the log data 73. Among the information held in the ring buffer 91a, the information which is a saving object may be defined by the log setting data 72. For example, the saving object may be information acquired in a predetermined time period elapsed from a timing at which an even occurs. In addition, the saving object may be information acquired from start time, which is the time before a predetermined time period prior to the timing at which an event occurs, to end time, which is the time at which a predetermined time period has elapsed from the timing at which the event occurred.

In S27, the CPU 31 (the collecting section 92a) saves the information held in the ring buffer 91b of the expansion unit 4 in the log data 73. The collecting section 92a may read the information held in the ring buffer 91b of the expansion unit using direct communication. To be more specific, the collecting section 92a may issue an instruction for reading information from the buffer memory. Among the information held in the ring buffer 91b, the information which is the saving object may also be defined by the log setting data 72. For example, the saving object may be information acquired in a predetermined time period elapsed from a timing at which an even occurs. In addition, the saving object may be information acquired from start time, which is the time before a predetermined time period prior to the timing at which an event occurs, to end time, which is the time at which a predetermined time period has elapsed from the timing at which the event occurred.

In S28, the CPU 31 (the collecting section 92) determines whether an ending condition is satisfied or not. The ending condition is an ending condition of logging. The ending condition may also be defined by the log setting data 72. The CPU 31 returns to S23 if the ending condition is not satisfied. If the ending condition is satisfied, the CPU 31 ends the logging processing.

Figure 23:
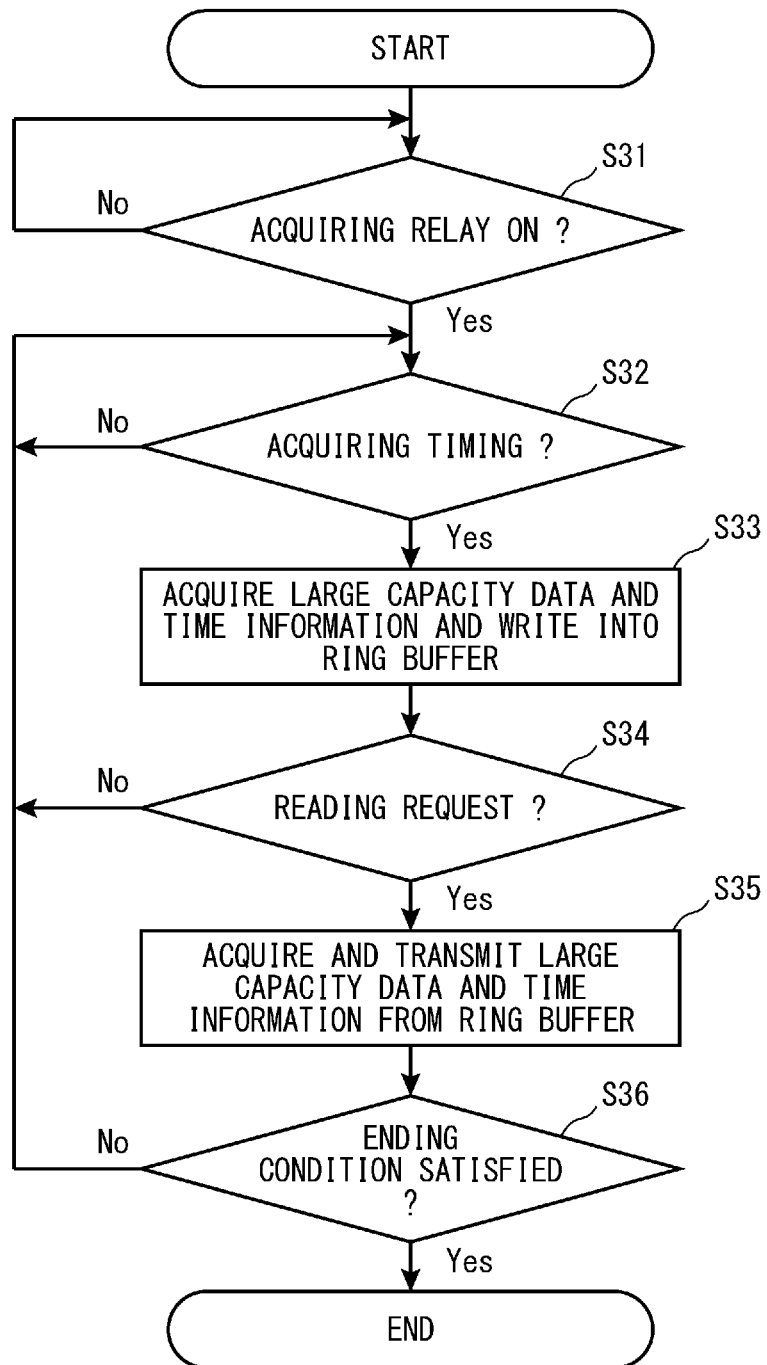
FIG. 23 is a flow chart showing logging processing in an expansion unit.

FIG. 23 shows logging using the ring buffer 91*b* in the expansion unit 4.

In S31, the CPU 41 (the collecting section 92*b*) determines whether or not an acquiring condition (e.g., an acquiring relay is turned on) of image data is satisfied. When the acquiring relay is turned on, the CPU 41 proceeds to S32. In the embodiment, it is determined that the acquiring condition of image data is satisfied when the acquiring relay is turned on. However, this is only an example. Alternatively, for example, it may be determined that the acquiring condition of the image data is satisfied when the mode of the PLC 1 is switched to an operation mode. To be more specific, the PLC 1 may be provided with a mode switching switch which switches a setting mode (program mode) for performing various settings and an operation mode (RUN mode) for performing an actual operation by repeatedly executing the ladder program. In this case, it may be determined that the acquiring condition of the image data is satisfied when the mode switching switch is switched from the program mode to the RUN mode by the user.

In S32, the CPU 41 (the collecting section 92*b*) determines whether or not an acquiring timing of the image data has arrived. The acquiring timing is, for example, per internal control cycle (imaging cycle) of the expansion unit 4. When the acquiring timing arrives, the CPU 41 proceeds to S33.

In S33, the CPU 41 (the collecting section 92*b*) acquires large capacity data and time information and stores the large capacity data and the time information in the ring buffer 91*b*. For example, the collecting section 92*b* issues a trigger signal and outputs the trigger signal to the camera 98 and the time managing section 83*b*. Upon receipt of the trigger signal, the time managing section 83*b* reads the time information from an internal clock and writes the time information into the time information buffer 95. The camera 98 executes imaging according to an imaging condition designated in advance, and outputs image data. The image receiving section 96*a* outputs the image data to the collecting section 92*b*. The image receiving section 96*a* may directly write the image data into the ring buffer 91*b*. The collecting section 92*b* writes the time information read from the time information buffer 95 and the image data acquired by the camera 98 in association with each other into the ring buffer 91*b*.

In S34, the CPU 41 (the collecting section 92*b*) determines whether or not a reading request (reading instruction) has been issued from the basic unit 3 with respect to the ring buffer 91*b*. The CPU 41 proceeds to S35 if the reading request is received. The CPU 41 returns to S32 if no reading request is issued.

In S35, the CPU 41 (the collecting section 92*b*) acquires the image data which is the large capacity data and the time information from the ring buffer 91*b* and transmits the image data and the time information to the basic unit 3.

In S36, the CPU 41 (the collecting section 92*b*) determines whether or not the ending condition is satisfied. For example, the collecting section 92*b* determines whether the acquiring relay is turned off or not. The CPU 41 returns to S32 if the ending condition is not satisfied. The CPU 41 ends the logging processing if the ending condition is satisfied.

Connection Form

Figure 24:
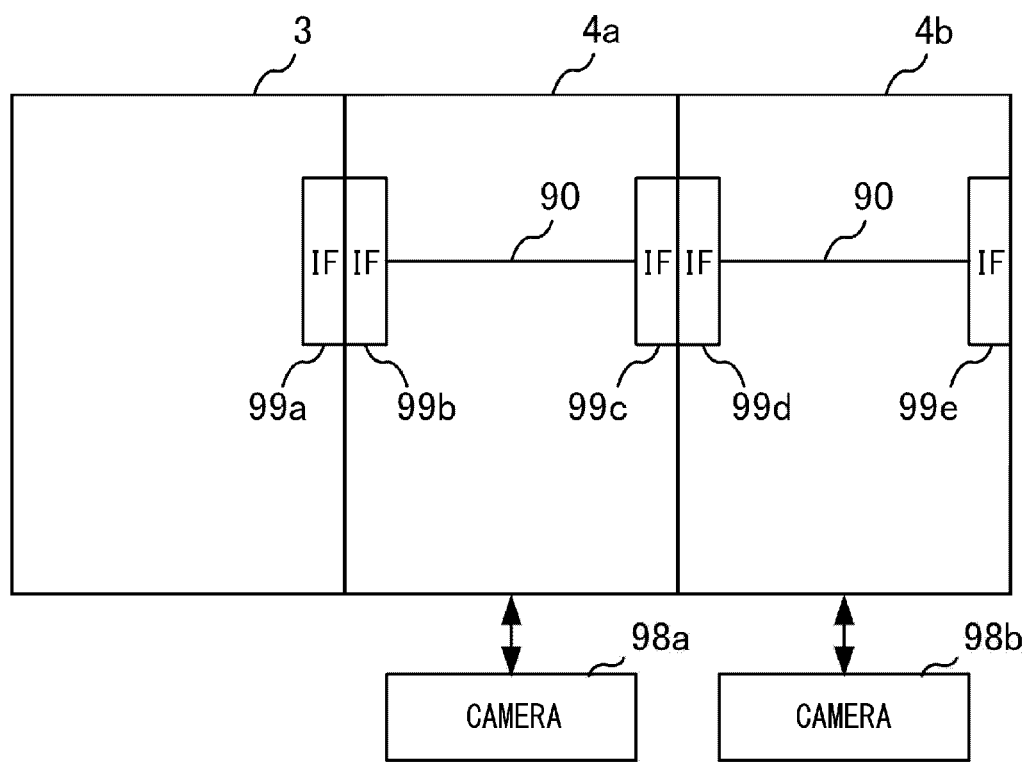
FIG. 24 is a diagram showing a connection form of a PLC.

FIG. 24 shows a connection form of a building block type PLC 1. An IF 99*a* being connected with the expansion unit 4 for communication is provided on a right side surface of the basic unit 3. The IF is an abbreviation for interface. In this example, the expansion unit 4*a* is connected to the basic unit 3, and the expansion unit 4*b* is connected to the expansion unit 4*a*. The expansion unit 4 has IFs 99 on both right side surface and left side surface. The right side surface of the basic unit 3 faces the left side surface of the expansion unit 4*a*. Therefore, the IF 99*a* of the basic unit 3 is connected with an IF 99*b* provided on the left side surface of the expansion unit 4*a*. The right side surface of the expansion unit 4*a* faces the left side surface of the expansion unit 4*b*. Therefore, an IF 99*c* of the expansion unit 4*a* is connected with an IF 99*d* provided on the left side surface of the expansion unit 4*b*. An IF 99*e* provided on the right side surface of the expansion unit 4*b* may be connected to an end unit. In this way, the IF 99*a* to the IF 99*e* form a unit internal bus 90. For example, image data acquired by a camera 98*a* connected to the expansion unit 4*a* can be transferred to the basic unit 3 via the unit internal bus 90. Image data acquired by a camera 98*b* connected to the expansion unit 4*b* can be transferred to the basic unit 3 via the unit internal bus 90.

In this way, side surfaces of each unit become connection surfaces (connecting surfaces) in the building block type PLC 1. The IF 99 for forming a part of the unit internal bus 90 is also provided on the side surface of each unit. As described above, the communication in the unit internal bus 90 is controlled by the bus master 38 shown in FIG. 4.

Figure 25:
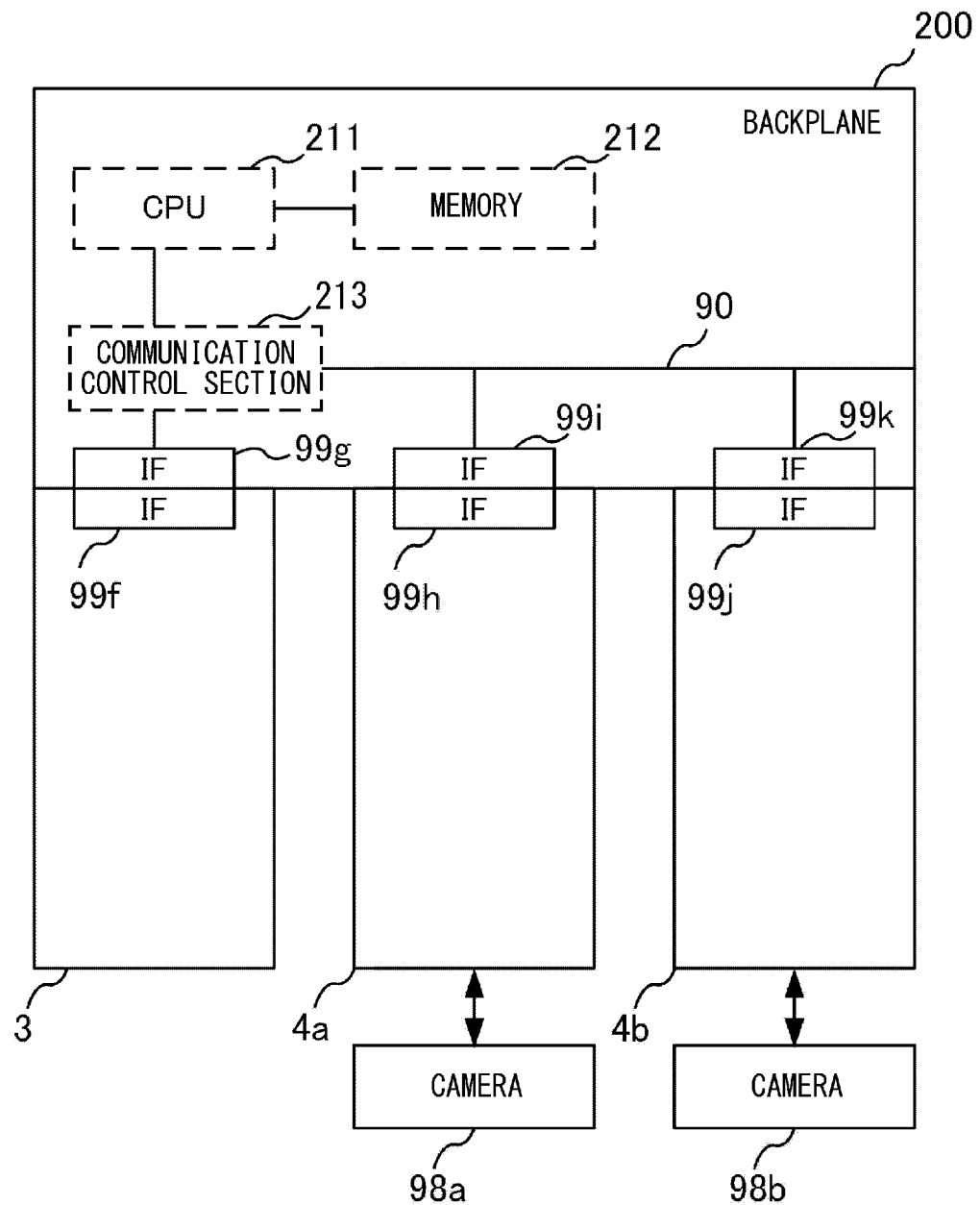
FIG. 25 is a diagram showing a connection form of a PLC.

FIG. 25 shows a connection form of the PLC 1 having a backplane 200. The backplane 200 is connected to a bottom surface of the basic unit 3 and a bottom surface of the expansion unit 4, or is connected to a rear surface of the basic unit 3 and a rear surface of the expansion unit 4. The backplane 200 functions as a support plate (a base plate) which supports the basic unit 3 and the expansion unit 4. Here, as an example, a rear surface is described as a connection surface. The rear surface of the basic unit 3 faces a front surface of the backplane 200. Therefore, an IF 99*f* provided on the rear surface of the basic unit 3 is connected with an IF 99*g* provided on the front surface of the backplane 200. The rear surface of the expansion unit 4 faces the front surface of the backplane 200. An IF 99*h* provided on the rear surface of the expansion unit 4*a* is connected to an IF 99*i* provided on the front surface of the backplane 200. An IF 99*j* provided on the rear surface of the expansion unit 4*b* is connected to an IF 99*k* provided on the front surface of the backplane 200. The IF 99*f* to the IF 99*k* form the unit internal bus 90.

The backplane 200 may have a communication control section 213 for controlling bus communication via the unit internal bus 90. Further, the backplane 200 may have a CPU 211 or a memory 212. The memory 212 may include, in addition to an RAM or an ROM, the memory card 36. In this case, the CPU 211 may function as the collecting section 92*a* or the saving section 93. In addition, the ring buffer 91*a* may be provided in the memory 212. Alternatively, the CPU 211 may include the time managing section 83*b* and the collecting section 92. In this case, the memory 212 includes the ring buffer 91*b*.

Display Example of Log

Figure 26:
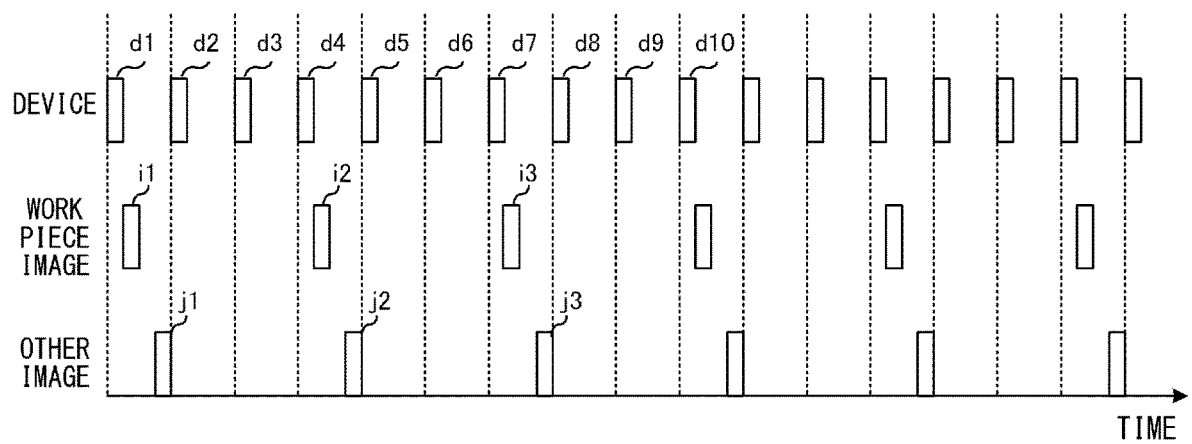
FIG. 26 is a diagram illustrating a timing of logging.

FIG. 26 shows an example of the log data 73. Acquiring timings of device values d1 to d10, work piece images i1 to i3 acquired by the camera 98*a*, and other images j1 to j3 acquired by the camera 98*b* are shown in this example. The device values d1 to d10 are acquired per scan cycle. The work piece images i1 to i3 are acquired at the timings at which trigger signals occurred. The work piece image j1 to j3 are acquired at timings at which trigger signals occurred.

The position of each data indicates the respective time information. As shown in FIG. 26, the acquiring time of each data and the acquiring cycle of each data do not coincide with one another. Therefore, the log display section 61 adjusts the display timing of each data based on the time information of each data.

Figure 27:
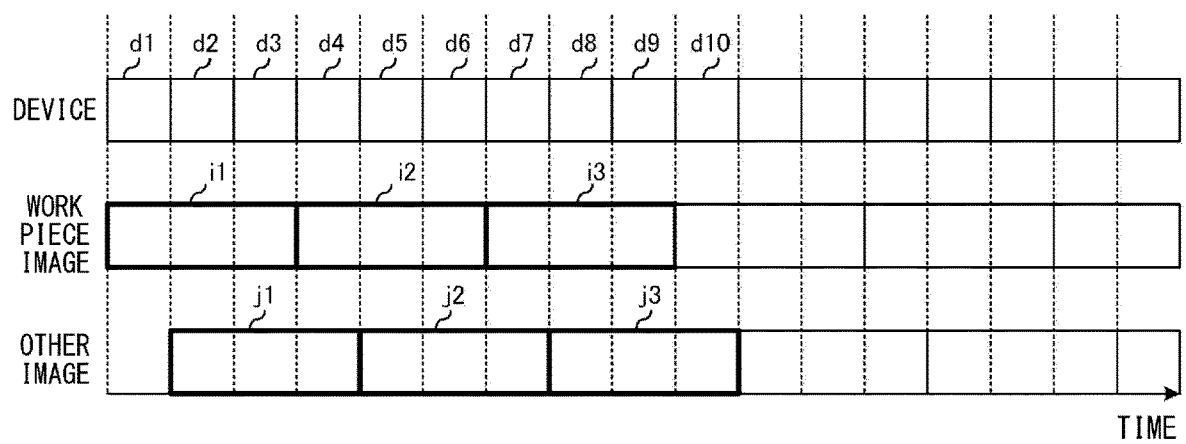
FIG. 27 is a diagram illustrating a display of log data.

FIG. 27 is a diagram illustrating display timing and display duration time of the log data 73. The log display section 61 displays each device value on the display section 7 according to the time information of each device value. For example, the log display section 61 determines a time difference between the time information of the device value d1 and the time information of the device value d2 as the display duration time of the device value d1. The log display section 61 starts displaying the device value d2 when the display duration time has elapsed from the starting of displaying the device value d1. Hereinafter, the display duration time is obtained in the same manner and the device values to be displayed are switched according to the time information and display duration time.

As already shown in FIG. 26, the acquiring time of the device value d1 and the acquiring time of the work piece image i1 do not coincide. Therefore, the log display section 61 compares the acquiring time of the work piece image i1 with the acquiring time of the device values d1 to d10 and obtains the acquiring time of a device value dx which is closest to the acquiring time of the work piece image i1. In this example, the acquiring time of the device value d1 is the closest to the acquiring time of the work piece image i1. Therefore, the log display section 61 starts displaying the device value d1 and starts displaying the work piece image i1. Next, the log display section 61 obtains the acquiring time of the device value dx which is closest to the acquiring time of the work piece image i2. In this example, the acquiring time of the device value d4 is the closest to the acquiring time of the work piece image i2. Therefore, the log display section 61 starts displaying the device value d4 and the work piece image i2 when the display timing of the device value d4 arrives. The log display section 61 obtains the acquiring time of the device value dx which is closest to the acquiring time of the other image j1. In this example, the acquiring time of the device value d2 is the closest to the acquiring time of the other image j1. Therefore, when the display timing of the device value d2 arrives, the log display section 61 starts displaying the device value d2 and starts displaying the other image j1.

As described above, the display timing of each data may be adjusted based on the data with the shortest cycle of logging among the plurality of data included in the log data 73.

Figure 28:
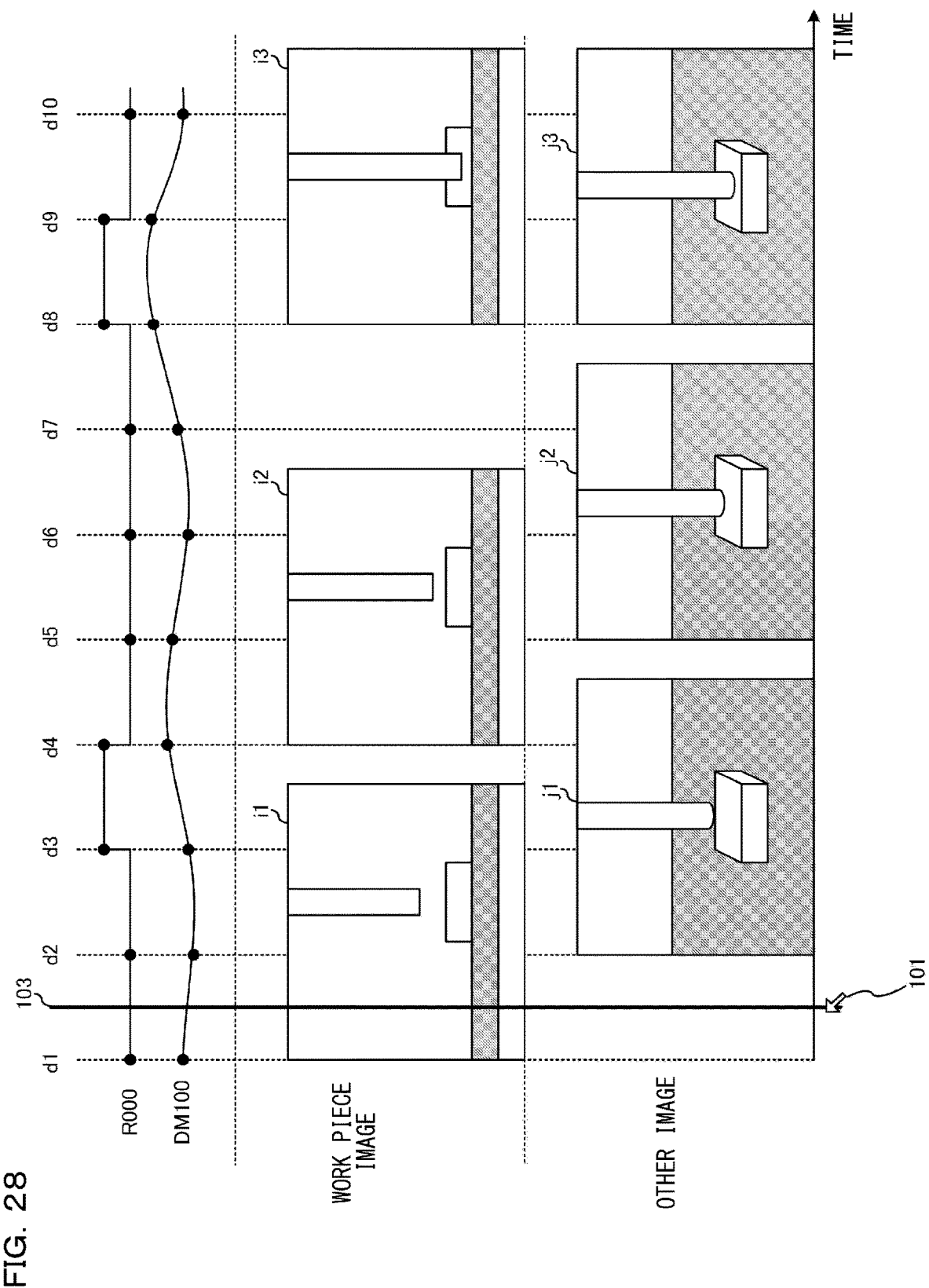
FIG. 28 is a diagram illustrating a display UI of log data.

FIG. 28 is a diagram illustrating a display method of the log data 73. In this example, a relay device R000 and a data memory DM 100 are acquired as device values dx (x is a value from 1 to 10). In this way, a plurality of device values are linked with one work piece image ix according to the time information. The log display section 61 may display the device value dx, the work piece image ix, and the other image jx in one window, or may display each of them in separate windows. Moreover, the log display section 61 may read the user program from the project data 71 and map the device value dx with respect to the user program to display. For example, the log display section 61 may search a step including an instruction word related to the device value dx which is an object to be displayed, display the found step and display the device value under the instruction word in the step. The device to be displayed may be a relay device. The log display section 61 may change a display color or an icon image (e.g., an arrow) of the instruction word in response to the on/off state of the relay device. The icon images include an image indicating ON and an image indicating OFF. In addition, the log display section 61 may display the device value graphically. In this case, the log display section 61 always displays the device values d1 to d10 in one window and displays the work piece images in another window. The log display section 61 switches the work piece images while the time elapses. Here, the log display section 61 may display a bar 103 which is movable in a time axis direction. The bar 103 may be referred to as a timeline bar. The log display section 61 may display the bar 103 such that the bar 103 moves from left to right as time elapses. The bar 103 may also be moved by the user. In this case, the log display section 61 receives an operation (e.g., a drag operation by the pointer 101) of moving the bar 103 through the operating section 8 and updates the display time according to the moving operation. The log display section 61 may extract the device value of which the acquiring time is the closest to the display time designated by the bar 103, the work piece image and the other image from the log data 73 and display them on the display section 7.

In the embodiment, the camera 98 is exemplified as an example of the monitoring apparatus, and the imaging function of the camera 98 is exemplified as the function of the function executing section 96. The invention is not limited thereto, and the function of the function executing section 96 may be a motion function or a communication function. First, to describe the former motion function in detail, it is considered a case where a motion unit as the expansion unit 4 is connected to the basic unit 3. In this case, a program (motion flow program) or a parameter (a setting parameter and the like of axis configuration or axis control) which defines an operation of the motion unit is set, that is, setting information is created in the PC 2. Then, the setting information is sent to the function executing section of the motion unit via the first external interface (the communicating section 33) and is reflected in the motion unit. The function executing section of the motion unit transmits an operation command value such as a target coordinate and a target speed to an externally connected motor amplifier in accordance with the setting information. Motion data such as a current coordinate and a current speed is received from the motor amplifier via an encoder. The control cycle for receiving motion data such as a current coordinate and a current speed is shorter than the scan cycle of the ladder program and is unsynchronized with the scan cycle of the ladder program. Therefore, the collecting section of the motion unit collects the motion data at a predetermined cycle and stores information relating to receiving time at which the motion data is received and the motion data in association with each other in the ring buffer 91b. Thereafter, similar to the processing described with reference to FIG. 22, when the saving timing comes (same as step S25 in FIG. 22), the motion data (a current coordinate, a current speed, etc.) and the time information are acquired from the ring buffer 91b and are added to the log data. In this way, it is possible to easily specify which device value and which motion data are related. On the other hand, to describe the latter communication control in detail, it is considered a case where a communication unit as the expansion unit 4 is connected to the basic unit 3. In this case, a program (communication flow program) or a parameter (a communication cycle, a transfer speed, etc.) which defines an operation of the communication unit is set, that is, setting information is created in the PC 2. Then, similar to the aforementioned motion control, the setting information is reflected in the communication unit via the communicating section 33. Then, the function executing section of the communication unit receives communication data such as a plurality of sensor values from an externally connected sensor group (to which a plurality of photoelectric sensors are connected) in accordance with the setting information. The receiving cycle (cyclic communication cycle) of such communication data is unsynchronized with the scan cycle of the ladder program. When the number of sensors included in the sensor group is large, the communication data itself may constitute large capacity data. The collecting section of the communication unit collects the communication data at a predetermined cycle (so-called cyclic communication cycle) and stores information relating to receiving time at which the communication data is received and the communication data in association with each other in the ring buffer 91b. Thereafter, similar to the processing described with reference to FIG. 22, when the saving timing comes (same as step S25 in FIG. 22), the communication data (a sensor value, etc.) and the time information are acquired from the ring buffer 91b and are added to the log data.

Setting of Collecting Period

The log setting section 51 may accept a setting of collecting period of the log data 73.

Figure 29:
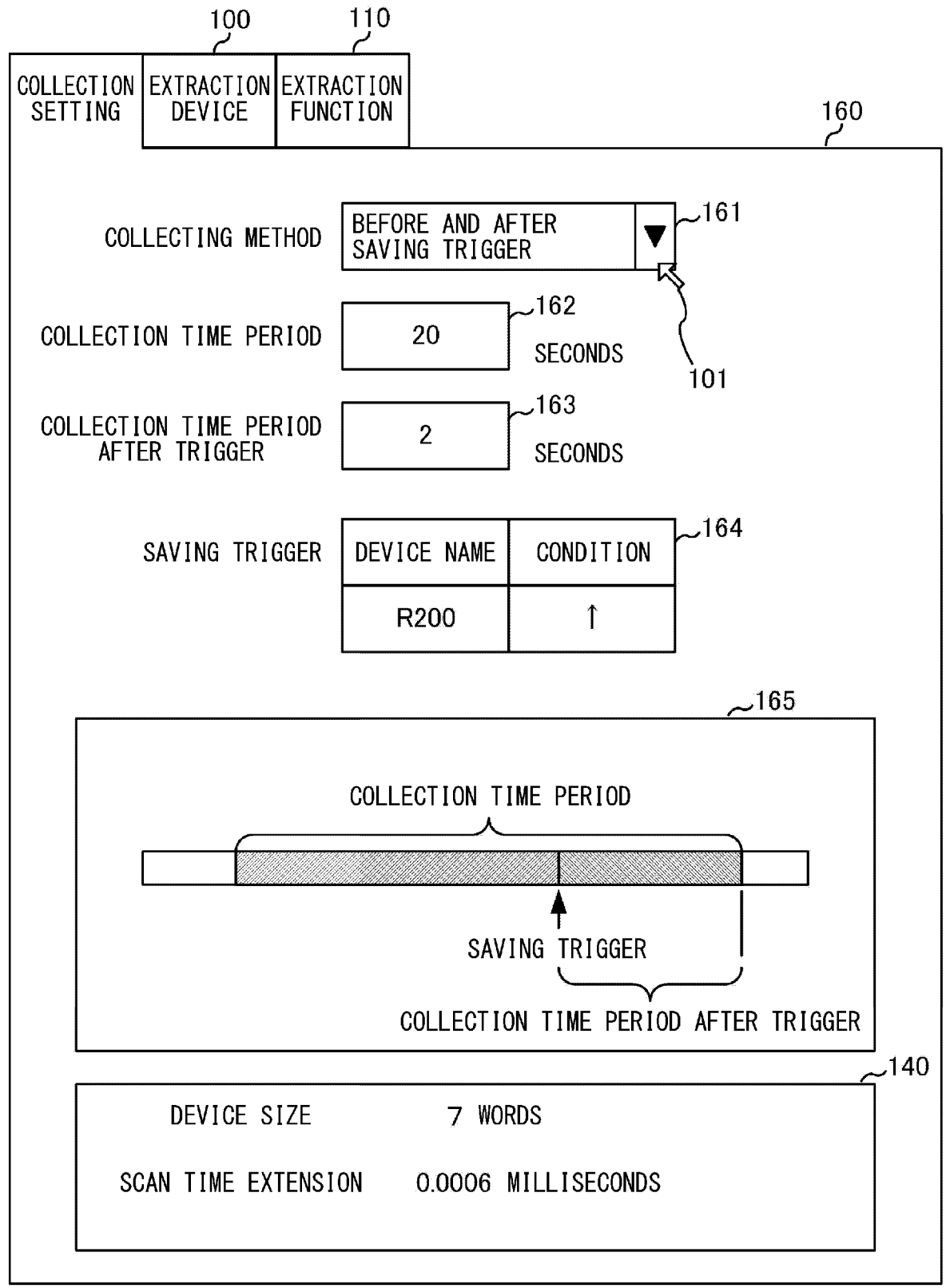
FIG. 29 is a diagram illustrating a method of setting a collection time period.

FIG. 29 shows a UI 160 for setting the collecting period. The UI 160, UI 110, and UI 100 may be switched by selecting tabs corresponding to the UI 160, UI 110, and UI 100 respectively by the pointer 101. The UI 160 has a pull-down menu 161 for designating a collecting method. The collecting method is a method of collecting the log data 73. In this example, a collecting method called before and after saving trigger and a collecting method called start relay will be described. Before and after saving trigger means a method of collecting the log data 73 in a collection time period Ta before a timing at which a saving trigger is turned on and a collection time period Tb after the timing at which the saving trigger is turned on. A text box 162 accepts an input of a collection time period T. The collection time period T is a sum of the collection time period Ta and the collection time period Tb. The text box 163 accepts an input of the collection time period Tb after the trigger. A saving trigger setting section 164 accepts a setting of a device name of a relay device used as the saving trigger and a condition (e.g., switching from off to on). An upper arrow means that a relay device designated as the saving trigger is switched from off to on. A guidance section 165 is a UI for explaining the collecting period. In this example, it is shown that the log data 73 is collected taking the saving trigger as a boundary. The log setting section 51 may also display information relating to the aforementioned device size and the scan time extension on the UI 160.

In the collecting method which is called before and after saving trigger, device values and image data are constantly stored in the ring buffer 91. The saving section 93 creates the log data 73 of 20 seconds designated as the collection time period when a relay device R200, which is the saving trigger, is turned on. The saving section 93 reads data recorded from 18 seconds before the timing at which the relay device R200 is turned on to 2 seconds after this timing from the ring buffer 91 to create the log data 73.

Figure 30:
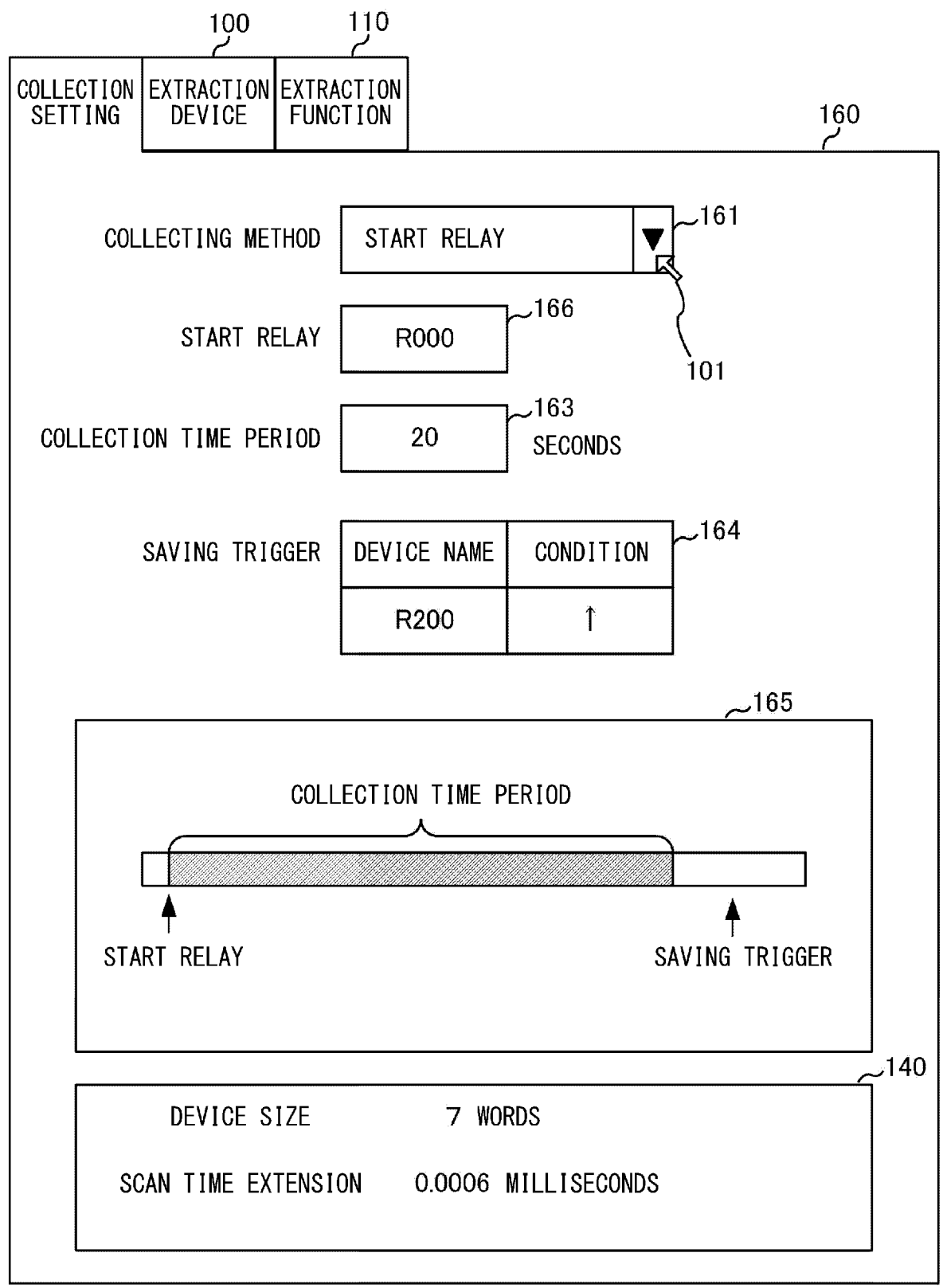
FIG. 30 is a diagram illustrating a method of setting a collection time period.

FIG. 30 shows the UI 160 for setting the collecting period. In this example, the start relay is selected as the collecting method from the pull-down menu 161 by the pointer 101. The log setting section 51 changes the UI 160 according to the collecting method selected by the user. A text box 166 accepts a device name of a relay device used as the start relay. As shown in the guidance section 165, in the collecting method which is called start relay, a timing at which the start relay is turned on is the starting point (start point) of the collection time period. For example, assume that it takes 30 seconds for the processing of pressing one work piece flowing through a manufacturing line. Further, assume that the time at which a trouble may occur is the first 20 seconds of the 30-second processing time. The relay device R000 is a relay which defines the timing at which the press processing is started. When the relay device R000 is turned on, the collecting section 92 stores device values and image data in the ring buffer 91 for 20 seconds. When the relay device R000 is turned on again as a next work piece arrives, the collecting section 92 stores device values and image data in the ring buffer 91 for 20 seconds. When the relay device R200 which is the saving trigger is turned on, the saving section 93 acquires device values and image data stored in the ring buffer 91 for the latest 20 seconds to create the log data 73. The relay device R200, which is the saving trigger, is a relay device that is turned on when a trouble occurs.

The log setting section 51 stores information set through the UI 160 in the log setting data 72 and transmits the information together with the project data 71 to the basic unit 3.

Debugging

Figure 31:
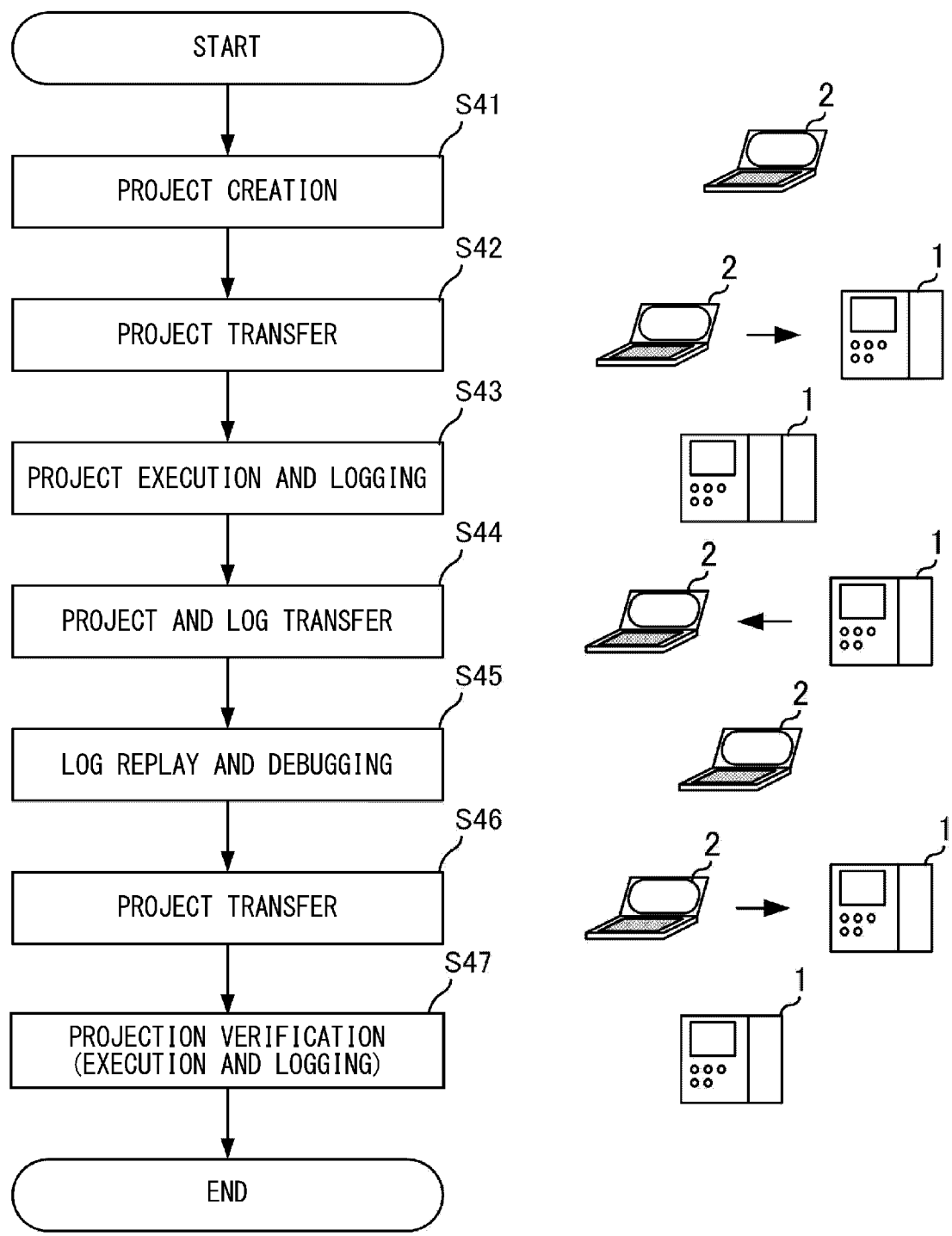
FIG. 31 is a flow chart showing an outline of debugging processing.

FIG. 31 is a flow chart showing an outline of debugging processing of the user program executed by the user.

In S41, the user operates the PC 2, creates a user program including a plurality of program components and creates the project data 71 including the user program. The program creating section 63 creates a user program according to the user input and stores the user program in the storing device 22. The project creating section 50 creates the project data 71 according to the user input and stores the project data 71 in the storing device 22. The project data 71 includes identification information for identifying the project data 71 or the user program. The project creating section 50 may execute computing with respect to the project data 71 or the user program to obtain a hash value or an error detection code, etc., and to add the hash value or the error detection code as identification information to the project data 71. The identification information may be GUID (Globally Unique Identifier), etc.

In S42, the user operates the PC 2 and transfers the project data 71 to the PLC 1. The project creating section 50 reads the project data 71 from the storing device 22 and transmits the project data 71 to the PLC 1 via the communicating section 23. Upon receipt of the project data 71, the basic unit 3 of the PLC 1 writes the project data 71 into the storing device 32.

In S43, the user operates (for example, by operating the mode switching switch which switches from the PROGRAM mode to the RUN mode) the operating section 6 of the basic unit 3 and instructs an execution of the project. The executing section 80 executes the user program included in the project data 71. The recording section 81 logs a device value and the like and stores (records) the logged device value in the ring buffer 91a. When a predetermined output condition is satisfied, the saving section 93 of the output section 84 creates the log data 73 by saving the device value recorded in the ring buffer 91a and the aforementioned image data in the memory card 36 or the internal memory 37.

Further, as shown in FIG. 19, the saving section 93 saves the project data 71 in the memory in addition to the log data 73. As a result, in the PC 2, it becomes possible to reproduce the movement at the time a trouble occurs on the monitor by using the project data 71 at the time the trouble occurs. Details will be described later.

In addition, the saving section 93 saves the identification information (hash value, etc.) of the project data 71 in the memory in addition to the project data 71. In this way, the PC 2 can verify whether or not the current (to be a replay object) project data is consistent with the project data at the time an actual trouble occurs by using the identification information. Details will be described later.

In the embodiment, the project data 71 and its identification information are saved in the memory in addition to the log data 73 at the timing at which the predetermined output condition is satisfied. However, the invention is not limited thereto. For example, it is also possible that the project data 71 and its identification information are saved in the memory before the start of operation, at the start of operation, or during the operation of the PLC 1, and only the log data is saved in the memory at the timing at which the predetermined output condition is satisfied. In short, it is only necessary that the log data 73, the project data 71, and the identification information of the project data 71 are saved in the memory in association with each other at the time at which the predetermined output condition is satisfied.

Moreover, in the invention, the project data 71 is saved in the memory. However, the invention is not limited thereto, and for example, it is also possible that only the identification information of the project data 71 is saved in the memory in place of the project data 71. In this case, it is presupposed that the current project data in the PC 2 is consistent with the project data 71 at the time an actual trouble occurs. That is, it is presupposed that the current project data is not edited or changed after the project data has been transferred to the PLC 1. When it is determined that both data are inconsistent with each other, it is only necessary for the user to replay after recognizing that the current project data is different from the project data 71 at the time an actual trouble occurs. Therefore, it is possible to prevent the user from replaying (incorrect troubleshooting) without recognizing that the current project data is different from the project data 71 at the time an actual trouble occurs.

In S44, the user operates the operating section 6 of the basic unit 3 and instructs to transfer the project data 71 and the log data 73 to the PC 2. Alternatively, the user may operate the operating section 8 of the PC 2 to read the project data 71, the identification information of the project data 71, and the log data 73 which have been written in the memory card 36. The output section 84 transmits the project data 71 and the log data 73 to the PC 2. The identification information of the project data 71 may be added to the log data 73 when the output section 84 determines that the transfer of the project data 71 is prohibited. The identification information of the project data 71 and the log data 73 may be transmitted separately. The output section 84 may execute computing with respect to the project data 71 or the user program (for example, using a hash function) to obtain a hash value or an error detection code, etc. at the timing at which a predetermined condition for writing into the memory card 36 is satisfied, and may add the hash value or the error detection code as identification information to the log data 73. Any rule may be adopted as long as a creation rule of the identification information executed by the PC 2 and a creation rule of the identification information executed by the basic unit 3 are consistent with each other.

In S45, the user operates the PC 2 and investigates the cause of trouble while reproducing (replaying) the log data 73 to execute debugging of the user program included in the project data 71. Replay of the log data 73 includes displaying device values of time series included in the log data 73 in waveforms on the display section 7, displaying the device values in association with the user program, and displaying image data of time series included in the log data 73 on the display section 7. A log display section 61 has an internal clock which measures virtual time, and acquires a device value from the log data 73 in synchronization with the internal clock to display the device value on the display section 7. In some cases the project data 71 may not be transmitted from the PLC 1. In this case, the log display section 61 may use the user program of the project data 71 (master data) held in the storing device 22 to display the device value in association with the user program. Details of investigating the cause of trouble caused by replaying the log data 73 will be described later.

It should be noted that a version of the project data 71 used for acquiring the log data 73 and a version of the project data 71 held in the PC 2 may be different in some cases. In this case, it is considered that the device value cannot be displayed in association with the user program, or the association between the user program and the device value is erroneous. In this case, the log display section 61 may use the identification information of the project data to display on the display section 7 a warning indicating that the version of the project data 71 used for acquiring the log data 73 and the version of the project data 71 held in the PC 2 are different. The log display section 61 may ask the user whether to display the log data 73 acquired using the project data 71 of a first version in association with the project data 71 of a second version held in the PC 2. When the user wishes such a display, the log display section 61 displays on the display section 7 the log data 73 acquired using the project data 71 of the first version in association with the project data 71 of the second version held in the PC 2. The versions are managed by the identification information. When the user confirms that there is no problem in the log data 73, debugging is unnecessary and subsequent S46 and S47 are also unnecessary. The user analyzes the log data 73, detects bugs and the like of the user program, and revises the user program. The project creating section 50 revises (updates) the project data 71 according to the user input and stores the project data 71 in the storing device 22.

In S46, the user operates the PC 2 and transfers the project data 71 to the PLC 1. When the user program in the project data 71 is changed, the identification information is updated. In this way, it becomes possible to distinguish the project data 71 before revision and the project data 71 after revision.

In S47, the user operates the basic unit 3 and instructs an execution of the user program included in the project data 71 to verify the project data 71. The executing section 80 executes the user program included in the project data 71. When the PLC 1 is operating as the user has expected, the user determines that debugging of the project data 71 has succeeded. When the PLC 1 is not operating as the user has expected, the device value and the like are logged again by the recording section 81 and the log data 73 is created by the saving section 93. Then, the user executes S44 to S47 again.

In this way, the user can debug the project data 71 while referring to the log data 73. Therefore, it is considered that efficiency of debugging is improved.

The transfer of the project data 71 may be executed via the memory card 36. That is, the PC 2 writes it into the memory card 36. The user removes the memory card 36 from the PC 2 and attaches the memory card 36 to the basic unit 3. The basic unit 3 reads the project data 71 from the memory card 36 to write the project data 71 into the storing device 32.

Similarly, the transfer of the log data 73 may also be executed via the memory card 36.

Output Section

Figure 32:
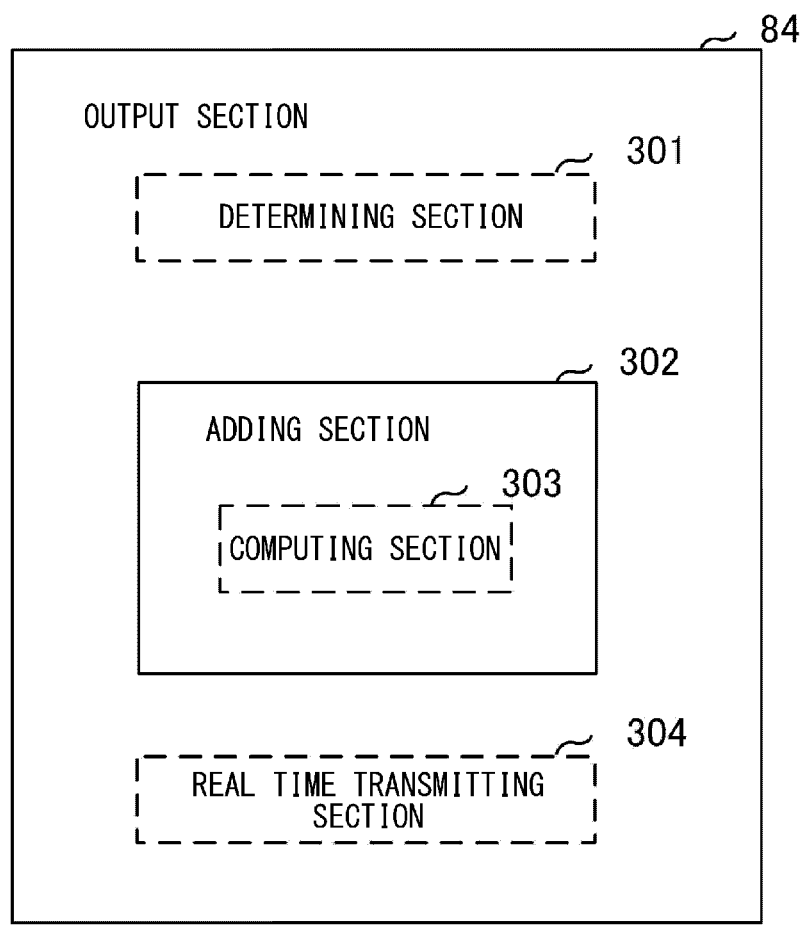
FIG. 32 is a diagram illustrating an output section.

FIG. 32 shows the output section 84 mounted on the basic unit 3. The output section 84 may transfer the project data 71 used in acquiring the log data 73 to the PC 2 in addition to the log data 73. However, in order to prevent information leakage of the project data 71, an access authority (protection) which prohibits writing to the memory card 36 or transmission to the PC 2 may be set in the project data 71. Therefore, a determining section 301 refers to the access authority given to the project data 71 and determines whether or not an output of the project data 71 is prohibited. When the output of the project data 71 is prohibited, the output section 84 outputs the log data 73 but does not output the project data 71. On the other hand, when the output of the project data 71 is not prohibited, the output section 84 outputs the log data 73 and the project data 71. When the output of the project data 71 is prohibited, an adding section 302 may output the identification information of the project data 71 held in the storing device 32 together with the log data 73. The identification information may be part of the project data 71, or a computing section 303 may obtain the identification information by executing predetermined computing with respect to the project data 71 or the user program. The predetermined computing may be, for example, hash computing, or computing of an error detection code. A real time transmitting section 304 transmits a device value held in the device section 34 in real time. This is useful when displaying a device value in real time on a display apparatus such as the PC 2 and an HMI (human interface).

Project Creating Section 50

Figure 33:
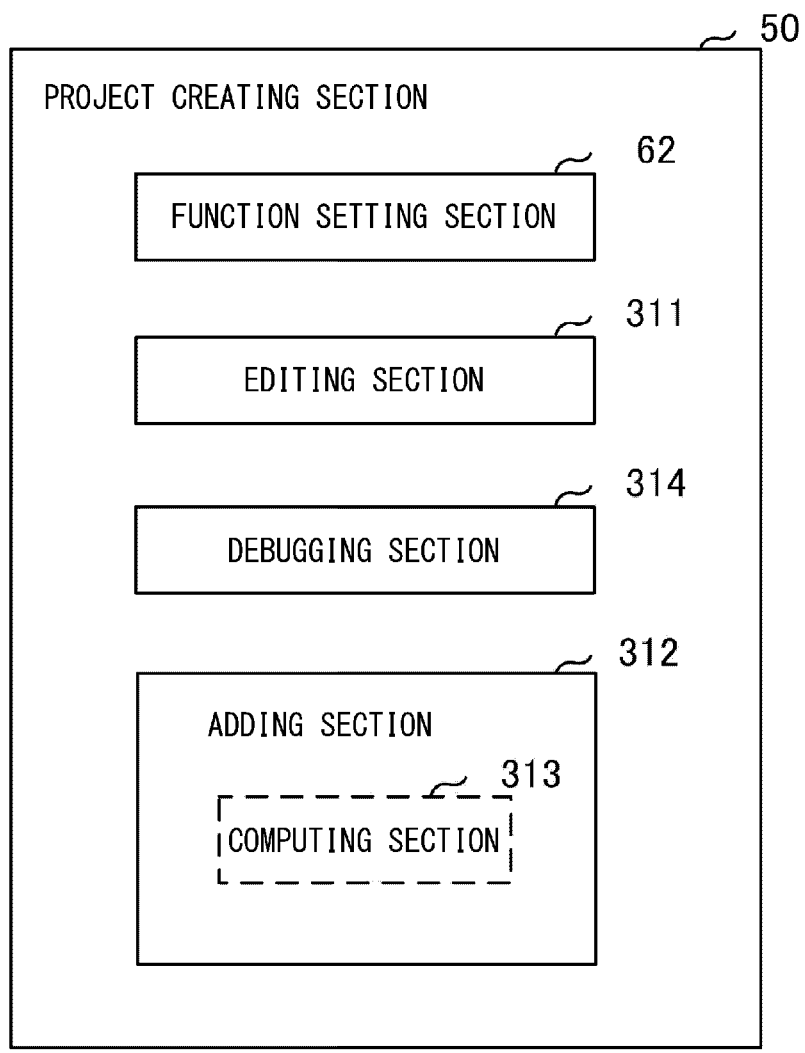
FIG. 33 is a diagram illustrating a project creating section.

FIG. 33 shows details of the project creating section 50. The function setting section 62 sets the configuration information of the expansion unit 4, the function of the basic unit 3, and the function of the expansion unit 4 based on information input from the operating section 8 and creates configuration information indicating setting contents.

Setting of the function of the basic unit 3 includes setting of an IP address, setting relating to an FTP client, setting of an access authority of the project data 71, etc. Setting of the function of the expansion unit 4 includes setting of an input channel, setting relating to a communication between PLCs, etc. The configuration information is part of the project data 71. An editing section 311 (which may also serve as the program creating section 63 shown in FIG. 6) displays an editing UI of the user program on the display section 7 and edits the user program based on the information input from the operating section 8. A debugging section 314 uses the project data 71 to debug the user program. An adding section 312 adds identification information to the project data 71. A computing section 313 obtains the identification information (e.g., a hash value or an error detection code) by computing. The computing (calculating) function of the identification information by the computing section 313 may also be performed by the output section 84.

Log Display Section 61

Figure 34:
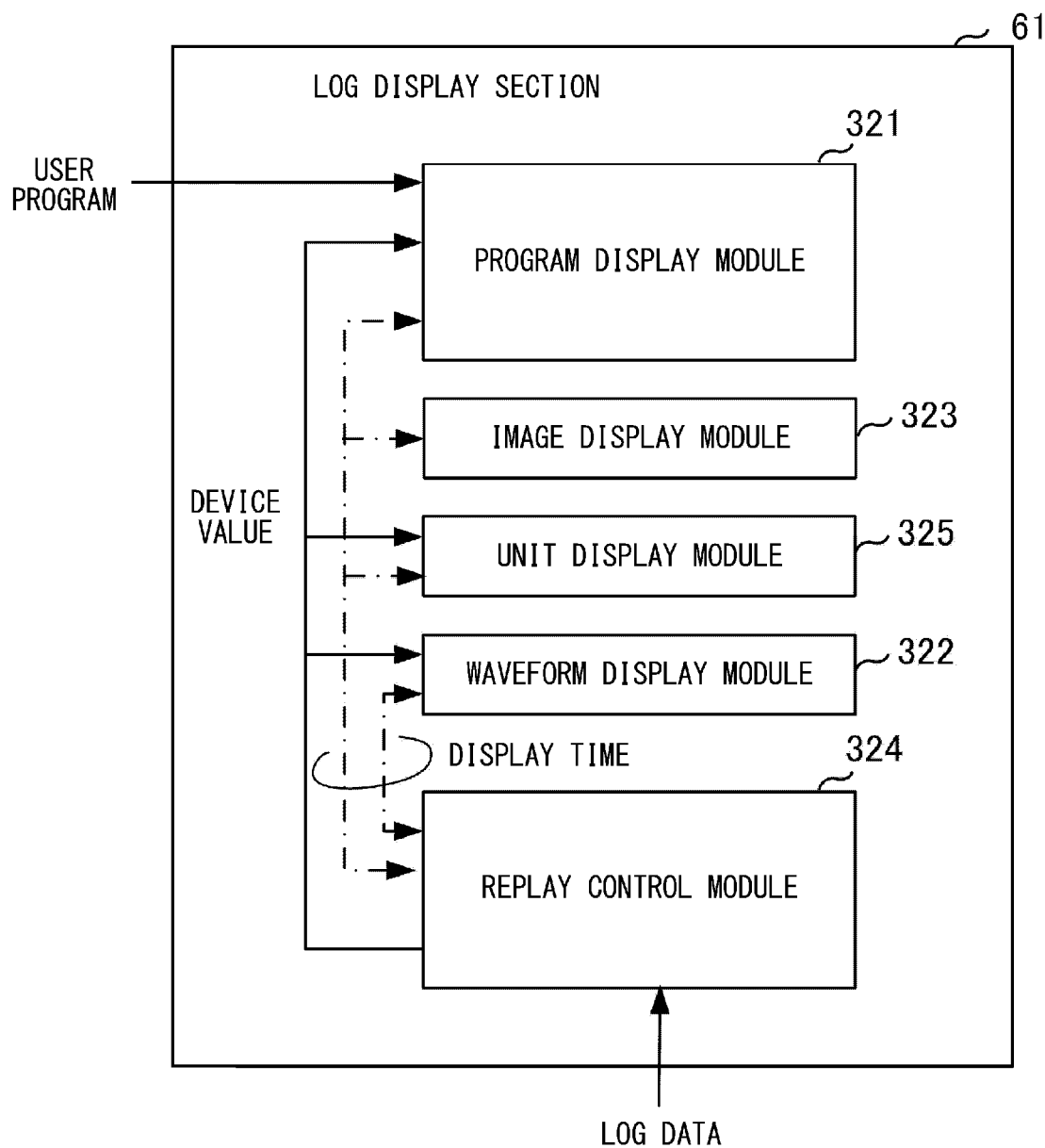
FIG. 34 is a diagram illustrating a log display section.

FIG. 34 shows details of the log display section 61. A program display module 321 is a module that displays the device values included in the log data 73 together with the user program included in the project data 71 on the display section 7. Further, the program display module 321 is capable of displaying various kinds of information for the user to visually confirm setting contents of the project data 71, such as, besides the user program, the program configuration information, a plurality of program components, unit configuration, and function setting for each unit included in the project data 71. An image display module 323 displays the image data of time series included in the log data 73 on the display section 7. A waveform display module 322 is a module that turns the device values of time series included in the log data 73 into waveforms to display on the display section 7. A replay control module 324 temporally synchronizes the information displayed by the program display module 321 and the information displayed by the waveform display module 322. These modules may be referred to as engineering software. The image display module 323 may be embodied as a function (image display section) of the program display module 321 or may be embodied as a function (image display section) of the waveform display module 322.

Program Display Module

Figure 35A:
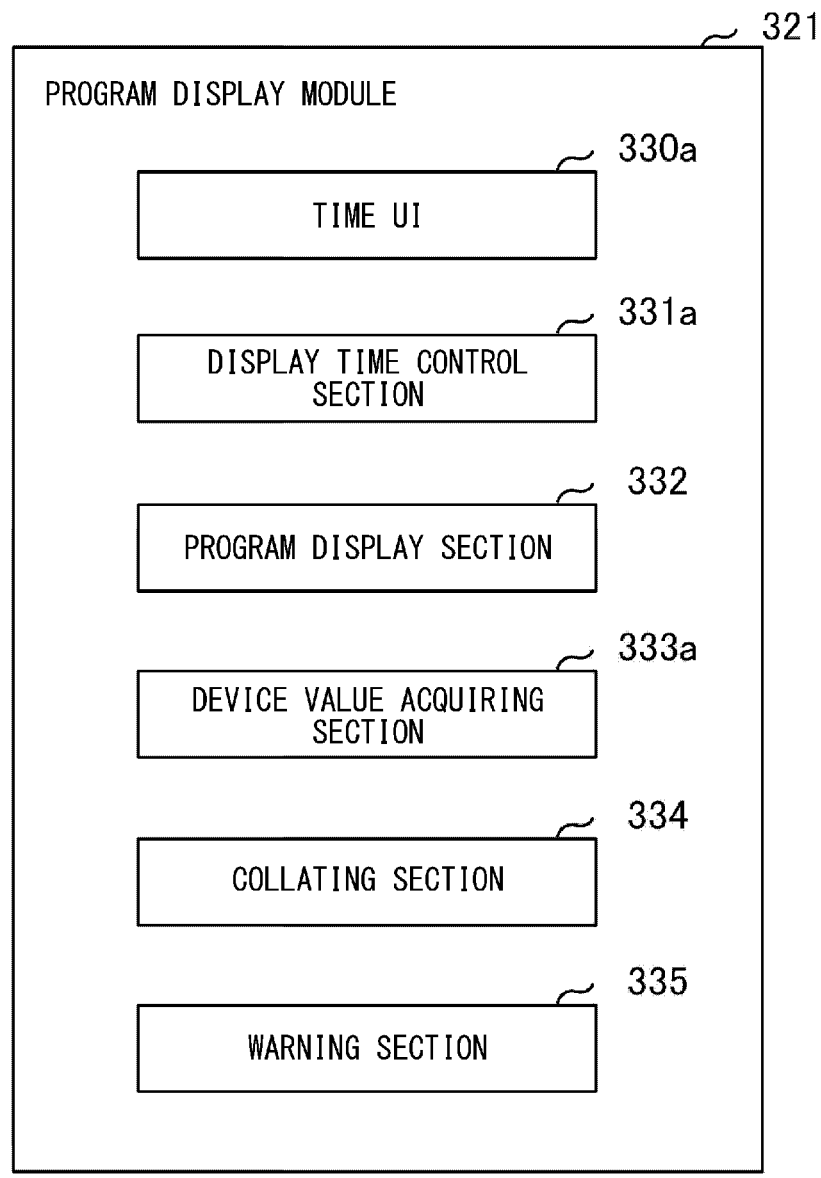
FIG. 35A is a diagram illustrating a program display module.

FIG. 35A shows details of the program display module 321. A time UI 330a provides a UI (e.g., a slide bar, a cursor, etc.) for operating the acquiring time (display time) of the device displayed together with the user program. A display time control section 331a sends display time designated by the time UI 330a to the replay control module 324, or sets display time notified from the replay control module 324 on the time UI 330a. The program display section 332 displays the project data 71 on the display section 7, or reads the project data 71 corresponding to the identification information from the storing device 22 and displays the project data 71 on the display section 7. In addition, the program display section 332 displays a device value acquired by a device value acquiring section 333a in association with a device used or described in the user program. The device value acquiring section 333a has a real time replay mode and a log replay mode. In the real time replay mode, the device value acquiring section 333a accesses the real time transmitting section 304 of the PLC 1, acquires a device value, and passes the device value to the program display section 332. In the log replay mode, the device value acquiring section 333a accesses the replay control module 324, acquires display time and a device value, and passes the display time and the device value to the program display section 332.

Figure 35B:
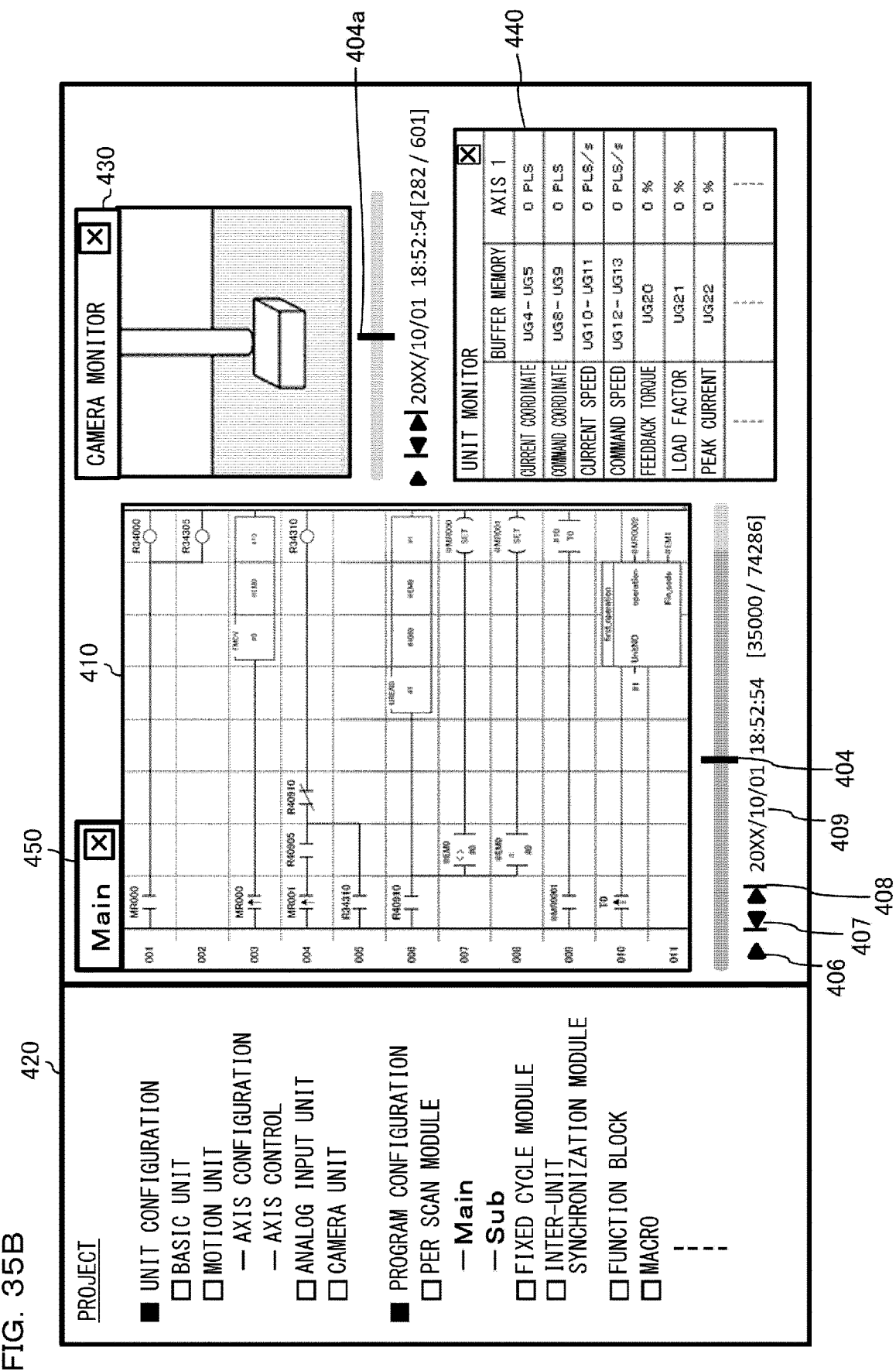
FIG. 35B is a diagram illustrating a user interface.

FIG. 35B is a schematic diagram showing an example of a GUI displayed on the display section 7 by the program display section 332, etc.

In FIG. 35B, various kinds of information included in the project data 71 are shown in a project display region 420 in a left column. From the top, unit configuration (basic unit, motion unit, analog input unit, camera unit) and program configuration (per scan module, fixed cycle module, inter-unit synchronization module, function block, macro) are displayed in this order. For the motion unit, setting parameters of axis configuration and axis control are displayed as the function setting. On the GUI shown in FIG. 35B, the user can double-click the axis configuration or the axis control to confirm what kind of setting contents are set for these setting parameters. Further, when Main and Sub are displayed per scan module in the project display region 420, as the user clicks Main, a Main program is displayed in a program display region 410 of a ladder monitor 450 in the center. In this way, the program display module 321 shown in FIG. 34 reads the project data 71 from the memory card 36 and displays various kinds of information in the project display region 420, or displays a desired program in the program display region 410.

Here, the program display section 410 is part of a so-called ladder monitor 450, and can be operated independently in the real time replay mode. By clicking an X symbol, it is possible to only hide the ladder monitor 450.

On the other hand, in the log replay mode, a ladder program included in the project when an operation record is saved can be replayed by the program display section 332. Further, in the log replay mode, the program display section 332 displays a device value included in the log data 73 via the device value acquiring section 333a in association with a device described in the Main program. The device value which is an object to be displayed becomes a device value corresponding to the time designated by a time designating cursor 404 (details will be described with reference to FIG. 38 which will be described later).

In the case of FIG. 35B, the device value corresponding to 18:52:54 of 20XX/10/01 displayed in a time display region 409 is displayed in association with the device described in the Main program. [35000/74286] displayed on the right side of this date shows a current number of scans 35000 with respect to a total number of scans 74286. The user updates the display time and the number of scans and updates a display of the device value by dragging to move the time designating cursor 404. For example, at the display time after the update, the place of the relay device which is turned on is indicated as ON (for example, by coloring, etc.), and the place of the relay device which is turned off is indicated as OFF (for example, by removing a color, etc.). Details of a function and the like of a replay button 406 will be described later with reference to FIG. 38.

In FIG. 35B, an image display region of a camera monitor 430 is provided in an upper right column. The image display module 323 reads the image data from the log data 73 to display in the image display region of the camera monitor 430 in synchronization with the time displayed on the ladder monitor 450 by the program display module 321. In FIG. 35B, image data corresponding to the display time, i.e., 18:52:54 of 20XX/10/01 is displayed on the camera monitor 430. In addition, 282/601 is displayed on the right side of this display time, and it represents the order of the current image data (282th piece) with respect to a total number of imaged pieces 601. The user can update the display time and the order of the current image data by dragging to move a time designating cursor 404a in the camera monitor 430.

In this case, the time designating cursor 404 in the aforementioned ladder monitor 450 also moves in association with the movement of the time designating cursor 404a. For example, when the time designating cursor 404a is matched to display time of 19:00:00 of 20XX/10/01, the time designating cursor 404 in the ladder monitor 450 also follows to move to the position of the display time of 19:00:00 of 20XX/10/01. Then, the device value in the ladder monitor 450 is also updated along with the movement of the time designating cursor 404. Here, the time designating cursor 404a is moved and vice versa. For example, when the time designating cursor 404 in the ladder monitor 450 is moved, the time designating cursor 404a in the camera monitor 430 also moves correspondingly. Such processing operation is possible because the program display module 321 and the image display module 323 execute a synchronization control relating to the display time via the replay control module 324.

In FIG. 35B, the unit monitor 440 is displayed in a lower right column. For example, as described with reference to FIG. 10A, the unit monitor 440 displays device values of the buffer memory (UG) in the motion unit. To be more specific, upon receiving display time which should be currently replayed from the replay control module 324, a unit display module 325 of the log display section 61 reads a device value corresponding to the time from the memory card 36 and displays the device value on the unit monitor 440.

Therefore, for example, in the case of FIG. 35B, a list of device values corresponding to the display time 18:52:54 of 20XX/10/01 is displayed on the unit monitor 440.

Figure 35C:
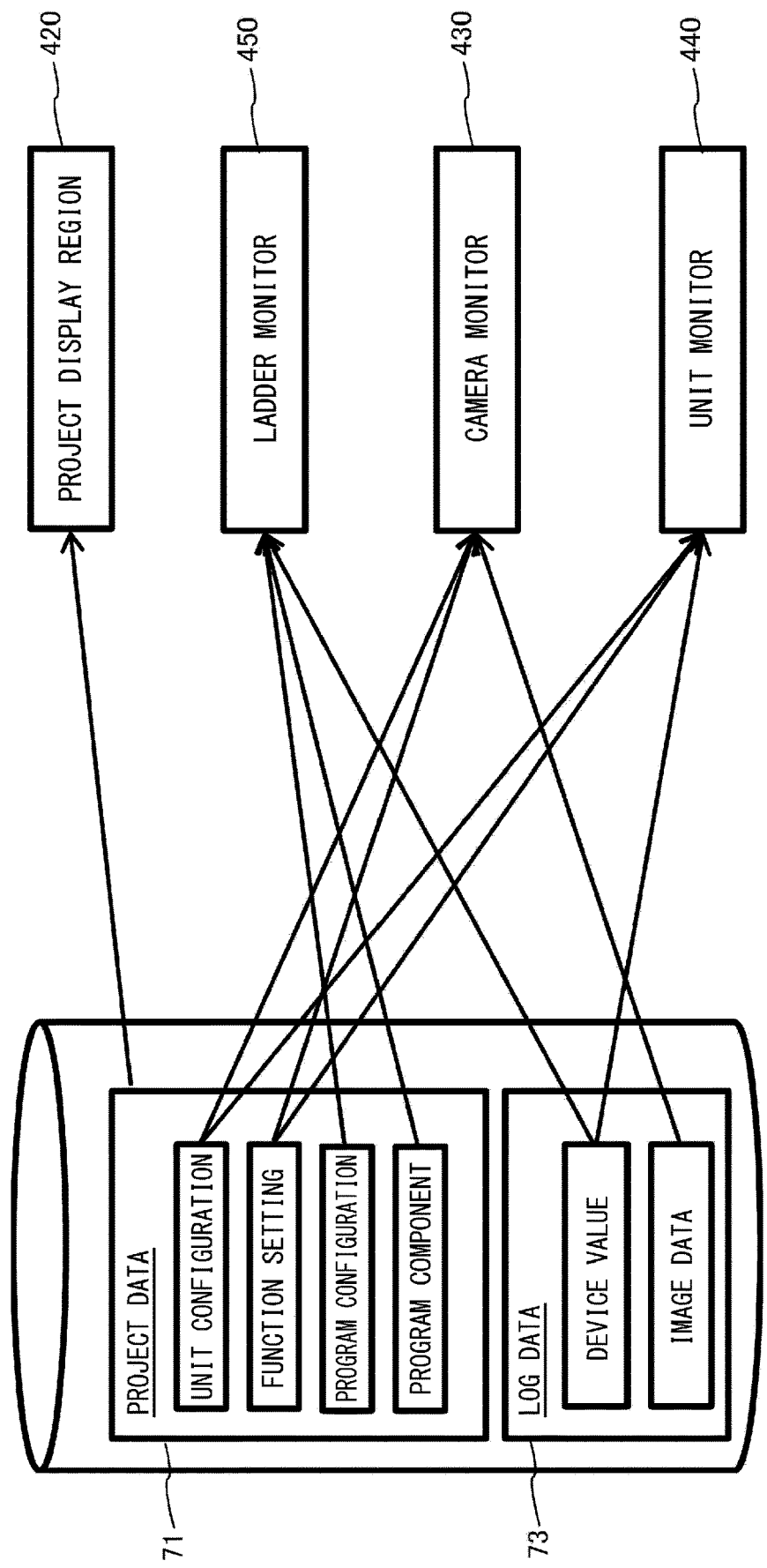
FIG. 35C is a diagram illustrating a display module of project data and log data.

FIG. 35C schematically illustrates a data source for displaying a GUI in the log replay mode. As shown in FIG. 35C, the project display region 420 reads the unit configuration, function setting, program configuration, and program components included in the project data 71 from the memory and displays them in a tree format. The ladder monitor 450 reads the program configuration (what program components are included) and the program components from the memory, displays a program component designated by the user, and reads and displays a device value corresponding to the display time from the log data 73. The camera monitor 430 reads and displays image data corresponding to the display time from the log data 73 based on information such as a unit configuration (whether there is a camera monitor or not) and function setting (function of the camera monitor; for example, in a case of a plurality of ports, the port number, imaging cycle, gain setting, etc.). The unit monitor 440 reads and displays a device value corresponding to the display time from the log data 73 based on information such as a unit configuration (what units are included) and function setting (axis configuration, axis control, etc. in the case of the motion unit).

As can be seen from FIG. 35B and FIG. 35C, the program display module 321, the image display module 323, and the unit display module 325 can be synchronized and controlled by the function of the replay control module 324 to be in cooperation with each other. Details of cooperation of the waveform display module 322 will be described later.

Here in this embodiment, it is made possible to verify whether or not the current project data is consistent with the project data 71 at the time an actual trouble occurs. To be more specific, a collating section 334 of the program display module 321 shown in FIG. 35 collates the identification information of the project data 71 (user program) to be output from the PLC 1 and the identification information of the project data 71 (user program) stored in the storing device 22 and outputs a collation result to a warning section 335. When the identification information of the project data 71 (user program), which is to be output from the PLC 1, at the time an operation record was saved is inconsistent with the identification information of the project data (user program) stored in the storing device 22, the warning section 335 displays a warning on the display section 7.

Figure 35D:
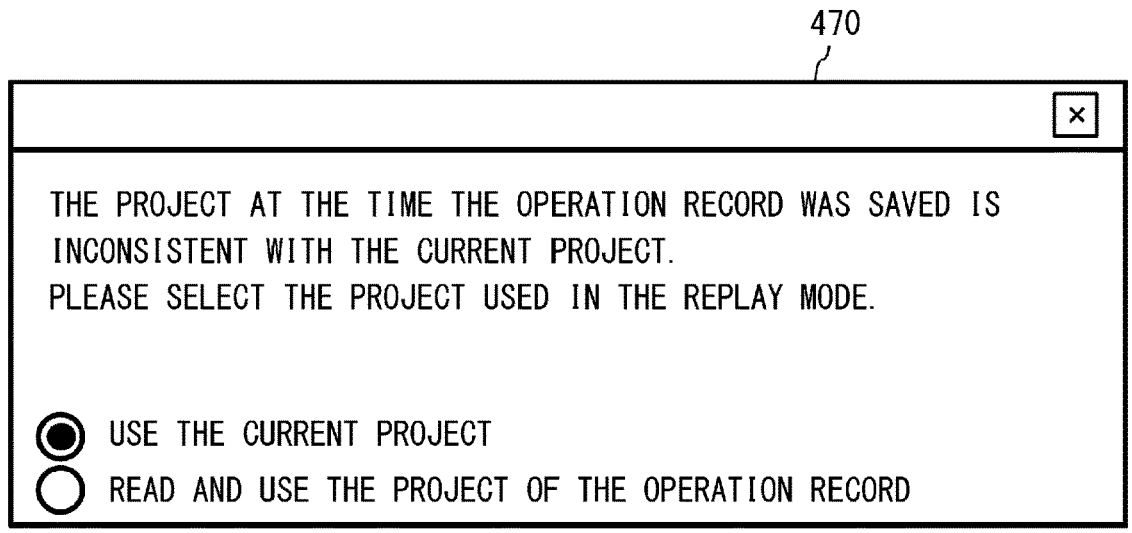
FIG. 35D is a diagram illustrating a warning screen.

For example, the warning section 335 displays a warning screen 470 as shown in FIG. 35D on the display section 7. In a specific example, it is assumed that the identification information of the project data 71 at the time the operation record was saved is inconsistent with the identification information of the current (to be replayed) project data. For example, after the project data was transferred to the PLC 1, the user edited the project data (program, function setting, etc.). In this case, the warning screen 470 shown in FIG. 35D is displayed when the mode is changed from the real time replay mode to the log replay mode based on the user operation.

In the warning screen 470 shown in FIG. 35D, the user is made to select whether to perform the log replay using the current project data directly, or to perform the log replay using the project data of the operation record. In the former case, the user performs the log replay after recognizing that the current project data is different from the project data 71 at the time an actual trouble occurs. On the other hand, in the latter case, for example, the user can use the project of the operation record to perform the log replay by designating a path (folder or directory) in the storing device 22 in which the project of the operation record is stored.

In the embodiment, identification information of two project data are compared to verify consistency and inconsistency. More specifically, identification information is added to each of the program configuration, the plurality of program components, unit configuration, and function setting for each unit included in the project data, and it is verified whether or not all of them are consistent. However, the invention is not limited thereto, and at least it is sufficient to compare the identification information of the user program including a plurality of program components to verify consistency and inconsistency.

Waveform Display Module

Figure 36A:
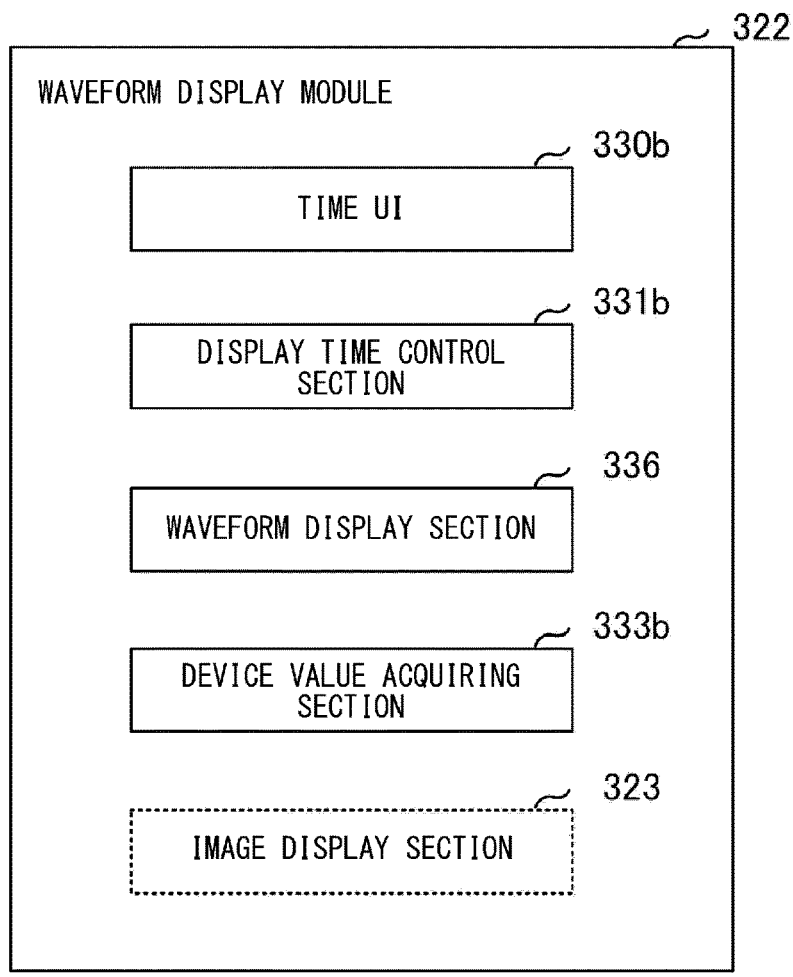
FIG. 36A is a diagram illustrating a waveform display module.

FIG. 36A shows details of the waveform display module 322. A time UI 330b provides a UI (e.g., a slide bar, etc.) for operating the acquiring time (display time) of the device displayed together with the user program. As shown in FIG. 28, the time UI 330b basically moves the bar 103 from the left to the right according to the display time provided from the replay control module 324. However, the time UI 330b receives the operation of the bar 103 through the operating section 8 and passes an operation amount of the bar 103 to the replay control module 324 through a display time control section 331b. The display time control section 331b sends display time designated by the time UI 330b to the replay control module 324, or sets display time notified from the replay control module 324 on the time UI 330b. A device value acquiring section 333b has a real time replay mode and a log replay mode. In the real time replay mode, the device value acquiring section 333b accesses the real time transmitting section 304 of the PLC 1, acquires a device value, and passes the device value to a waveform display section 336. In the log replay mode, the device value acquiring section 333b accesses the replay control module 324, acquires display time and a device value, and passes the display time and the device value to the waveform display section 336. As shown in FIG. 28, the waveform display section 336 turns a device value acquired by the device value acquiring section 333b into a waveform to display on the display section 7. It is not necessary to turn a device value into a waveform and the device value may be displayed numerically. As shown in FIG. 28, the image display module 323 displays image data output from the replay control module 324 on the display section 7. As described above, the image display module 323 may be implemented as a function of the waveform display module 322, and may also be another function as the image display module 323 (camera monitor) as shown in FIG. 34.

Figure 36B:
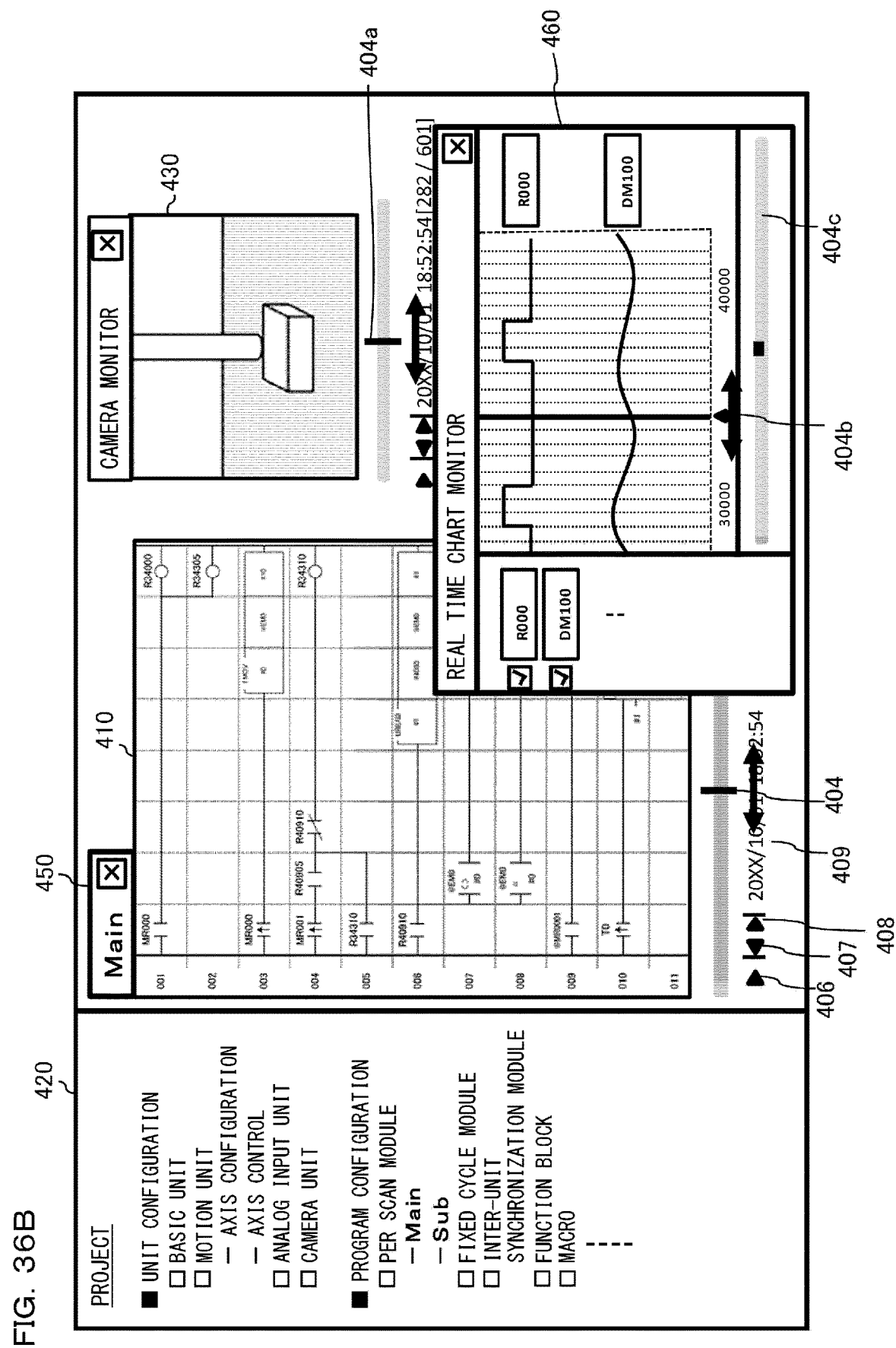
FIG. 36B is a diagram illustrating a user interface.

FIG. 36B is a schematic diagram showing an example of a GUI displayed on the display section 7 by the waveform display module 322, etc. In particular, the GUI displayed by the waveform display module 322 is a so-called real time chart monitor 460 displayed in a pop-up window in the lower right.

In FIG. 36B, the project display region 420 in a left column, the program display region 410 (ladder monitor 450) in the center, and the image display section (camera monitor 430) in an upper right column are the same as those shown in FIG. 35B. That is, these displays are done by the program display module 321 or the image display module 323. Although in FIG. 36B, the display of the unit monitor 440 by the unit display module 325 is omitted, the unit monitor 440 may also be displayed.

An outline of the real time chart monitor 460 shown in FIG. 36B is as described with reference to FIG. 28. In FIG. 36B, waveform data of the relay device R000 and waveform data of the data memory DM 100 are read from the memory and displayed. The user can freely add and delete devices to be displayed on the real time chart monitor 460 through a setting screen not shown in the drawing.

A time designating cursor 404b (equivalent to the bar 103 shown in FIG. 28; may also be referred to as a replay position cursor) is displayed below the real time chart monitor 460, and the user can click to move the position of the time designating cursor 404b. In this case, when the position of the time designating cursor 404b moves, the time designating cursor 404 in the ladder monitor 450 and the time designating cursor 404a in the camera monitor 430 move in association by the function of the replay control module 324. Specifically, in FIG. 36B, a horizontal axis in the waveform display region of the real time chart monitor 460 indicates the number of scans (which may be switched to display time). When the user clicks the time designating cursor 404b to move it by sliding to a position of a position of a predetermined number of scans, the time designating cursor 404 in the ladder monitor 450 and the time designating cursor 404a in the camera monitor 430 respectively move to a position of display time corresponding to the number of scans. Then, device values and image data corresponding to the display position after the movement are displayed. Of course, the same applies to an opposite case. That is, when the time designating cursor 404 in the ladder monitor 450 or the time designating cursor 404a in the camera monitor 430 is clicked to slide to a desired position, the time designating cursor 404b also moves to a position of the number of scans corresponding to the desired position. In this case, when the time designating cursor 404 or the time designating cursor 404a is moved by a certain amount or more, the position indicated by the time designating cursor 404b will be outside a display range of the current real time chart monitor 460. However, in the embodiment, the display range follows the position such that the position is always within the display range.

Here, as shown in FIG. 36B, in the real time chart monitor 460, the time designating cursor 404b includes a vertical line displayed superimposed on a waveform display area and a triangle shaped figure added to an lower end of the vertical line. Further, a display area bar 404c is displayed below the time designating cursor 404b. A quadrangular indicator indicating a current position is displayed at the center of the display area bar 404c. The user can change a range displayed in the real time chart monitor 460 by dragging the indicator to move to the left and right. Then, the user can perform troubleshooting to find a cause of a trouble by well utilizing the display area bar 404c. This point will be described in details with reference to FIG. 36C.

Figure 36C:
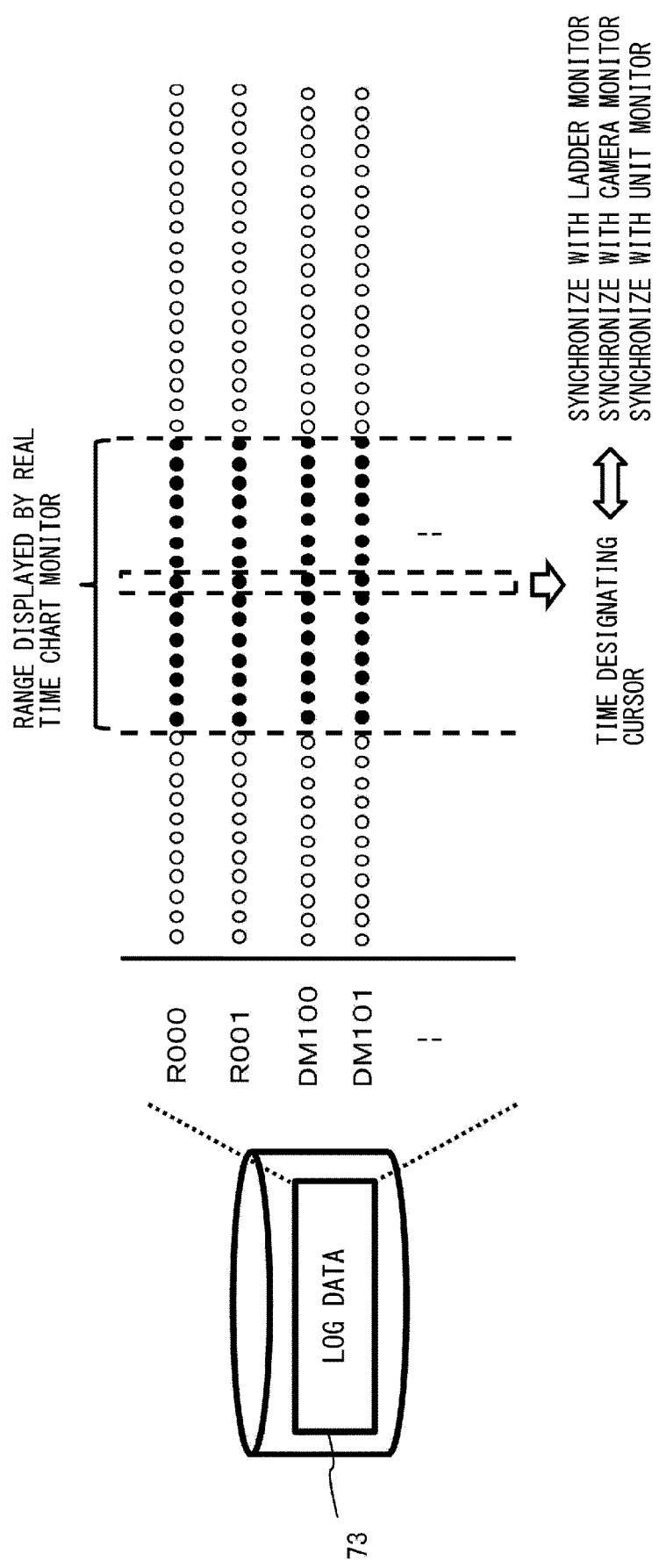
FIG. 36C is a diagram illustrating a real time chart monitor.

FIG. 36C is a diagram for illustrating a relationship between the display range and the time designating cursor 404b displayed on the real time chart monitor 460.

In FIG. 36C, the relay devices R000 and R001, and the data memories DM 100 and DM 101 are displayed on the real time chart monitor 460. For the convenience of explanation, in FIG. 36C, 15 pieces (black dots) of device values are displayed on the real time chart monitor 460 for each device. Among these device values, a device value corresponding to a specific time for each device is the device value designated by the time designating cursor 404b. In FIG. 36C, it is the device value corresponding to the central time of the range displayed by the real time chart monitor 460. When the user drags the time designating cursor 404b to, for example, move in the right direction, similar to the aforementioned time designating cursor 404 and the time designating cursor 404a, the display range follows the cursor such that the time designating cursor 404b is within the display range. On the other hand, when the user drags the quadrangular indicator of the display area bar 404c to, for example, move in the right direction, the display range of the real time chart monitor moves in the right direction. When the display range of the real time chart monitor moves only by a certain amount (moves to the right by only eight pieces of device values), the time designating cursor 404b is hidden. However, in the embodiment, even if the time designating cursor 404b is hidden, by double clicking a desired position of the waveform display region, the time designating cursor 404b will jump to the desired position so as to make troubleshooting easy. In other words, the waveform display section 336 shown in FIG. 36A has a function of receiving a designation of a desired position from the user in the waveform display region and moving the time designating cursor 404b to the received designated position.

A procedure (an example) of troubleshooting using a GUI shown in FIG. 36C will be described more specifically.

(1) The user first looks for time that is likely to be useful for investigating a cause of a trouble while visually recognizing the device waveform displayed in the waveform display region by dragging the quadrangular indicator to move in the left and right in the display area bar 404c of the real time chart monitor 460. In this case, as described above, the time designating cursor 404b may be hidden from the display range of the real time chart monitor 460.

(2) When the time where an abnormal device value is taken is found in the device waveform, the time is double clicked in the waveform display region. Then, the time designating cursor 404b jumps to the time, and the time designating cursor 404 in the ladder monitor 450 and the time designating cursor 404a in the camera monitor 430 both jump to the time.

(3) As a result, a device value corresponding to the time is displayed on the ladder monitor 450 and image data corresponding to the time is displayed on the camera monitor 430 by the replay control module 324. Therefore, the user can investigate the cause of the trouble while visually recognizing the device value and the image data.

Replay Control Module 324

Figure 37:
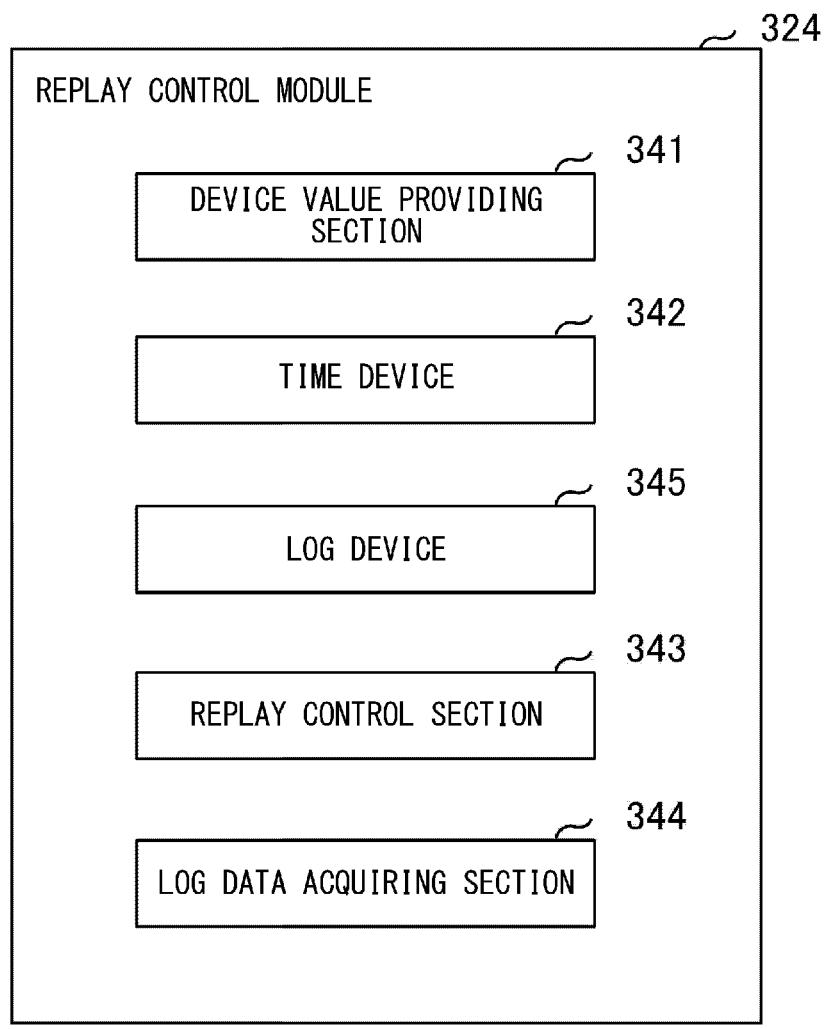
FIG. 37 is a diagram illustrating a replay control module.

FIG. 37 shows details of the replay control module 324. A device value providing section 341 provides a device value acquired from the log data 73 by a log data acquiring section 344 to the program display module 321 and the waveform display module 322. Further, the device value providing section 341 also provides a device value acquired from the log data 73 to the unit display module 325. The device value acquired from the log data 73 may also be temporarily stored in a log device 345. A device value acquiring section 333 of the program display module 321 and the waveform display module 322 requests the device value providing section 341 for a device value. The device value acquiring section 333 acquires a device value from the log device 345 and transmits the device value to the device value acquiring section 333. A time device 342 is a device which holds display time set by a replay control section 343. The device value providing section 341 may also transmit the device value (time information) held in the time device 342 to the device value acquiring section 333. Alternatively, the replay control section 343 may provide time information to display time control sections 331a and 331b. The replay control section 343 has a virtual internal clock for timing the display time and updates the time information held in the time device 342 according to the internal clock. The replay control section 343 transmits the time information held in the time device 342 to the display time control sections 331a and 331b. Upon receipt of a designation of display time from the display time control sections 331a and 331b, the replay control section 343 sets the received display time to the internal clock (time matching). Accordingly, when display time is designated by the display time control section 331a, the display time is transmitted to the display time control section 331b via the replay control section 343. Similarly, when display time is designated by the display time control section 331b, the display time is transmitted to the display time control section 331a via the replay control section 343. In this way, the display time of the program display module 321 and the display time of the waveform display module 322 are synchronized. In order to realize slow replay, fast forwarding replay, rewinding replay, etc., the replay control section 343 changes an update speed of the internal clock according to the user input from the operating section 8. The replay control section 343 may set time information of an oldest record included in the log data 73 as an initial value of the internal clock. The log data acquiring section 344 acquires a device value associated with the display time held in the time device 342 from the log data 73 and passes the device value to the device value providing section 341.

Similarly, the replay control section 343 may also synchronize the time of the image display module 323 and the unit display module 325 in addition to the display time of the program display module 321 and the display time of the waveform display module 322.

In the embodiment, the display time of each of the program display module 321, the waveform display module 322, the image display module 323, and the unit display module 325 is always synchronized with each other in the log replay mode. However, the invention is not limited thereto, and for example, it may be configured to enable the user to select whether or not to synchronize. For example, a check box indicating presence or absence of synchronization may be provided on each monitor screen and it may be in a checked state in default. Then, it is possible for the user not to synchronize the module only by removing the check with respect to a module that the user does not want to synchronize. As a result, the log display section 61 may have a selection function of selecting a module to be controlled for synchronization (following control) by the replay control module.

Display UI of Program

Figure 38:
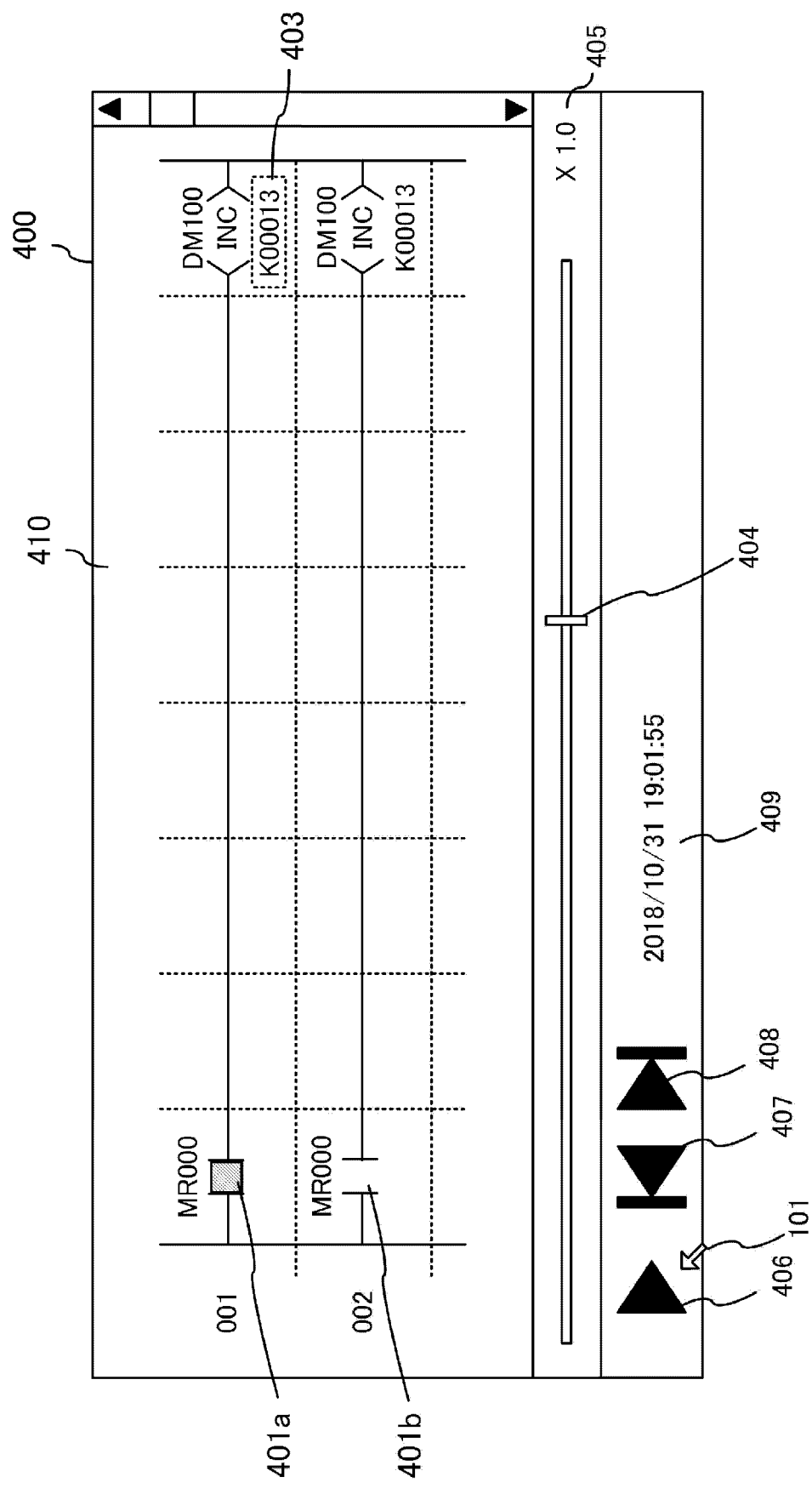
FIG. 38 is a diagram illustrating a UI displaying a user program and a device value.

FIG. 38 shows a display UI 400 provided by the program display module 321. The UI 400 described with reference to FIG. 35B and FIG. 36A will be described in more detail from another viewpoint. The program display region 410 is a region displaying the user program of the project data 71. In this example, the program display region 410 displays a ladder program (ladder diagram). The program display section 332 acquires a device value of a device used or described in the user program from the device value acquiring section 333a and displays the device value together with the user program. For example, the program display section 332 may display, when a relay device is turned on, an icon 401a indicating an on state superimposed on the user program. The program display section 332 may display, when the relay device is turned off, an icon 401b indicating an off state superimposed on the user program. The program display section 332 may acquire the device value of DM 100, which is a device of the output system, by the device value acquiring section 333a, and display the device value superimposed on a description of the DM 100 in the user program. In this example, a display region 403 of a device value is provided under the description of the DM 100. The program display section 332 displays the device value in the display region 403. Since the replay control module 324 updates the device value together with updating the display time, the program display section 332 updates the device value displayed together with the user program. The time UI 330a moves the time designating cursor 404 from right to left according to the display time acquired from the time device 342. The time designating cursor 404 can be dragged by the pointer 101. When the time UI 330a detects that the time designating cursor 404 has been dragged by the pointer 101, the display time control section 331a makes the replay control section 343 to stop updating the display time and notifies the replay control section 343 with a dragging amount of the time designating cursor 404. The replay control section 343 adjusts the count value (display time) of the internal clock in accordance with the dragging amount. The time UI 330a may display an update speed (e.g., . . . , 2.0 times, 1.0 times, 0.5 times, 0.1 times, . . . ) of the display time on a speed designating section 405. The speed designating section 405 may be realized by a pull-down menu which displays a list of a plurality of update speeds and where one of the update speeds can be selected. When the time UI 330a detects a click by the pointer 101 to the speed designating section 405, the time UI 330a may display such a pull-down menu to accept a selection of the update speed. The replay button 406 is a button for instructing a time series display of device values. When the time UI 330a detects that the replay button 406 has been clicked by the pointer 101, the time UI 330a instructs the replay control section 343 to start updating the display time at the display time control section 331a. This instruction is equivalent to an instruction for starting a display of device values or an instruction for resuming a display. A one-step reverse replay button 407 is a button for instructing that the device values be displayed in time series while updating (rewinding) the display time one step by one step. When the time UI 330a detects that the one-step reverse replay button 407 has been clicked by the pointer 101, the time UI 330a instructs the display time control section 331a to reverse the display time by one step. A one-step replay button 408 is a button for instructing that the device values be displayed in time series while updating the display time one step by one step. When the time UI 330a detects that the one-step replay button 408 has been clicked by the pointer 101, the time UI 330a instructs the display time control section 331a to forward the display time by one step. When the one-step replay is executed, the replay control section 343 does not update the display time as long as the one-step reverse replay button 407 or the one-step replay button 408 is not operated. During the execution of the one-step replay, the replay control section 343 resumes updating the display time at an update speed designated by the speed designating section 405 when the replay button 406 is operated. The time display region 409 is a region that displays display time held in the time device 342. The display time control section 331a displays the display time acquired from the time device 342 in the time display region 409.

HMI Emulator

The PLC 1 can be connected with an external display apparatus called HMI. The HMI may have a touch panel type input device. The HMI reads device values held in the device section 34 of the PLC 1 and displays the device values on the display apparatus. The project creating section 50 sets a UI displayed by the HMI and device values displayed by the UI, and saves the UI and the device values in the project data 71. The debugging section 314 has an HMI emulator and operates the emulator according to the project data 71 to check an operation of the HMI. The log display section 61 provides device values of the log data 73 to the HMI emulator. The HMI emulator displays the device values provided in time series on the UI.

Figure 39:
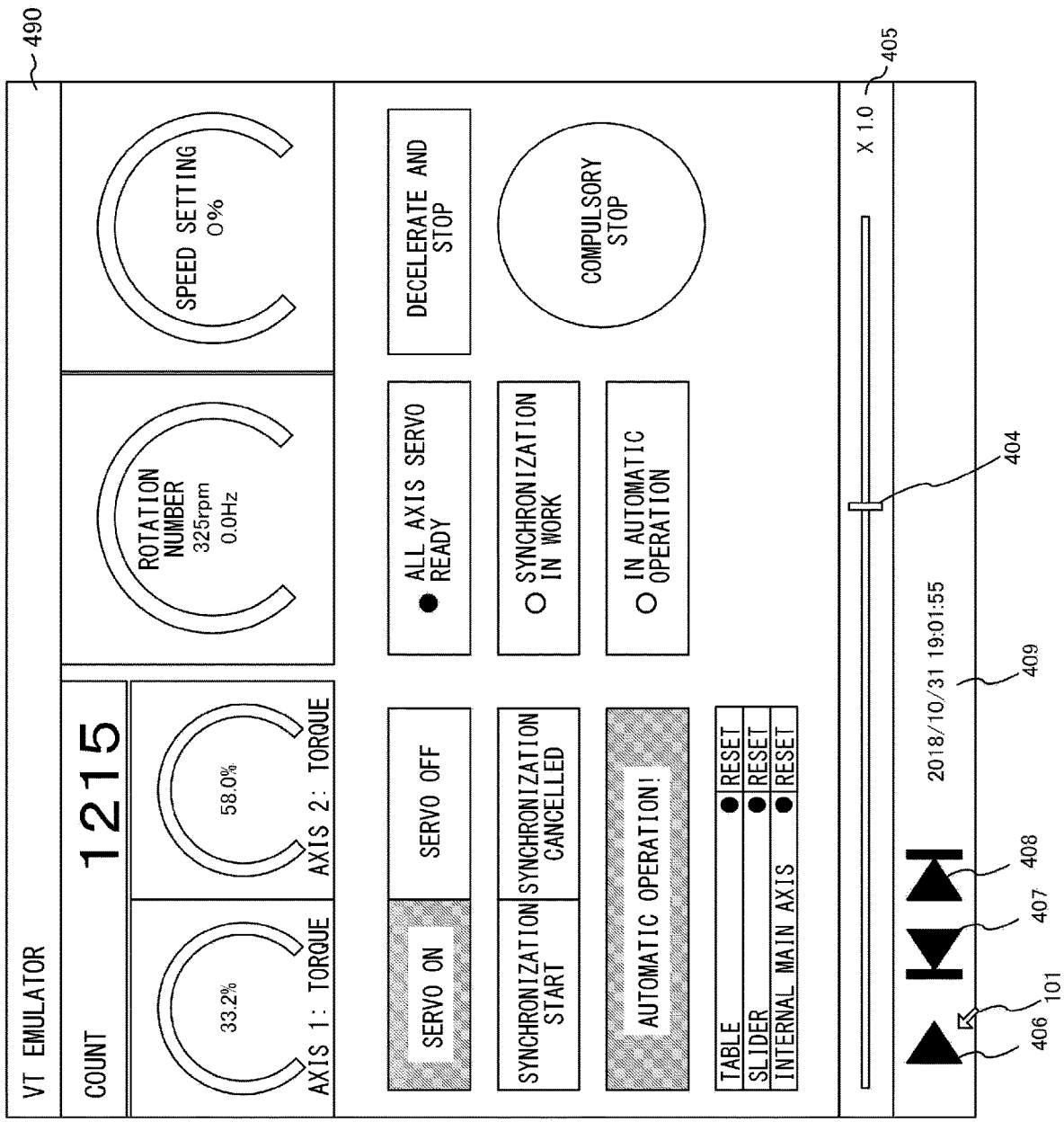
FIG. 39 is a diagram illustrating an HMI emulator.

FIG. 39 shows a UI 490 of the HMI emulator. In this example, the HMI emulator is included in the program display module 321. The program display section 332 reflects a device value provided by the replay control section 343 in a display region of the UI 490. The UI 490 may have a time control object related to the replay control included in the UI 400, such as the time designating cursor 404 and the replay button 406. An operation of the time control object in the UI 490 is reflected in the UI 400 or the UI shown in FIG. 28 through the replay control section 343. For example, when the time designating cursor 404 is operated to the left in the UI 490, the time designating cursor 404 of the UI 400 also moves to the left and the bar 103 shown in FIG. 28 also moves to the left in association with the display time provided from the replay control section 343. When the bar 103 shown in FIG. 28 is operated to the left, the time designating cursor 404 of the UI 400 and UI 490 also moves to the left in association with the display time provided from the replay control section 343. This is because they are all synchronized with the same display time held in the time device 342.

Flow Chart Relating to Log Display

Program Display Module

Figure 40:
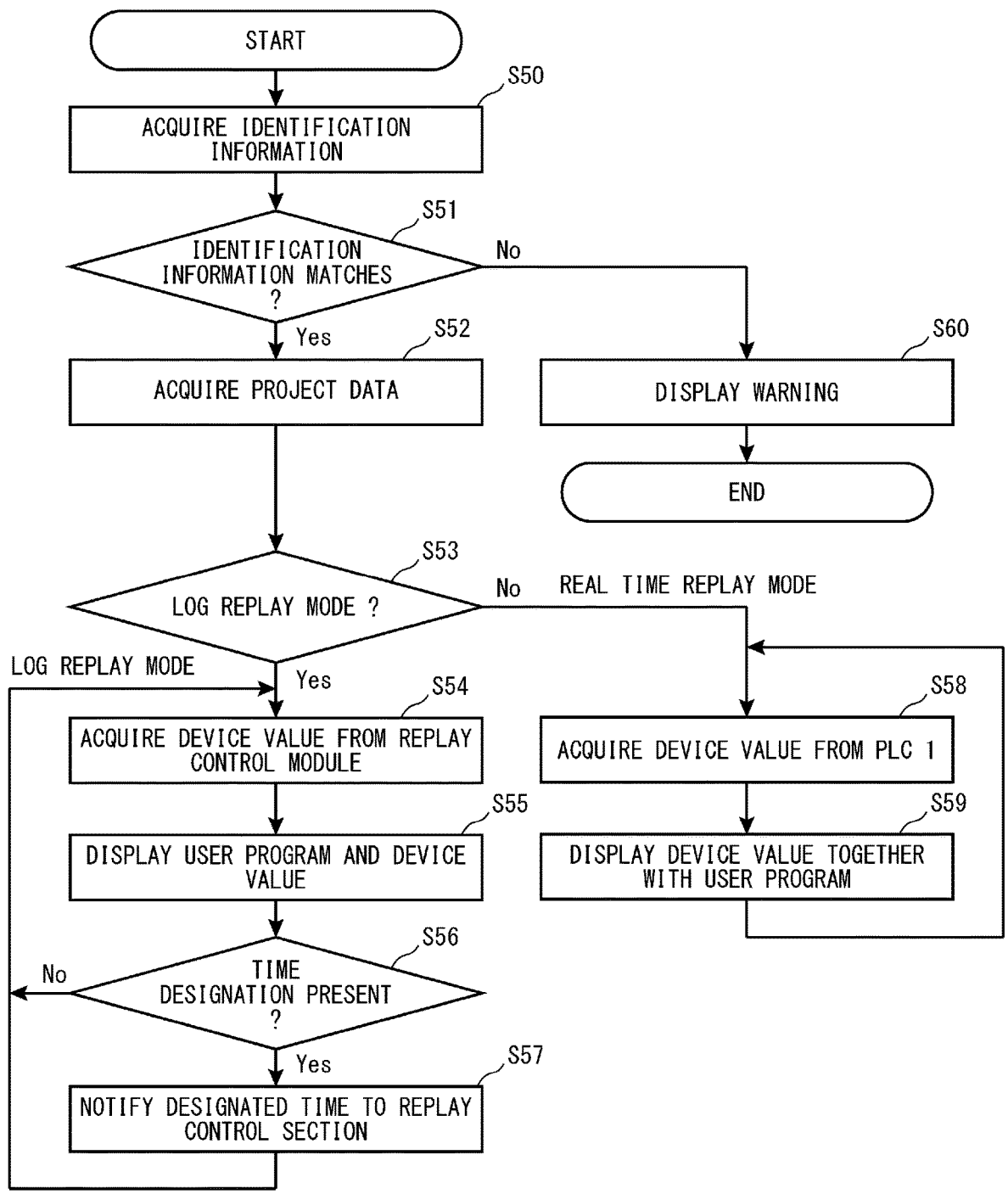
FIG. 40 is a flow chart showing processing of displaying a user program and a device value.

FIG. 40 shows display processing executed by the program display module 321. S50, S51 and S60 may be executed only when the project data 71 cannot be acquired from the PLC 1. When the project data 71 can be acquired from the PLC 1, the project data 71 from the PLC 1 is used. When the project data 71 cannot be acquired from the PLC 1, the project data 71 held in the PC 2 is used.

In S50, the CPU 21 (the collating section 334) acquires the identification information of the project data 71 held in the PLC 1 and the identification information of the project data 71 held in the PC 2.

In S51, the CPU 21 (the collating section 334) determines whether the identification information of the project data 71 held in the PLC 1 and the identification information of the project data 71 held in the PC 2 are consistent or not. When the two are inconsistent, the CPU 21 proceeds to S60. In S60, the CPU 21 (the warning section 335) displays a warning indicating that the identification information of the project data 71 held in the PLC 1 and the identification information of the project data 71 held in the PC 2 are inconsistent on the display section 7. When the two are consistent, the CPU 21 proceeds to S52.

In S52, the CPU 21 (the program display section 332) acquires the project data 71 from the PLC 1 or the storing device 22.

In S53, the CPU 21 (the program display section 332) determines whether the log replay mode has been selected or the real time replay mode has been selected based on the information input from the operating section 8. When the real time replay mode has been selected, the CPU 21 proceeds to S58. In S58, the CPU 21 (the device value acquiring section 333a) acquires a device value from the real time transmitting section 304 of the PLC 1 without via the replay control module 324. In S59, the CPU 21 (the program display section 332) displays the device value together with the user program included in the project data 71 on the display section 7. When the log replay mode has been selected, the CPU 21 proceeds to S54.

In S54, the CPU 21 (the device value acquiring section 333a) starts the replay control module 324 and acquires the display time and the device value of the log data 73 from the replay control module 324.

In S55, the CPU 21 (the program display section 332) displays the device value and the display time together with the user program included in the project data 71 on the display section 7.

In S56, the CPU 21 (the display time control section 331a) determines whether a time designation has been detected by the time UI 330a. As described above, the time designation is executed by an operation of the time designating cursor 404. When the time designation is not detected, the CPU 21 returns to S54. When the time designation is detected, the CPU 21 proceeds to S57.

In S57, the CPU 21 (the display time control section 331a) notifies the designated time input by the time designating cursor 404 to the replay control section 343 of the replay control module 324. The CPU 21 returns to S54.

Waveform Display Module

Figure 41:
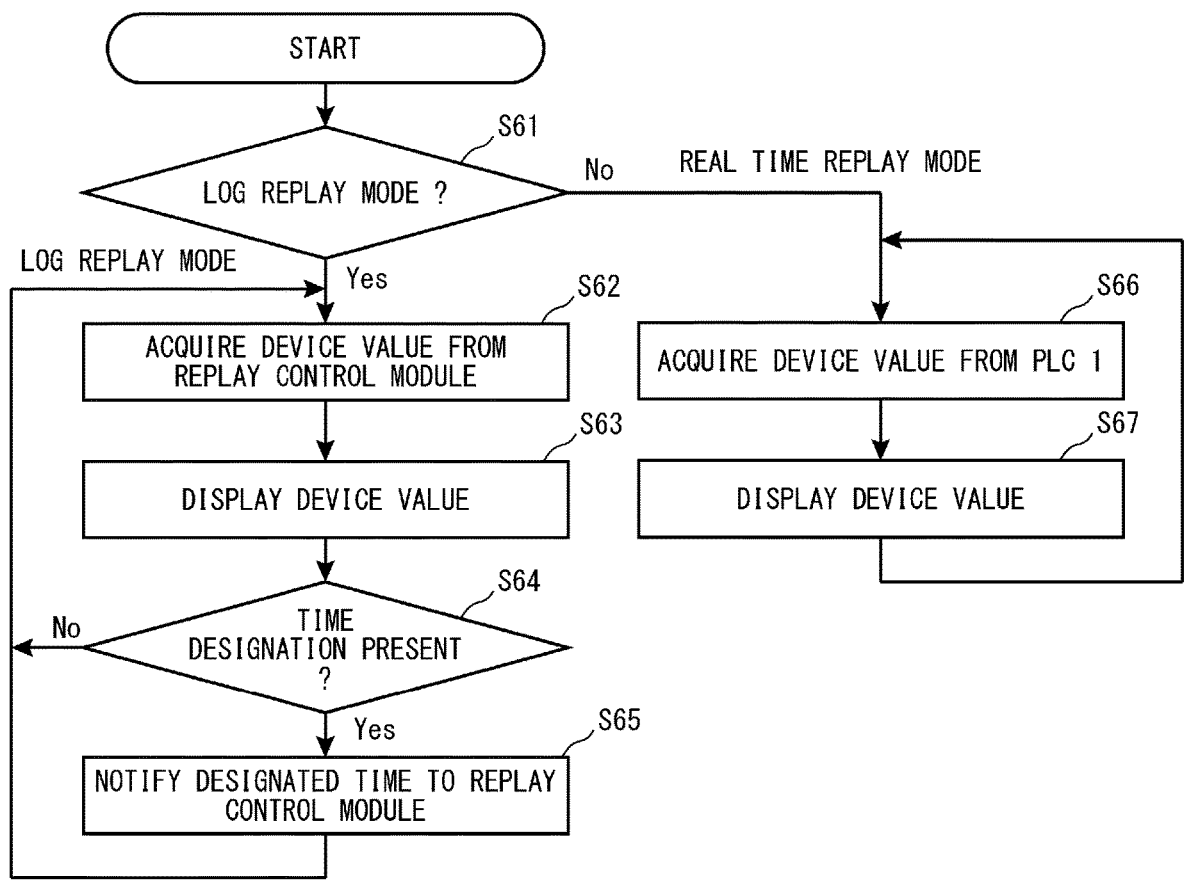
FIG. 41 is a flow chart showing processing of displaying a waveform of a device value.

FIG. 41 shows display processing executed by the waveform display module 322.

In S61, the CPU 21 (the waveform display section 336) determines whether the log replay mode has been selected or the real time replay mode has been selected based on the information input from the operating section 8. When the real time replay mode has been selected, the CPU 21 proceeds to S66. In S66, the CPU 21 (the device value acquiring section 333b) acquires a device value from the real time transmitting section 304 of the PLC 1 without via the replay control module 324. In S67, the CPU 21 (the waveform display section 336) displays the device value on the display section 7. When the log replay mode has been selected, the CPU 21 proceeds to S62.

In S62, the CPU 21 (the device value acquiring section 333b) starts the replay control module 324 and acquires the device value and the display time from the replay control module 324.

In S63, the CPU 21 (the waveform display section 336) displays the device value and the display time on the display section 7.

In S64, the CPU 21 (the display time control section 331b) determines whether a time designation has been detected by the time UI 330b. As described above, the time designation is executed by the bar 103. When the time designation is not detected, the CPU 21 returns to S62. When the time designation is detected, the CPU 21 proceeds to S65.

In S65, the CPU 21 (the display time control section 331b) notifies the designated time input by the bar 103 to the replay control section 343 of the replay control module 324. The CPU 21 returns to S62.

Replay Control Module

Figure 42:
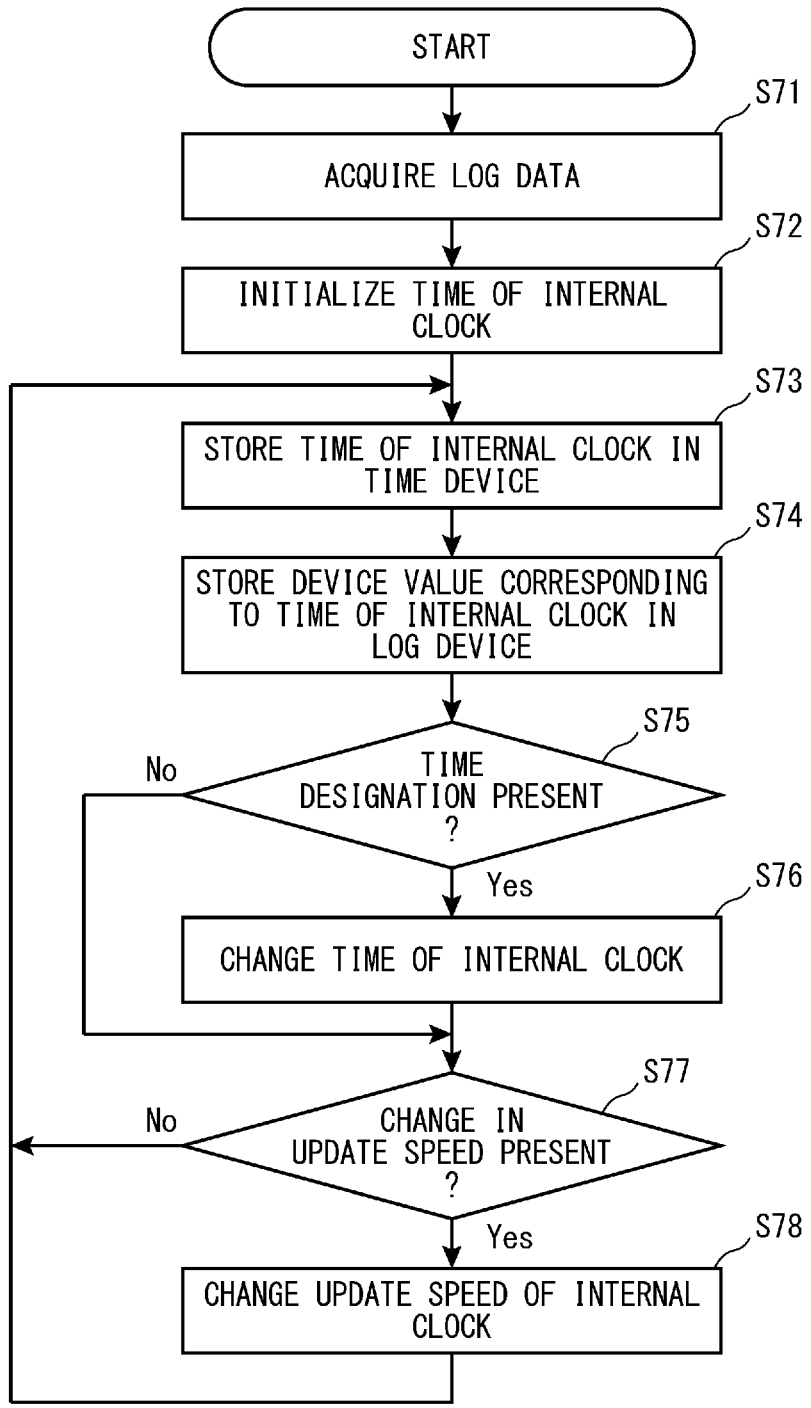
FIG. 42 is a flow chart showing a replay control.

FIG. 42 shows a replay control executed by the replay control module 324.

In S71, the CPU 21 (the log data acquiring section 344) acquires the log data 73 from the PLC 1 and stores the log data 73 in the storing device 22.

In S72, the CPU 21 (the replay control section 343) initializes the time of the internal clock.

In S73, the CPU 21 (the replay control section 343) acquires the time of the internal clock and stores the time in the time device 342.

In S74, the CPU 21 (the replay control section 343) acquires a device value corresponding to the display time held in the time device 342 from the log data 73 and stores the device value in the log device 345. In this way, the device value providing section 341 can provide a device value and display time to the program display module 321 and the waveform display module 322.

In S75, the CPU 21 (the replay control section 343) determines whether or not a time designation has been received from the display time control section 331. When a time designation has been received, the CPU 21 proceeds to S76. When the time designation has not been received, the CPU 21 proceeds to S77.

In S76, the CPU 21 (the replay control section 343) changes the time of the internal clock according to the time designation from the display time control section 331.

In S77, the CPU 21 (the replay control section 343) determines whether or not a change instruction of the update speed has been received from the display time control section 331. When the change instruction has been received, the CPU 21 proceeds to S78. When the change instruction has not been received, the CPU 21 proceeds to S73.

In S78, the CPU 21 (the replay control section 343) changes the update speed of the internal clock according to an update speed designated by the display time control section 331. Then, the CPU 21 proceeds to S73.

Narrowing Program Components

The PC 2 extracts a device which is a logging object during log setting, or extracts another device related to a specific device when displaying a log. The following examples are adopted to explain the extraction processing.

Figure 43:
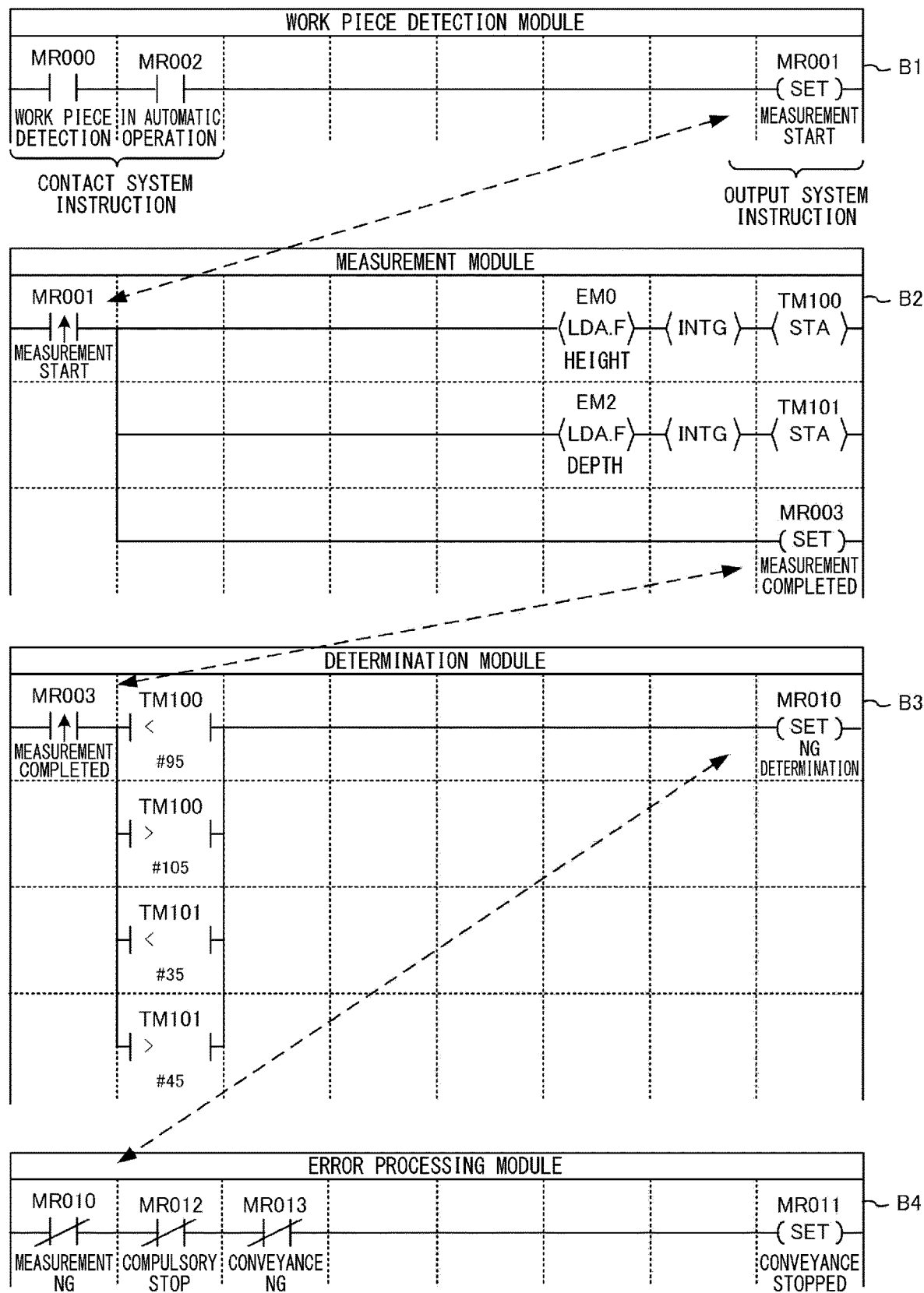
FIG. 43 is a diagram illustrating a plurality of program components related to each other.

FIG. 43 shows a plurality of modules included in the ladder program. In this example, the following PLC 1 is assumed. A work piece is conveyed by a conveyor belt. When a work piece detection sensor detects a work piece, a height sensor measures a height of the work piece and a depth sensor measures a depth of the work piece. When the height of the work piece is not within a predetermined range, it is determined as measurement NG. Similarly, when the depth of the work piece is not within a predetermined range, it is determined as measurement NG. Program modules for realizing these series of processing are disclosed in FIG. 43. Each module includes a contact system instruction (input system instruction) and an output system instruction. The contact system instruction is a condition for executing the output system instruction.

In a work piece detection module B1, the device MR000 is a relay device which is turned on when a work piece is detected. The device MR002 is a relay device which is turned on when the PLC 1 is in an automatic operation. The device MR001 is a relay device for instructing the expansion unit 4 to start measurement. The device MR000 is turned on when a work piece is detected during the automatic operation.

In a measurement module B2, the contact system instruction describes executing the output system instruction when the MR001 is turned on. In this example, it is described that a measurement value of the height acquired by the expansion unit 4 is stored in a device EM0, and the measurement value is to be copied to a device TM100. Similarly, it is described that a measurement value of the depth acquired by the expansion unit 4 is stored in a device EM2, and the measurement value is to be copied to a device TM101. Further, a device MR003 for managing the completion of measurement is set on.

A determination module B3 is a module executed when the device MR003 is turned on, that is, when the measurement is completed. Here, a device MR010 is turned on when the measurement result does not meet a criterion. This means measurement NG. To be more specific, the MR010 is turned on when the measurement value of the height stored in the device TM100 is less than 95. The MR010 is turned on when the measurement value of the height stored in the device TM100 is greater than 105. The MR010 is turned on when the measurement value of the depth stored in the device TM101 is less than 35. The MR010 is turned on when the measurement value of the depth stored in the device TM100 is greater than 45.

An error processing module B4 is a module for stopping the conveyance of the conveyor belt when any error occurs. In this example, MR011 is turned on (conveyance stopped) when the MR010 is turned on (measurement NG), or when MR012 is turned on (compulsory stop), or when MR013 is turned on (conveyance NG).

As can be seen from FIG. 43, a device described in a contact system instruction of a module is described in an output system instruction of another module. On the contrary, a device described in an output system instruction of a module is described in a contact system instruction of another module. For example, the device MR001 described in the output system instruction of the work piece detection module B1 is described in the contact system instruction of the measurement module B2.

Accordingly, the work piece detection module B1 and the measurement module B2 are extracted as modules related to each other. Next, when focusing on the device MR003 described in the output system instruction of the measurement module B2, it can be seen that MR003 is described in the contact system instruction of the determination module B3. Accordingly, the measurement module B2 and the determination module B3 are extracted as modules related to each other. Next, when focusing on the device MR010 described in the output system instruction of the determination module B3, it can be seen that MR010 is described in the contact system instruction of the error processing module B4. Accordingly, the determination module B3 and the error processing module B4 are extracted as modules related to each other. In this way, a plurality of modules involved in specific processing and a plurality of devices described in the plurality of modules are extracted. The extraction processing is executed by the device extracting section 53. The device extracting section 53 may be mounted on the log display section 61. That is, the log display section 61 may extract a plurality of modules related to each other, further extract a plurality of devices described in the extracted plurality of modules, and acquire each device value of the extracted plurality of devices from the log data 73 to display on the display section 7.

Figure 44:
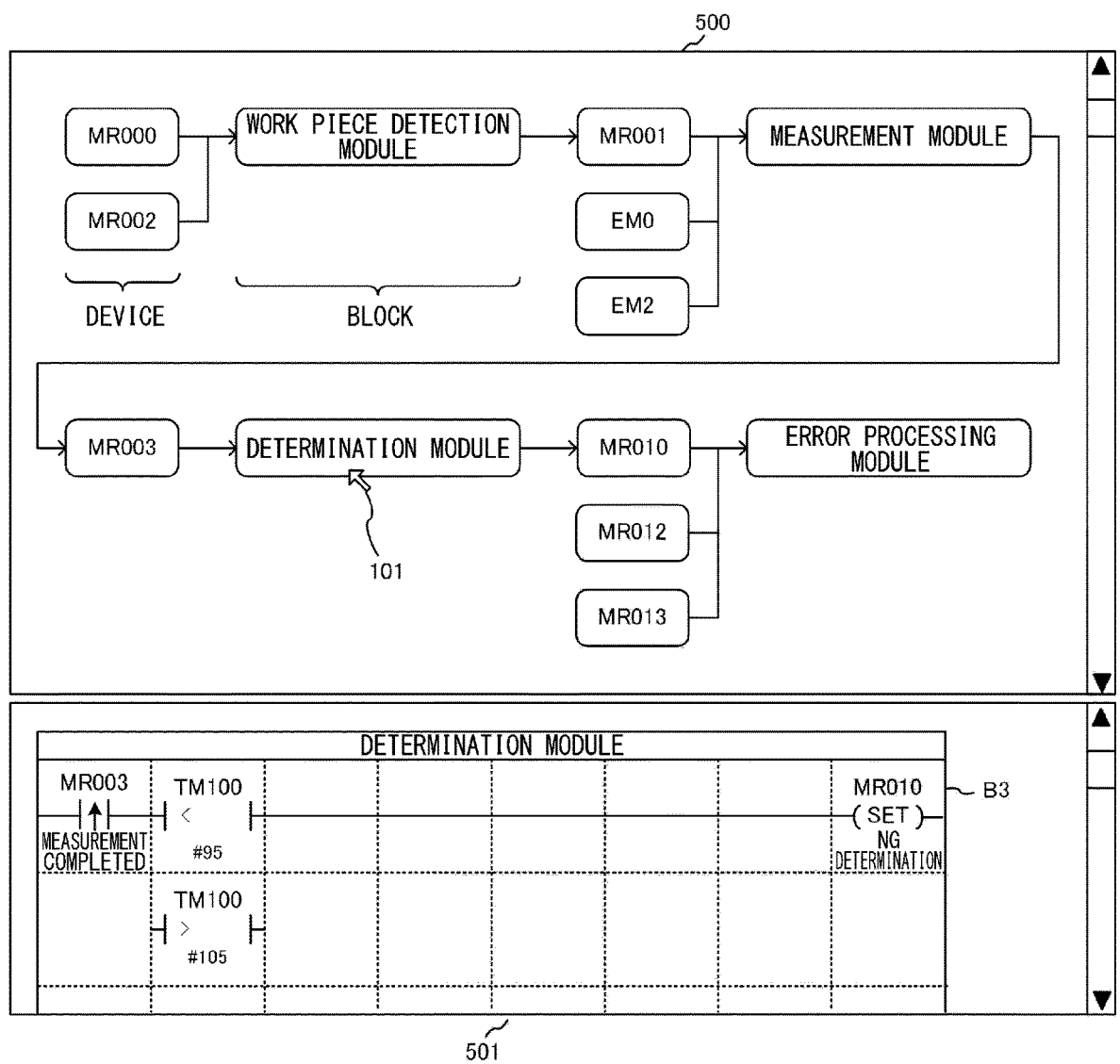
FIG. 44 is a diagram illustrating a UI displaying an extraction result of a program component and a device.

FIG. 44 shows a UI 500 displaying an extraction result. The log display section 61 or the device extracting section 53 may create the UI 500 which displays devices and blocks (program components) extracted from the user program and display the UI 500 on the display section 7. The UI 500 can simply display the extraction result of the devices and the program components. Therefore, the user will easily grasp an overall image of the extraction result. The log display section 61 or the device extracting section 53 may display details of the clicked block on UI 501 when any one of the blocks included in the UI 500 is clicked by the pointer 101. This will allow the user to quickly access the details of the extract block. The log display section 61 or the device extracting section 53 may use the UI illustrated in FIG. 43 to display the extraction result.

Extraction Processing of Blocks and Devices

Figure 45:
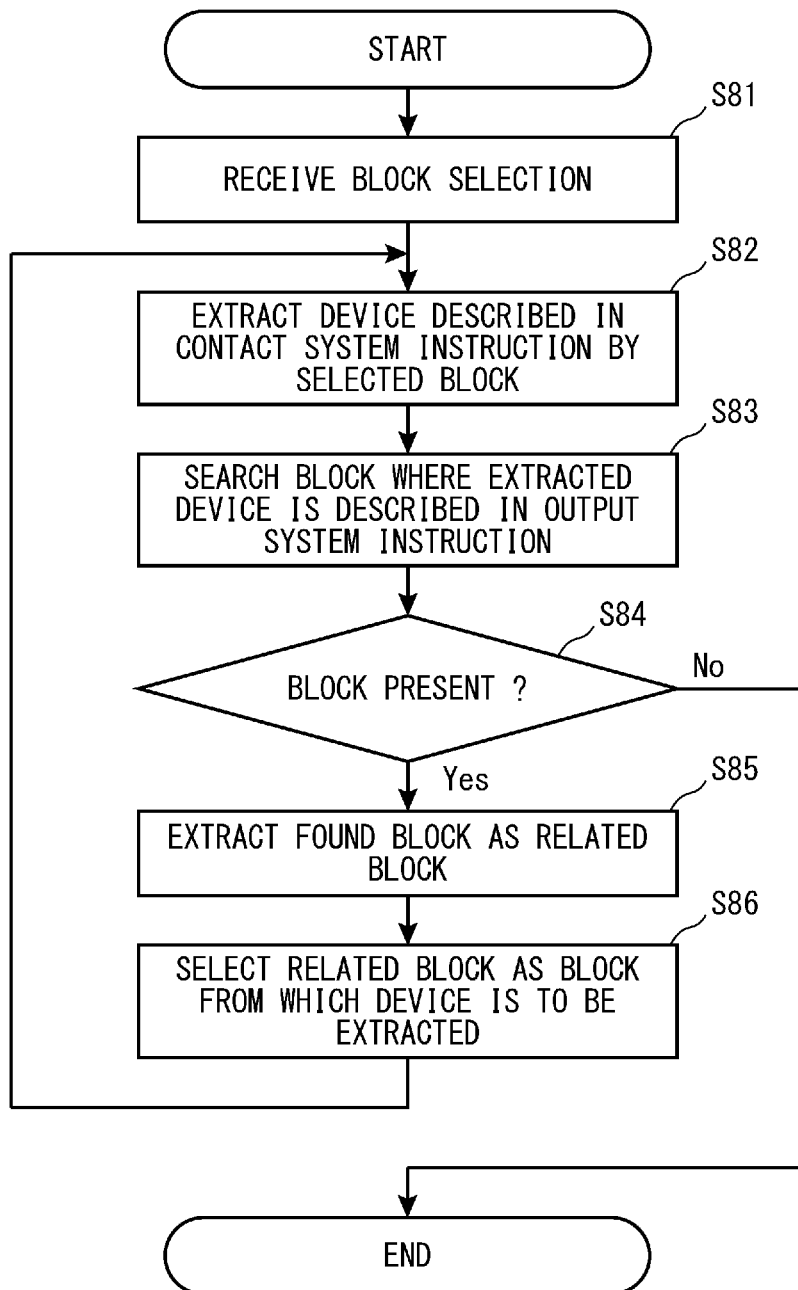
FIG. 45 is a flow chart showing extraction processing of a program component and a device.

FIG. 45 shows extraction processing of a block and a device executed by the device extracting section 53. Here, the project data 71 includes a plurality of blocks (program components). Accordingly, the device extracting section 53 refers to the project data 71 and extracts a block or a device.

In S81, the CPU 21 (the device extracting section 53) accepts a block selection through the operating section 8. The device extracting section 53 may accept a device designation through the operating section 8. In this case, the device extracting section 53 may extract one or more blocks where a designated device is described. When a plurality of blocks are extracted, the device extracting section 53 may accept a user selection of one block from the plurality of blocks. Such a device would be a device that the user would focus on, for example, in debugging. The user sets a condition (e.g., a saving trigger) for outputting the log data 73 to the output section 84 of the PLC 1 through the log setting section 51. To be more specific, that a specific relay device is turned on is set as the condition. Therefore, the device extracting section 53 may designate a relay device which has been set as a saving trigger.

In S82, the CPU 21 (the device extracting section 53) extracts a device described in a contact system instruction of a selected block.

In S83, the CPU 21 (the device extracting section 53) searches another block where the extracted device is described in the output system instruction.

In S84, the CPU 21 (the device extracting section 53) determines whether or not another block, where the extracted device is described in the output system instruction, has been found. The CPU 21 ends the extraction processing if another block has not been found. The CPU 21 proceeds to S85 when another block has been found.

In S85, the CPU 21 (the device extracting section 53) extracts the found block as a related block. For example, the device extracting section 53 registers identification information (e.g., name, file name, etc.) of the found block in a list for managing related blocks.

In S86, the CPU 21 (the device extracting section 53) selects a related block as a block from which a device is to be extracted. Thereafter, the CPU 21 returns to S82 to execute extraction processing on the newly selected block. In S86, the selected related block is a block which has never been selected as a device extraction object before. When device extraction processing with respect to all the blocks registered in the list is completed, the device extracting section 53 ends the extraction processing. The CPU 21 (the device extracting section 53) may create a list indicating a relationship between the extracted device and the block from which the device has been extracted. The device extracting section 53 or the log display section 61 may refer to these lists to create the UI shown in FIG. 43, the UIs 500 and 501 shown in FIG. 44.

Specific Example of Debugging

Figure 46:
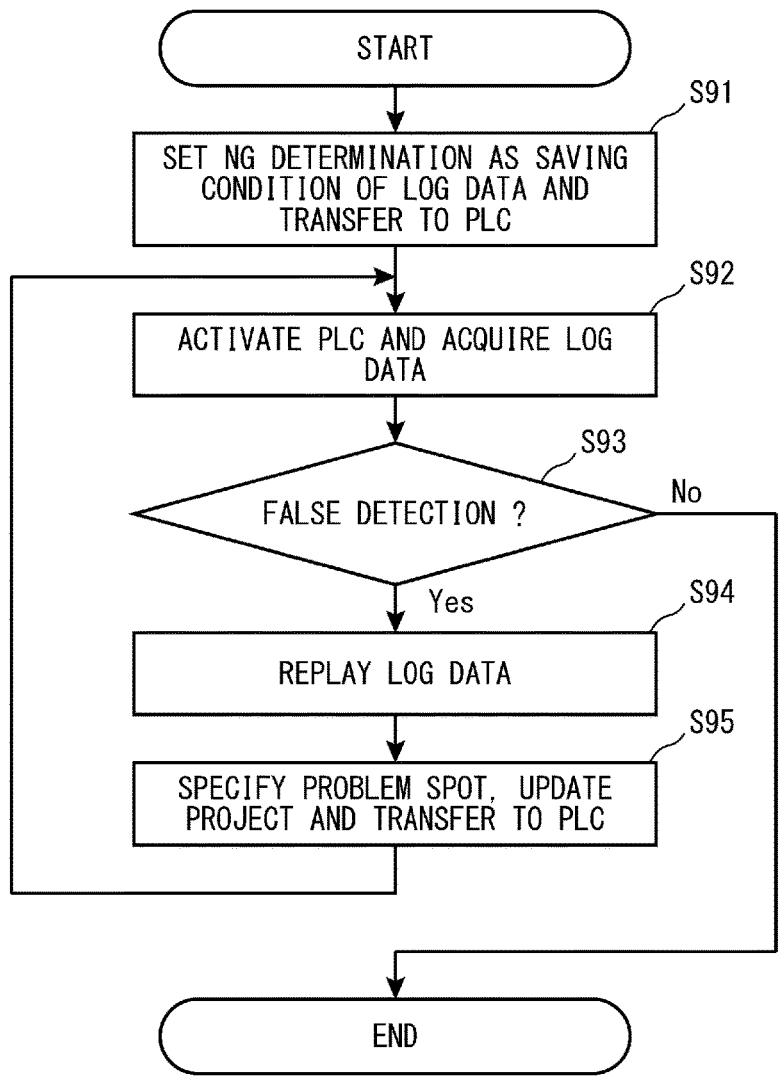
FIG. 46 is a flow chart illustrating a flow of debugging.

FIG. 46 shows debugging processing executed by the user.

In S91, the user sets an NG determination as a saving condition of the log data 73 through the log setting section 51. According to FIG. 43, that the device MR010 managing the NG determination is turned on is determined as a saving condition of the log data 73. The user transfers the project data 71 and the log setting data 72 to the PLC 1.

In S92, the user activates the PLC 1. The PLC 1 executes the project data 71, and saves the log data 73 in the memory card 36 when the saving condition in the log setting data 72 is satisfied. In the example shown in FIG. 43, the conveyor belt stops when an NG determination occurs, and thus the user knows that an error has occurred.

In S93, the user checks a work piece and determines whether the NG determination is a false detection or not. For example, the user measures the height and depth of the work piece and determines whether the criterion is met or not. When the work piece does not meet the criterion, the user determines that the NG determination is a false detection.

Figure 47:
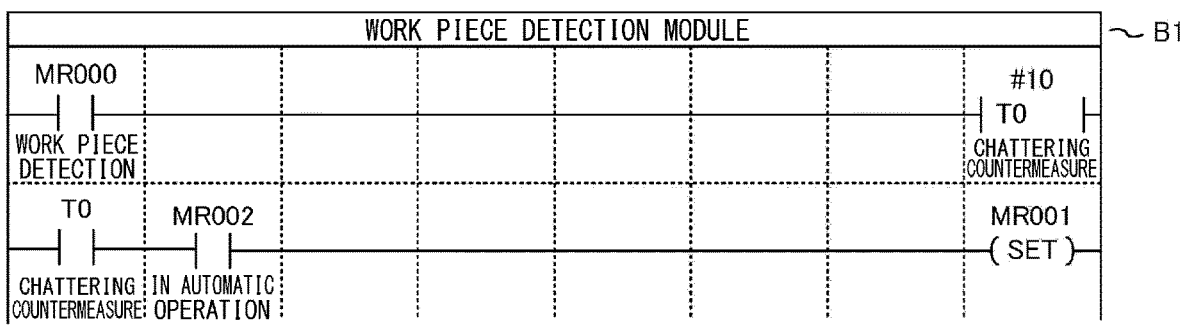
FIG. 47 is a diagram illustrating a revised program component.

In S94, the user removes the memory card 36 from the PLC 1, connects the memory card 36 to the PC 2, and replays the log data 73 saved in the memory card 36. The program display module 321 displays a device value included in the log data 73 in association with the user program. To be more specific, the program display module 321 designates the device MR010 employed as a saving condition, causes the device extracting section 53 to execute extraction processing of blocks and devices, and displays the same on the UI shown in FIG. 43, the UIs 500 and 501 shown in FIG. 44. Further, the waveform display module 322 turns a device value displayed by the program display module 321 into a waveform and display the waveform. For example, a measurement value of the height of a work piece held in EM0 and the depth of a work piece held in EM2 are turned into waveforms and are displayed on the display section 7. The device value of the device MR000 which manages work piece detection is also turned into a waveform and displayed. The user observes these waveforms and finds out that chattering of the work piece detection sensor is a cause of the false detection. The user operates the editing section 311 and revises the work piece detection module B1 as shown in FIG. 47 as a chattering countermeasure. According to this revision, when a work piece has been detected continuously for one second or longer by the work piece detection sensor, the device MR001 for starting the measurement is turned on. The user transfers the updated project data 71 to the PLC 1, activates the PLC 1, and determines whether the chattering countermeasure has succeeded or not.

By synchronizing and displaying the user program and a waveform of a device value as described above, the user can efficiently execute specification of a cause of a false detection and debugging of the user program for eliminating the cause.

SUMMARY

As shown in FIG. 17, the executing section 80 is an example of a program executing section which repeatedly executes a user program. The device section 34 is an example of a device storing section which has a plurality of devices which are memory regions referred to by the program executing section. The recording section 81 is an example of a device recording section which records a device value stored in any one of the plurality of devices in time series. The PC 2 is an example of a program creation supporting apparatus which is connected to a programmable logic controller and supports the creation of a user program.

As shown in FIG. 6, the project creating section 50 is an example of a program creating section which creates a plurality of program components included in the user program, the program components including an instruction word relating to any one of a plurality of devices, based on the user input via the display section 7. The component designating section 52 is an example of a program component designating section which designates, among a plurality of program components, a program component from which a specific device which is an object to be recorded by the device recording section is extracted. The device extracting section 53 is an example of a device extracting section which analyzes the program component designated by the program component designating section and extracts the device described in the program component. The recording section 81 of the basic unit 3 is configured to record in time series the device values stored in a specific device extracted as a recording object by the device extracting section.

In this way, by designating a program component by the user, a device is extracted from the designated program component. In addition, the user can also exclude a specific program component from the extraction objects of the devices. Therefore, a burden of registration by the user of devices which are logging objects in the PLC is reduced.

The extracting section 53 may analyze a program component created by the program creating section 63 and extracts a device described in the program component. The component designating section 52 may designate, among a plurality of program components created by the program creating section 63, a program component in which a specific device which is an object to be recorded by the recording section 81 is used or described taking the program component as a unit (per program component). In this case, the recording section 81 records device values stored in a specific device used or described in a program component designated by the component designating section 52, which is a device extracted by the extracting section 53, in time series.

The extracting section 53 may analyze a plurality of program components created by the program creating section 63 and extract a device used or described in each program component. The component designating section 52 may designate at least one program component among the plurality of program components created by the program creating section 63. The recording section 81 records device values stored in the device used or described in the program component designated by the component designating section 52 among the plurality of program components analyzed by the extracting section 53, in time series. For example, a plurality of program components may be analyzed in advance and a plurality of devices may be extracted. That is, a list indicating the extracted devices may be created for each program component. Further, when the user designates any one program component, the list of the designated program component may be read and the device listed in the list may be selected as a recording object.

The component designating section 52 may be configured to designate at least one program component among a plurality of program components created by the program creating section 63. The extracting section 53 may analyze the program components designated by the component designating section 52 and extract a device used or described in each program component. The recording section 81 records device values stored in a specific device extracted by the extracting section 53 in time series. Thus, the extraction of the device may be executed after the program component has been designated. In this way, the burden of the extraction processing will be relieved.

The extracting section 53 may analyze a plurality of program components created by the program creating section 63 and extract devices used or described in each program component. The component designating section 52 may designate at least one program component which is a recording object or an excluding object among a plurality of program components created by the program creating section 63. The recording section 81 may be configured to record in time series the device values stored in a specific device used or described in the program component designated as a recording object by the component designating section 52 among the devices extracted from a plurality of program components by the extracting section 53, and record devices used in a program component other than the program component designated by the component designating section 52 as the excluding object. For example, when a module A uses device memories DM0 and DM1 and a module B uses device memories DM1 and DM2, the device memories DM0, DM1 and DM2 are extracted from the modules A and B. Here, when the module B is designated as an excluding object, although DM2 is excluded, DM1 remains as a recording object because DM1 is also used in the module A. In this way, addition/deletion of a device may be executed taking the program component as a unit (that is, per program component). In addition, a program component which is a recording object or a program component which is an excluding object may be designated after devices have been extracted from all the program components.

The component designating section 52 may be configured to designate, among a plurality of program components, a program component from which a specific device is not extracted as an excluding object. The device extracting section 53 may be configured to analyze a program component designated as the extraction object of the device by the component designating component 52 to extract a device used or described in the program component and not to extract a device from a program component designated as an excluding object. That is, the deleting section or the adding section 54 may function as a device adding/deleting section which deletes a part of specific devices among the specific devices extracted by the device extracting section for each program component, or adds a device which is not extracted by the device extracting section for each program component.

A program component may be, for example, a reusable program module. A plurality of program components may be respectively stored in separate files. Access authority (editing authority) may be set for each of the plurality of program components.

The user program may be, for example, a ladder program. In this case, the plurality of program components may be a plurality of function blocks used or described in the ladder program.

The detecting section 82 is an example of a detecting section which detects rewriting of a device value from an external apparatus to a device of a plurality of devices. The recording section 81 may add a device to which rewriting of a device value has been detected by the detecting section 82 to a recording object.

The PLC 1 may further include the detachable memory card 36, and the specifying section 57 which detects an instruction to the memory card 36 and specifies a device which is the object of the instruction. Although the specifying section 57 is provided in the PC 2 in FIG. 6, the specifying section 57 may be mounted on the CPU 31 of the basic unit 3. The recording section 81 may add a device specified by the specifying section 57 to a recording object.

The expansion unit 4 of the PLC 1 may be a motion unit (positioning unit) having a positioning function. The recording section 81 or the device extracting section 53 may add a device (e.g., a buffer memory and the like in the motion unit), which is not described in the user program and which is used for the positioning function, to a recording object.

The estimating section 59 is an example of an estimating section which estimates an influence of the recording of a device value by the recording section 81 on the execution of the user program based on the number of devices extracted as the recording objects by the device extracting section 53. The display section 7 may be configured to display the influence. In this way, the user can add/delete a device while considering the influence on the scan time.

FIG. 7 shows the extraction of devices from the selected program component, the extraction of devices from the selected function, and the manual addition of devices by the user. However, not all of these are essential. It is sufficient to employ two or more of them. Alternatively, it is fine to only employ the extraction of devices from the selected program component, or it is fine to only employ the extraction of devices from the selected function.

The CPU 31 or the executing section 80 is an example of a program executing engine which repeatedly executes the user program. The CPU 31 or the executing section 80 or the CPU 41 is an example of a plurality of function executing engines which executes different functions (e.g., function programs) relating to the user program based on a command from the user program. This suggests that the function of the expansion unit 4 may be integrated into the basic unit 3. The function program is, for example, a motion control program. The program executing engine and the plurality of function executing engines may be executed by a single CPU, or may be executed by a plurality of CPUs, or may be realized by ASIC or FPGA. In addition, a single CPU may be equipped with multi cores and each core may be in charge of different functions.

The device section 34 is an example of a device storing section having a plurality of devices which are memory regions referenced by the program executing engine and the plurality of function executing engines. The recording section 81 is an example of a device recording section which records device values stored in any one of the plurality of devices in time series. The function setting section 62 may function as an allocating section which allocates a plurality of devices used in each of the plurality of function executing engines. The function designating section 60 may function as a designating section which designates one or more functions of a plurality of functions corresponding to the plurality of function executing engines. The device extracting section 53 may extract a device used for one or more functions designated by the designating section from the plurality of devices allocated by the allocating section as a recording object of the device recording section.

The program executing engine may be provided in the main unit. At least one of the plurality of function executing engines may be provided in a function expansion unit electrically connected to the main unit for extending functions of the main unit. All of the plurality of function executing engines may be provided in the main unit.

The basic unit 3 is an example of a main unit having a program executing section, a device storing section, and a device recording section. The expansion unit 4 is an example of a function expansion unit electrically connected to the main unit for extending functions of the main unit.

The function setting section 62 functions as an allocating section which allocates a device used for a function of the main unit and a device used for a function of the function expansion unit based on the user input via the display section 7. The function setting section 62 may display a UI for allocating a device to a function on the display section 7.

The function designating section 60 is an example of a designating section which designates one or more functions of a plurality of functions including a function provided in the main unit and a function provided in the function expansion unit. The adding section 54 of the device extracting section 53 extracts a device used for a function designated by the designating section as a recording object of the device recording section. The deleting section 55 of the device extracting section 53 excludes a device used for a function designated by the designating section from the recording objects of the device recording section. The communicating section 23 functions as a transmitting section which transmits setting data for causing the device recording section to record device values stored in a specific device extracted as a recording object in time series to the PLC 1. The recording section 81 is configured to record device values stored in a device extracted as a recording object by the device extracting section 53 in time series.

The project creating section 50 functions as a program creating section which creates a user program including an instruction word relating to any one of a plurality of devices based on the user input via the display section 7. The device extracting section 53 may analyze the user program, extract a device used or described in the user program, and create a device list (extraction list) including the extracted device. Further, the device extracting section 53 may add a device used for a function designated as a recording object (extraction object) by the function designating section 60 to the device list. Further, the deleting section 55 may be configured to delete a device used for a function designated as an excluding object by the function designating section 60 from the device list. The device list is included in the log setting data 72. The recording section 81 is configured to record device values stored in a device registered in the device list in time series.

The function designating section 60 may be configured to further designate any unit of the main unit and the function expansion unit. That is, it is fine to select a function, and it is fine to select a unit. When one unit has a plurality of functions, by selecting one function by the user, all functions included in that unit are selected as extraction objects of the device. The device extracting section 53 may extract a device used for a unit designated as a recording object (extraction object) by the function designating section 60 as a recording object of the device recording section. The device extracting section 53 may be configured to exclude a device used for a unit designated as an excluding object by the function designating section 60 from the recording objects of the device recording section. An extraction object or an excluding object may be designated taking the main unit and the function expansion unit as a unit as described above.

As shown in FIG. 14, the function designating section 60 may be configured to further designate a device type of a device which is a recording object or a device type of a device which is an excluding object. The device extracting section 53 extracts a device of the device type designated as a recording object by the function designating section 60 as a recording object of the device recording section. The device extracting section 53 may be configured to exclude a device of the device type designated as an excluding object by the designating section from recording objects of the device recording section.

As described with reference to FIG. 19, the collecting section 92a is an example of a first collecting section which collects a device value stored in any one of a plurality of devices and stores information relating to collecting time at which the device value is collected and the device value in association with each other in a first buffer. The device value of the collecting object may be preset by the log setting data 72. The ring buffer 91a is an example of a first buffer. The information relating to collecting time may be, for example, time information provided from the time managing section 83a. The IFs 99a and 99f are examples of a first interface which communicates with the expansion unit 4. The communicating section 33 is an example of a first external interface which receives a user program and setting information from an external setting apparatus.

IFs 99b, 99d, 99h, 99j, etc. are examples of a second interface which communicates with the main unit. The image receiving section 96a and the connecting port 97 are examples of a third interface (two-dimensional data receiving section) which is connected to a monitoring apparatus that acquires two-dimensional data, and receives the two-dimensional data from the monitoring apparatus. The connecting port 97 may function as a second external interface which is connected with a monitoring apparatus and from which data from the monitoring apparatus is input. The camera 98 is an example of the monitoring apparatus. The monitoring apparatus may be a bar code reader. In this case, a result of reading the bar code is an example of the two-dimensional data. The monitoring apparatus may be an image processing apparatus which generates a height image or a distance image of a work piece. The height image or the distance image is an example of the two-dimensional data. The two-dimensional data may be moving image data. In addition, large capacity data having a large size as compared with a device value is also an example of the two-dimensional data. For example, numeric data acquired by a high-speed analog input unit is also an example of the two-dimensional data. The function executing section 96 may function as a function executing section which executes, based on received setting information, a function accompanying an input of data from the monitoring apparatus via the second external interface.

The collecting section 92b is an example of a second collecting section which collects two-dimensional data received via the third interface and stores information relating to acquiring time at which the two-dimensional data is acquired and the two-dimensional data in association with each other in a second buffer. Time information provided by the time managing section 83 is an example of information relating to the acquiring time. The ring buffer 91b is an example of the second buffer.

The saving section 93 is an example of a saving section which saves, when a predetermined saving condition is satisfied, the device value and the information relating to the collecting time stored in the first buffer, and the two-dimensional data and the information relating to the acquiring time stored in the second buffer.

In this way, the device value and the two-dimensional data are respectively linked with information relating to the acquiring time thereof. Therefore, it becomes easier to specify a time relationship between a device value and comparatively large capacity data such as two-dimensional data.

The monitoring apparatus may be the camera 98 which acquires image data such as a still image and a moving image. The function executing section 96 executes a function accompanying an input of image data from the camera 98. The collecting section 92b, which is the second collecting section, stores information relating to acquiring time at which the image data is acquired and the image data in association with each other in the second buffer. The saving section 93 may save a device value, information relating to the collecting time, the image data stored in the second buffer, and information relating to the acquiring time in association with each other. The function executing section 96 may execute a function accompanying an input of data from the monitoring apparatus unsynchronized with an executing cycle of the user program. The saving section 93 may save the user program and the project data including setting information together. The saving section 93 may store the device value, the information relating to the collecting time, the data stored in the second buffer, and the information relating to the acquiring time in a plurality of files identified by a common flag, and saves the plurality of files.

The information relating to the collecting time is only necessary to be information where the collecting time of each of a plurality of device values collected in time series can be specified. The collecting time may be associated with each of the plurality of device values. Alternatively, for example, the collecting time may be associated with an initial device value only. In the latter case, the collecting time for a device value other than the initial device value may be calculated based on other information (number of scans, scan time, etc.). The device value is recorded by a number the same as the number of scans, and thus the collecting time of a random device value can be specified by storing in advance the processing time (scan time) in each scan. For example, in a case of specifying the collecting time of the device value recorded in the 100th scan, assume that the collecting time of the device value recorded in the first scan is 10:10:00 and each scan from the second to the 100th scans took 100 microseconds. In this case, the time where 100 microseconds×99 has elapsed from 10:10:00 is calculated as the collecting time of the device value recorded in the 100th scan. Thus, it is not necessary to record all device values in association with the collecting time.

The information relating to the acquiring time is only necessary to be information for specifying the acquiring time for each of the plurality of two-dimensional data acquired in time series. The acquiring time may be associated with each of the plurality of two-dimensional data. Alternatively, for example, the acquiring time may be associated with initial two-dimensional data only. In the latter case, the acquiring time for two-dimensional data other than the initial two-dimensional data can be calculated based on other information (number of times of imaging, imaging cycle, etc.). Specifically, the acquiring time may be associated with the initial two-dimensional data only among the plurality of two-dimensional data. The cycle of acquiring the two-dimensional data (imaging cycle) is almost constant. Therefore, the acquiring time of random two-dimensional data can be specified. For example, in a case of specifying the acquiring time of the image data recorded in the tenth time of imaging, assume that the acquiring time of the image data recorded in the first time of imaging is 10:10:00 and each time of imaging from the second to the tenth time of imaging took 100 milliseconds. In this case, the acquiring time of the image data recorded in the tenth time of imaging is the time where 100 milliseconds×9 has elapsed from 10:10:00. Thus, it is not necessary to record all two-dimensional data in association with the acquiring time.

The saving section 93 may include the memory card 36 which is detachable from the main unit. The saving section 93 may save the device value and the information relating to the collecting time stored in the first buffer, and the two-dimensional data and the information relating to the acquiring time stored in the second buffer in the memory card 36. This makes it easy to convey the log data 73 to the PC 2. As shown in FIG. 19, the first buffer may be provided in the main unit. As shown in FIG. 20, the second buffer may be provided in the expansion unit.

As shown in FIG. 24, the first interface may be disposed on a side surface, which is a side surface of the main unit and is facing a side surface of the expansion unit. The second interface may be provided on the side surface of the expansion unit so as to be connected to the first interface.

As shown in FIG. 25, the backplane 200 is an example of a support plate which supports the main unit and the expansion unit. In this case, at least one of the first buffer, the second buffer, and the saving section may be provided on the support plate.

The transmitting section 94 is an example a transmitting section which transmits the device value, the information relating to the collecting time, the two-dimensional data, and the information relating to the acquiring time saved in the storing device 32 to an external apparatus. The external apparatus may be a cloud or the PC 2. The PC 2 may receive the log data 73 in real time and display the log data 73 on the display section 7.

The first buffer or the second buffer may be configured to further store information which is generated in a cycle shorter than the executing cycle of the user program (e.g., scan cycle).

The saving section 93 may be configured to read and save information relating to the two-dimensional data and the acquiring time from the second buffer during the execution of end processing (END processing) relating to the user program in the main unit.

As described with respect to the time managing sections 83a and 83b, the clock of the main unit which times the collecting time and the clock of the expansion unit which times the acquiring time are synchronized. The synchronization may be realized by inter-unit synchronization, for example.

As shown in FIG. 29, the saving section 93 may be configured to save in the memory card 36 the device value, the information relating to the collecting time, the two-dimensional data, and the information relating to the acquiring time collected in a predetermined collection time period from before to after a preset saving trigger As shown in FIG. 30, the saving section 93 may be configured to save in the memory card 36 the device value, the information relating to the collecting time, the two-dimensional data, and the information relating to the acquiring time collected in a predetermined collection time period starting at a timing at which a preset start relay is turned on.

As described with reference to FIG. 32, the saving section 93 may save, when a predetermined saving condition is satisfied, the device value recorded by the device recording section and the user program or the identification information of the user program stored in the program storing section in correspondence with each other in a memory (e.g., the memory card 36 or the internal memory 37). In addition, the output section 84 may output, when a predetermined output condition is satisfied, the device value recorded by the device recording section and the user program or the identification information of the user program stored in the program storing section to an external memory (e.g., the memory card 36). As described above, it is important which project data 71 is used to acquire the log data 73. Therefore, the output section 84 outputs the project data 71 used for acquiring the log data 73 or the identification information of the project data 71. In other words, by outputting the log data 73 and the project data 71 or the identification information of the project data 71, it becomes easy to specify the relationship between the log data 73 and the project data 71. In this way, the user can efficiently proceed debugging of the project data 71.

The user program includes a plurality of program components. The project data manages a plurality of program components. The storing device 32 functions as a program storing section which stores the user program as a part of the project data 71. The output section 84 may be configured to output the project data 71 including the user program and output the identification information of the project data 71 as the identification information of the user program. This makes it easy to determine whether the project data 71 (master data) stored in the PC 2 is consistent with the project data 71 stored in the PLC 1.

The project data 71 may include setting information of the expansion unit 4. This is because the setting information of the expansion unit 4 is necessary in debugging the project data 71. For example, when a plurality of expansion units 4 are connected to the basic unit 3, the connection order of the plurality of expansion units 4 is included in the setting information of the expansion units 4. Information relating to the connection order may be required during debugging.

The determining section 301 functions as a determining section which determines whether an output of the user program (the project data 71) is prohibited. When it is determined by the determining section 301 that the output of the user program is prohibited, the output section 84 may output the device value recorded by the device recording section and the identification information of the user program stored in the program storing device to an external memory. In this way, it becomes possible to utilize the master data of the PC 2 based on the identification information while protecting the user program.

As described in connection with the adding section 312, the identification information of the user program is identification information updated when the user program is changed. Therefore, the project data 71 of another version different from the project data 71 held in the PLC 1 will not be erroneously utilized for debugging.

As described in connection with the computing section 313, the identification information of the user program may be an error detection code or a hash value computed from the user program. As described above, it is fine to adopt a method of computing identification information that when the project data 71 is updated, the identification information is also updated. The identification information may be a time stamp, etc.

The storing device 22 of the PC 2 is an example of a program memory which stores the user program and the identification information of the user program. The collating section 334 is an example of a collating section which collates the identification information of the user program output from a programmable logic controller and the identification information of the user program stored in a program memory and displays a collation result on the display section. When the two are inconsistent, the warning section 335 outputs a warning. When the two are consistent, the warning section 335 may display a message or an image indicating the consistency on the display section 7.

As shown in FIG. 38, the display section 7 may display the device value output from the programmable logic controller in association with the part of the user program in which an instruction word related to the device value is described. As a result, it becomes easy for the user to understand the relationship between the change of the device value and the user program. This will improve debugging efficiency.

The storing device 22 and the memory card 36 are an example of a saving section which saves a plurality of device values in time series collected in the programmable logic controller, and time data indicating the collecting time of each device value. The program display module 321 is an example of a first engineering software module which displays a device value on a ladder diagram. The waveform display module 322 is an example of a second engineering software module which displays a device value as a time series waveform. The replay control module 324 is an example of a synchronization software module which synchronizes time to be displayed in the first engineering software module and time to be displayed in the second engineering software module. As a result, it becomes easy for the user to understand the relationship between the change of a specific device value and a program.

The first engineering software module may have a first display control section which acquires a device value from the programmable logic controller in a real time replay mode to display the device value on a ladder diagram, and acquires a device value corresponding to the time to be displayed from a saving section based on time data in a history replay mode to display the device value on a ladder diagram. The program display section 332, the display time control section 331, and the device value acquiring section 333 function as a first display control section. The log replay mode is an example of the history replay mode.

The second engineering software module may have a second display control section which acquires a device value from the programmable logic controller in a real time replay mode to display a time series waveform, and acquires a device value corresponding to the time to be displayed from a saving section based on time data in a history replay mode to display a time series waveform. The waveform display section 336, the display time control section 331, and the device value acquiring section 333 are an example of the second display control section.

The synchronization software module may have a synchronizing section which synchronizes the time to be displayed in the first engineering software module and the time to be displayed in the second engineering software module in the history replay mode. The replay control section 343 is an example of the synchronizing section.

The first engineering software module may further have a first update section which updates time to be displayed in the history replay mode. The time designating cursor 404, the time UI 330, and the display time control section 331 are an example of the first update section. The replay control section 343, which is a synchronizing section, reflects the time to be displayed updated by the first update section in the time to be displayed of the second engineering software module.

The second engineering software module may further have a second update section which updates time to be displayed in the history replay mode. The bar 103, the time UI 330, and the display time control section 331 are an example of the second update section. The replay control section 343, which is a synchronizing section, reflects the time to be displayed updated by the second update section in the time to be displayed of the first engineering software module.

As shown in FIG. 43, the first display control section may search in a ladder diagram an instruction word related to a device which is an object to be displayed in the second engineering software module among a plurality of devices referenced in the programmable logic controller. For example, a device may be designated by designating a device (e.g., R000, DM100, etc.) shown in FIG. 28 by the pointer 101. As shown in FIG. 38, the first display control section may be configured to display the device value of the device together with the instruction word found in the ladder diagram. The pointer 101 is an example of a designating section which designates a random device. The first display control section may search in a ladder diagram an instruction word related to a device designated by a designating section among a plurality of devices referenced in the programmable logic controller, and display the device value of the device together with the instruction word found in the ladder diagram.

As shown in FIG. 43, a ladder program may include a plurality of program components in a programmable logic controller. The first display control section (e.g., the log display section 61 and the device extracting section 53) may be configured to search one or more blocks including an instruction word related to a device from a plurality of program components and display the found blocks as ladder diagrams.

As shown in FIG. 43, when a plurality of blocks including an instruction word related to a device are found, the first display control section may display by laying out ladder diagrams corresponding to the plurality of blocks.

As shown in FIG. 43, when an instruction word related to a first device (e.g., MR001) in a first block (e.g., measurement module B2) is an instruction word of an input system in a ladder program, the first display control section may specify a second device (e.g., MR003) which is an object of an instruction word of an output system described in correspondence with the instruction word of the input system, and specify a second block (e.g., determination module B3) which describes the instruction word of the input system taking the second device as an object.

When an instruction word related to a first device (e.g., MR010) in a first block (e.g., determination module B3) is an instruction word of an output system in a ladder program, the first display control section may specify a second device (e.g., MR001) which is an object of an instruction word of an input system described in correspondence with the instruction word of the output system, and specify a second block (e.g., measurement module B2) which describes the instruction word of the output system taking the second device as an object.

The synchronizing section may have a setting section which sets update speed of time to be displayed. The speed designating section 405 is an example of the setting section. A slow replay, a fast forwarding replay, etc. may be thus realized.

The first display control section and the second display control section may be configured to further display a device value set based on the user input inputted from a human interface (HMI) which displays information relating to a programmable logic controller. The HMI may be realized by an emulator. As described with reference to FIG. 39, the UI 490 displays a plurality of device values. When any one device value is clicked by the pointer 101, the log display section 61 may add the clicked device value as an object to be displayed by the program display section 332, or add the clicked device value as an object to be displayed by the waveform display section 336. As a result, it becomes possible to display the HMI, the user program, and the waveform of the device value in connection and synchronization with each other.

The saving section may further save a plurality of image data in time series acquired by a camera unit and time data indicating acquiring time of each image data. As shown in FIG. 28, the second engineering software module may acquire a device value from the programmable logic controller in the real time replay mode to display a time series waveform, and display image data acquired from the camera unit. Similarly, the second engineering software module may acquire and display a device value and image data corresponding to time to be displayed from the saving section in the history replay mode. The image data has more information than a numeric value. Therefore, by displaying the image data, the user can early find a problem.

The first engineering software module may acquire a device value from the programmable logic controller in the real time replay mode to display the device value on a ladder diagram, and display image data acquired from the camera unit. The first engineering software module may acquire a device value and image data corresponding to time to be displayed from the saving section in the history replay mode and display the device value and the image data on a ladder diagram.

Each of the plurality of expansion units 4 operates in accordance with different internal control cycles. Accordingly, in many cases, the acquiring time of device values and the acquiring time of image data acquired from the plurality of expansion units 4 may not coincide with each other. Therefore, as described with reference to FIG. 26 to FIG. 28, the first display control section and the second display control section may be configured to read a device value associated with time data closest to the time to be displayed in the history replay mode.

What is claimed is:
1. A programmable logic controller including:
a first external interface which receives a user program, function setting information, and log setting data from an external setting apparatus;
a program executing section which repeatedly executes the received user program;
a device storing section having a plurality of devices which are memory regions referred to by the program executing section;
a first collecting section which collects a device value stored in any one of the plurality of devices and stores information relating to collecting time at which the device value is collected and the device value in association with each other in a first buffer;
a second external interface which is connected to a monitoring apparatus from which data is input;
a function executing section which executes, based on the received function setting information, a function accompanying an input of data from the monitoring apparatus via the second external interface;
a second collecting section which collects data input from the monitoring apparatus and stores information relating to acquiring time at which the data is acquired and the data in association with each other in a second buffer; and
a saving section which saves, when a saving timing defined by the log setting data arrives, the device value and the information relating to the collecting time stored in the first buffer, and the data and the information relating to the acquiring time stored in the second buffer in correspondence with each other.

2. The programmable logic controller according to claim 1, wherein
the monitoring apparatus is a camera which acquires image data of a still image or a moving image,
the function executing section executes the function accompanying an input of the image data from the camera,
the second collecting section stores information relating to acquiring time at which the image data is acquired and the image data in association with each other in a second buffer, and
the saving section saves the device value, the information relating to the collecting time, and the image data and the information relating to the acquiring time stored in the second buffer in correspondence with each other.

3. The programmable logic controller according to claim 1, wherein the function executing section executes the function accompanying an input of data from the monitoring apparatus unsynchronized with an executing cycle of the user program.

4. The programmable logic controller according to claim 1, wherein the saving section saves the user program together with project data including the function setting information.

5. The programmable logic controller according to claim 1, wherein the saving section stores the device value, the information relating to the collecting time, and the data and the information relating to the acquiring time stored in the second buffer into a plurality of files identified by a common flag and saves the plurality of files.

6. The programmable logic controller according to claim 1, wherein
the programmable logic controller includes a main unit and an expansion unit,
the main unit includes the program executing section, the device storing section, and the first collecting section, and
the expansion unit includes the function executing section and the second collecting section.

7. The programmable logic controller according to claim 6, wherein the saving section saves the device value and the information relating to the collecting time stored in the first buffer, and the data and the information relating to the acquiring time stored in the second buffer in correspondence with each other in a memory card detachable from the main unit.

8. The programmable logic controller according to claim 6, wherein the first buffer is provided in the main unit.

9. The programmable logic controller according to claim 6, wherein the second buffer is provided in the expansion unit.

10. The programmable logic controller according to claim 6, wherein
the main unit further includes a first interface communicating with the expansion unit,
the expansion unit further includes a second interface communicating with the main unit,
the first interface is disposed on a side surface, which is a side surface of the main unit and is facing a side surface of the expansion unit, and
the second interface is provided on the side surface of the expansion unit so as to be connected to the first interface.

11. The programmable logic controller according to claim 6, wherein
the programmable logic controller further includes a support plate which supports the main unit and the expansion unit, and
at least one of the first buffer, the second buffer, and the saving section is provided on the support plate.

12. The programmable logic controller according to claim 6, wherein a clock of the main unit which times the collecting time and a clock of the expansion unit which times the acquiring time are synchronized.

13. The programmable logic controller according to claim 1, further including a transmitting section which transmits the device value, the information relating to the collecting time, the data, and the information relating to the acquiring time saved in the saving section to an external apparatus.

14. The programmable logic controller according to claim 1, wherein the first buffer or the second buffer is configured to further store information generated in a cycle shorter than an executing cycle of the user program.

15. The programmable logic controller according to claim 1, wherein the saving section is configured to read and save the data and the information relating to the acquiring time from the second buffer during a period in which end processing relating to the user program is executed in the programmable logic controller.

16. The programmable logic controller according to claim 1, wherein the saving section is configured to save in correspondence with each other the device value, the information relating to the collecting time, the data, and the information relating to the acquiring time collected in a predetermined collection time period from before to after a preset saving trigger.

17. The programmable logic controller according to claim 1, wherein the saving section is configured to save in correspondence with each other the device value, the information relating to the collecting time, the data, and the information relating to the acquiring time collected in a predetermined collection time period starting at a timing at which a preset start relay is turned on.

18. A main unit connected to an expansion unit in a programmable logic controller, wherein
the main unit of the programmable logic controller includes
an external interface which receives a user program and log setting data from an external setting apparatus;
a program executing section which repeatedly executes the user program;
a device storing section having a plurality of devices which are memory regions referred to by the program executing section;
a first collecting section which collects a device value stored in any one of the plurality of devices and stores information relating to collecting time at which the device value is collected and the device value in association with each other in a first buffer; and
a saving section which saves, when a saving timing defined by the log setting data arrives, the device value and the information relating to the collecting time stored in the first buffer, and data and information relating to acquiring time of the data stored in a second buffer of the expansion unit of the programmable logic controller in correspondence with each other.

* * * * *